(12) United States Patent
Yoshida et al.

(10) Patent No.: US 11,835,413 B2
(45) Date of Patent: *Dec. 5, 2023

(54) RESONANT PRESSURE SENSOR AND MANUFACTURING METHOD THEREFOR

(71) Applicant: Yokogawa Electric Corporation, Musashino (JP)

(72) Inventors: Takashi Yoshida, Musashino (JP); Yuusaku Yoshida, Musashino (JP); Atsushi Yumoto, Musashino (JP); Yoshitaka Suzuki, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/566,326

(22) Filed: Dec. 30, 2021

(65) Prior Publication Data

US 2022/0120627 A1  Apr. 21, 2022

Related U.S. Application Data

(62) Division of application No. 14/460,684, filed on Aug. 15, 2014, now Pat. No. 11,243,131.

(30) Foreign Application Priority Data

Aug. 19, 2013 (JP) ................................. 2013-169638

(51) Int. Cl.
*G01L 9/08* (2006.01)
*G01L 9/12* (2006.01)
(Continued)

(52) U.S. Cl.
CPC .............. *G01L 7/082* (2013.01); *G01L 7/022* (2013.01); *G01L 7/08* (2013.01); *G01L 9/0008* (2013.01);
(Continued)

(58) Field of Classification Search
None
See application file for complete search history.

(56) References Cited

U.S. PATENT DOCUMENTS 5,165,289 A   11/1992  Tilmans
11,243,131 B2 * 2/2022  Yoshida .................. G01L 7/082
(Continued)

FOREIGN PATENT DOCUMENTS

EP     2428783 A1     3/2012
JP     01127930 A  *  5/1989
(Continued)

*Primary Examiner* — Jill E Culler
*Assistant Examiner* — Ruben C Parco, Jr.
(74) *Attorney, Agent, or Firm* — Sughrue Mion, PLLC

(57) ABSTRACT

A resonant pressure sensor includes a first substrate and a resonator. The first substrate includes a diaphragm and a projection disposed on the diaphragm. The resonator is disposed in the first substrate, a part of the resonator being included in the projection, and the resonator being disposed between a top of the projection and an intermediate level of the first substrate. The first substrate is an SOI substrate in which a silicon dioxide layer is inserted between a silicon substrate and a superficial silicon layer. The intermediate level of the first substrate is disposed in the silicon substrate, and the resonator is disposed in the projection included in the superficial silicon layer.

18 Claims, 43 Drawing Sheets

(51) Int. Cl.
*G01L 7/08* (2006.01)
*G01L 7/02* (2006.01)
*G01L 9/00* (2006.01)

(52) U.S. Cl.
CPC ......... *G01L 9/0047* (2013.01); *Y10T 29/4913* (2015.01)

(56) References Cited

U.S. PATENT DOCUMENTS

| | | |
|---|---|---|
| 2004/0129086 A1 | 7/2004 | Binet et al. |
| 2005/0284228 A1 | 12/2005 | Toyoda |
| 2010/0090297 A1 | 4/2010 | Nakatani |
| 2015/0241465 A1 | 8/2015 | Konishi |

FOREIGN PATENT DOCUMENTS

| | | | |
|---|---|---|---|
| JP | 01171337 U | | 12/1989 |
| JP | 03-131732 A | | 6/1991 |
| JP | 03131732 A | * | 6/1991 |
| JP | H05248973 A | * | 9/1993 |
| JP | 07-5060 A | | 1/1995 |
| JP | 07005060 A | * | 1/1995 |
| JP | 2001-066208 A | | 3/2001 |
| JP | 2005-37309 A | | 2/2005 |
| JP | 2010-91467 A | | 4/2010 |
| JP | 2013-044675 A | | 3/2013 |

\* cited by examiner

RESONANT PRESSURE SENSOR AND MANUFACTURING METHOD THEREFOR

CROSS-REFERENCE TO RELATED APPLICATION

This application is a Divisional application of U.S. application Ser. No. 14/460,684, filed on Aug. 15, 2014, which claims priority from Japanese Patent Application No. 2013-169638, filed on Aug. 19, 2013, in the Japanese Patent Office, the entire contents of each of which being herein incorporated by reference in their entireties.

BACKGROUND OF THE INVENTION

Field of the Invention

The present invention relates to a resonant pressure sensor and a manufacturing method therefor.

Description of Related Art

In a pressure sensor detecting micro-pressure, so as to improve sensitivity of the sensor, a diaphragm of the sensor is thin to be deformable easily. Japanese Unexamined Patent Application Publication No. 2013-44675 discloses that a diaphragm of a resonant pressure sensor is formed by polishing and etching. By the manufacturing method, the diaphragm becomes thinner.

However, if the diaphragm becomes thinner by polishing and etching, it is difficult to dispose a resonator apart from a neutral plane (intermediate level) positioned on a bisector dividing the diaphragm into two substantially-equal thickness parts. Therefore, it is difficult to detect the deformation of the diaphragm with high sensitivity.

SUMMARY OF THE INVENTION

A resonant pressure sensor may include a first substrate including a diaphragm and at least one projection disposed on the diaphragm, and at least one resonator disposed in the first substrate, at least a part of the resonator being included in the projection, and the resonator being disposed between a top of the projection and an intermediate level of the first substrate.

DETAILED DESCRIPTION OF THE INVENTION

Before describing some embodiments, the related art will be explained with reference to one or more drawings, in order to facilitate the understanding of the embodiments.

Figure 45:
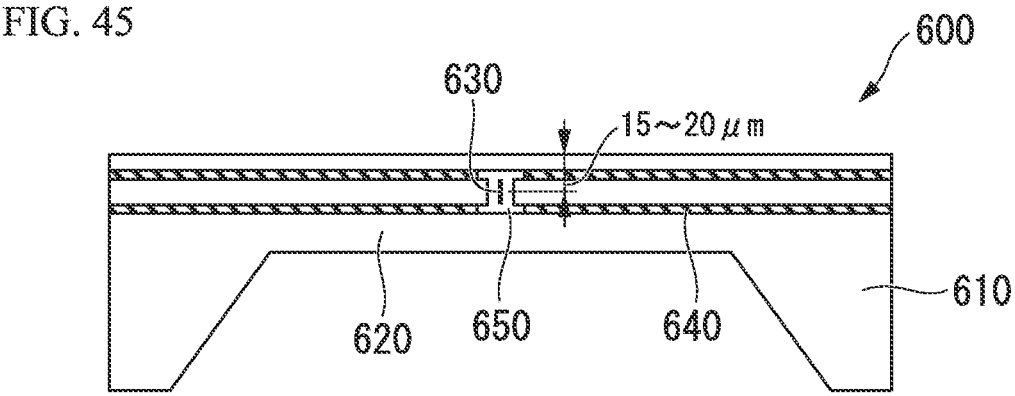
FIG. 45 is a sectional view illustrating an exemplary of the resonant pressure sensor in the related art.
Figure 46:
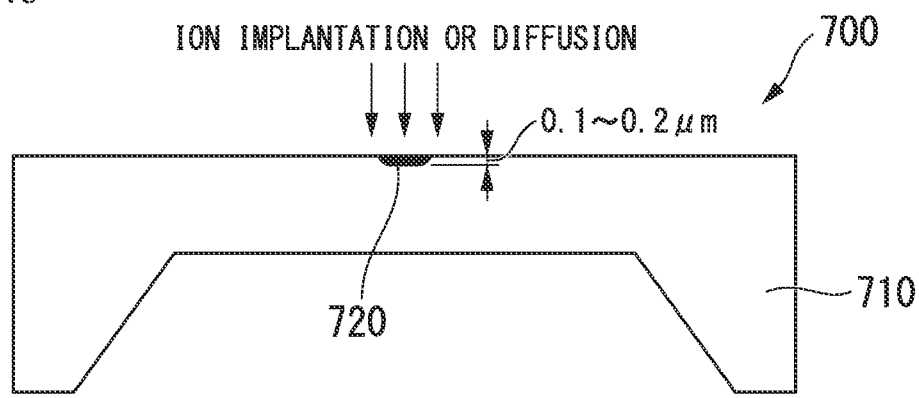
FIG. 46 is a sectional view illustrating an exemplary of the piezoresistive pressure sensor in the related art.

FIG. 45 is a drawing of an exemplary of a resonant pressure sensor. The resonant pressure sensor 600 includes a silicon layer 610, a diaphragm 620, resonator 630, a silicon dioxide layer 640, and a vacuum chamber 650. FIG. 46 is a drawing of an exemplary of a piezoresistive pressure sensor. The piezoresistive pressure sensor 700 includes a silicon layer 710 and a piezoresistance 720.

Sensitivity of the resonant pressure sensor 600 is four times as high as sensitivity of the piezoresistive pressure sensor 700. Output signals of the resonant pressure sensor 600 changes very little in accordance with disturbances such as temperature and static pressure. Therefore, the resonant pressure sensor 600 has superior repeatability and long-term stability.

Figure 47:
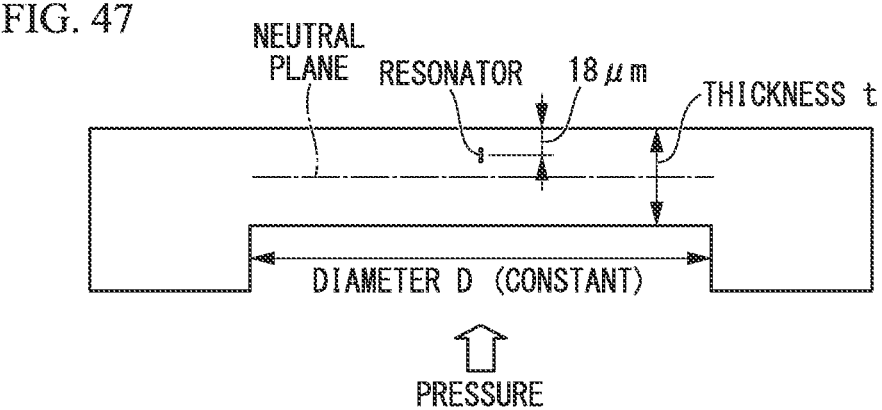
FIG. 47 is a drawing illustrating a resonant pressure sensor model used in a simulation in the related art.
Figure 48:
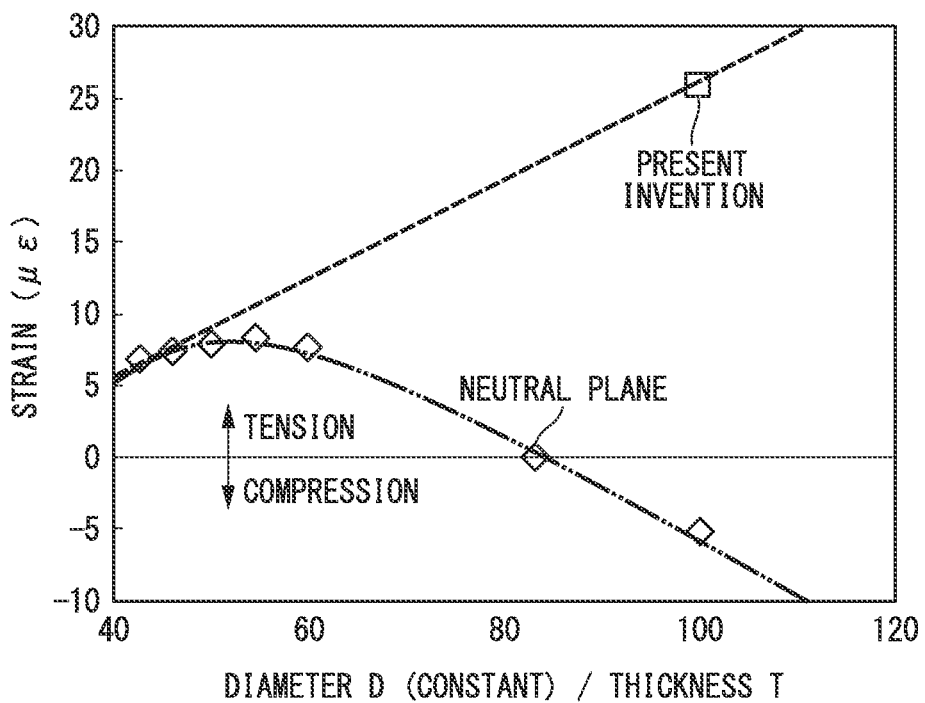
FIG. 48 is a drawing illustrating a simulation result of the resonant pressure sensor in the related art.

FIG. 47 is a drawing of a resonant pressure sensor model used in a simulation. The simulation is about a relation between a thickness of the diaphragm 620 and strain of the resonator 630. FIG. 48 is a drawing illustrating a result of the simulation. In the FIG. 48, the horizontal axis indicates a diameter D (constant value) of the diaphragm 620 divided by a thickness T of the diaphragm 620, and the vertical axis indicates strain [micro epsilon].

As shown in FIG. 48, in a case where the diameter D of the diaphragm 620 is constant, in the range of D/T from 40 to 50, the thinner the diaphragm 620 is, the larger the strain is. As the strain becomes larger, the sensitivity is improved in the range. However, in the range of D/T more than 50, the thinner the diaphragm 620 is, the smaller the strain is. As the strain becomes smaller, the sensitivity is reduced in the range. As described above, it becomes apparent that there is a limit of a range to improve the sensitivity even if the diaphragm 620 becomes thinner.

Figure 49:
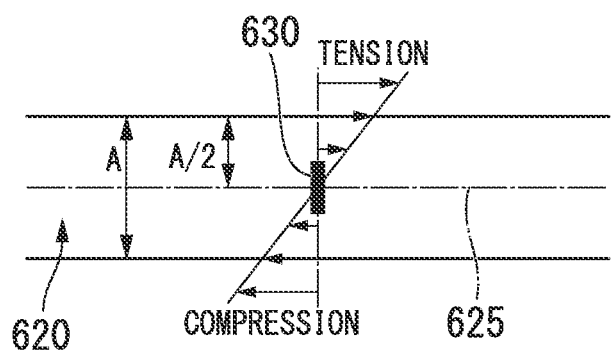
FIG. 49 is a drawing illustrating a relation between the resonator and the neutral plane (intermediate level) of the diaphragm in the related art.
Figure 49:
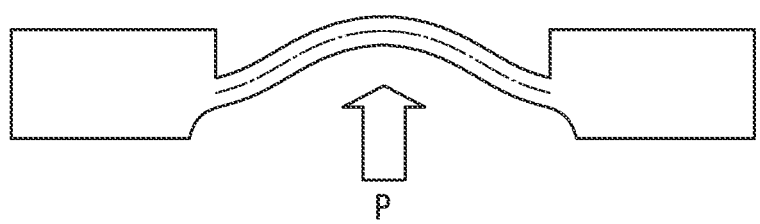

FIG. 49 is a drawing illustrating a relation between the resonator 630 and a neutral plane 625 of the diaphragm 620 in the resonant pressure sensor 600. The neutral plane 625 is an intermediate level positioned on a bisector dividing the diaphragm 620 into two substantially-equal thickness parts. As shown in FIG. 49, if the diaphragm 620 becomes thinner, the resonator 630 overlaps with the neutral plane 625 (boundary plane of which bending stress is 0). As the result, the sensitivity of the resonant pressure sensor 600 is reduced.

As shown in FIG. 46, in the piezoresistive pressure sensor 700, the piezoresistance 720 is formed on a superficial layer of the silicon layer 710 by implanting impurity ion. The piezoresistance 720 is disposed at a position within about 0.2 micrometers from the superficial layer. Therefore, even if the diaphragm becomes thinner in several tens of micrometers order, as the neutral plane is far enough away from the piezoresistance 720, there is no possibility that the piezoresistance 720 overlaps with the neutral plane and the sensitivity of the piezoresistive pressure sensor 700 is reduced. To the contrary, as shown in FIG. 45, in the resonant pressure sensor 600, the resonator 630 is disposed in the vacuum chamber 650 highly vacuumed and positioned deep from the superficial layer of the silicon layer 610. The resonator 630 is a structure of which depth in a thickness direction of the diaphragm 620 is about 20 micrometers. Therefore, if the diaphragm 620 becomes thinner, a distance between the neutral plane 625 and the resonator 630 is smaller, and the resonator 630 ultimately overlaps with the neutral plane 625. As the result, the resonator 630 cannot avoid the effect of the neutral plane 625.

As described above, compared to the piezoresistive pressure sensor 700, it is difficult to improve the sensitivity of the resonant pressure sensor 600 only by making the diaphragm 620 thinner.

Some embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

First Embodiment

Figure 1A:
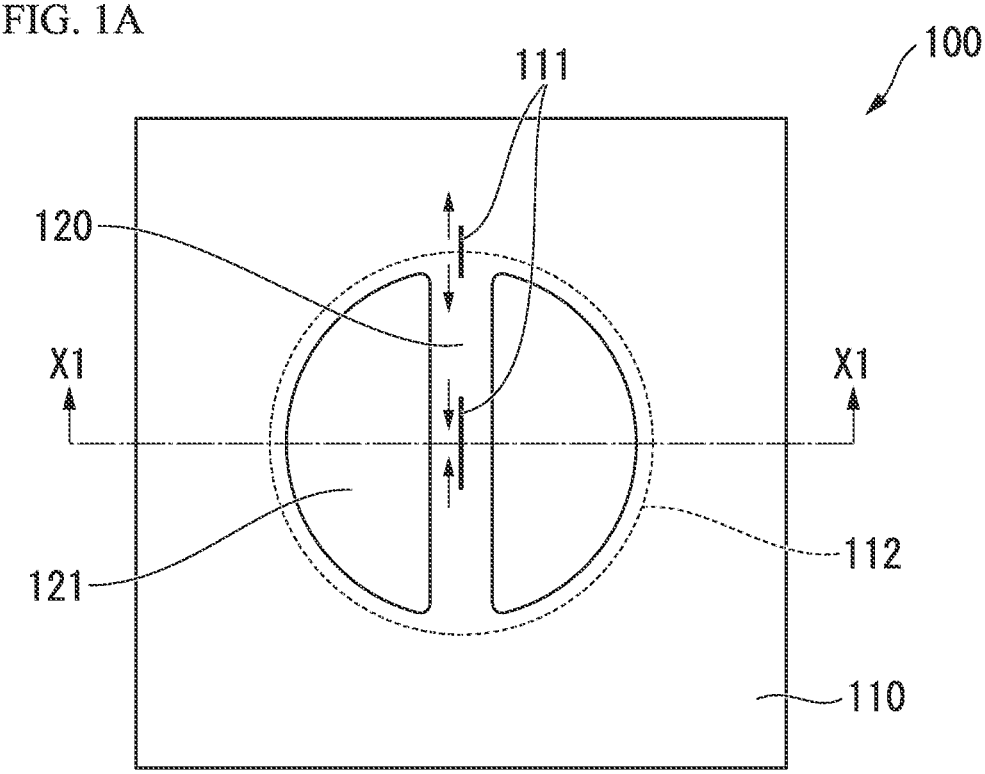
FIG. 1A is a plane view illustrating the resonant pressure sensor of the first embodiment.
Figure 1B:
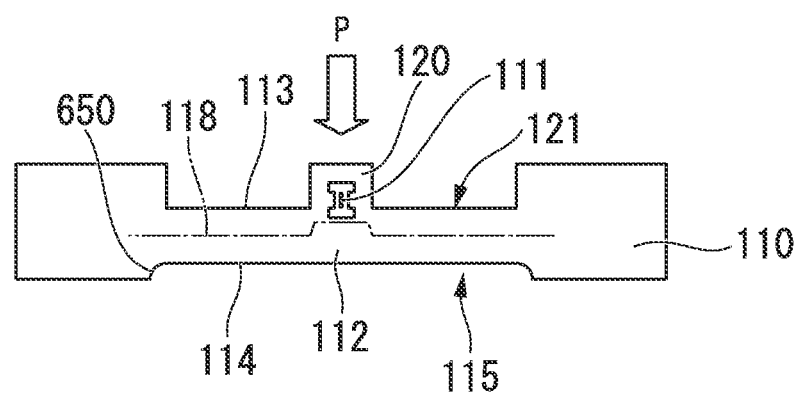
FIG. 1B is a sectional view illustrating the resonant pressure sensor of the first embodiment.
Figure 2A:
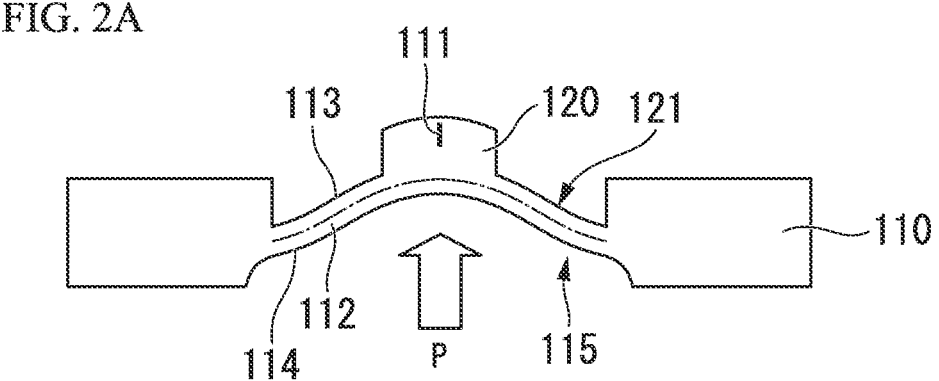
FIGS. 2A, 2B, and 2C are drawings illustrating a relation between the resonator and the neutral plane (intermediate level) of the diaphragm.
Figure 2B:
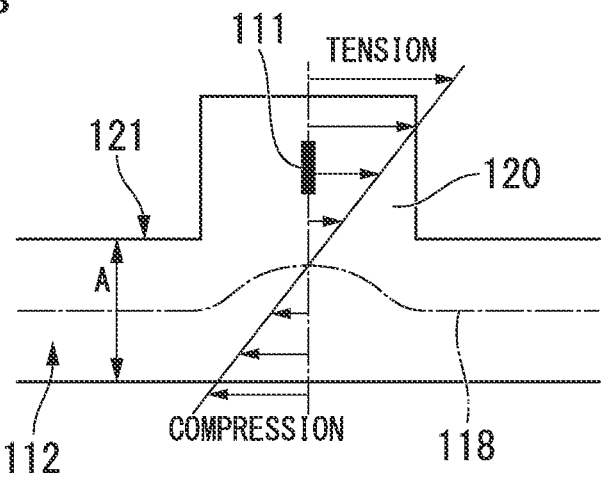
Figure 2C:
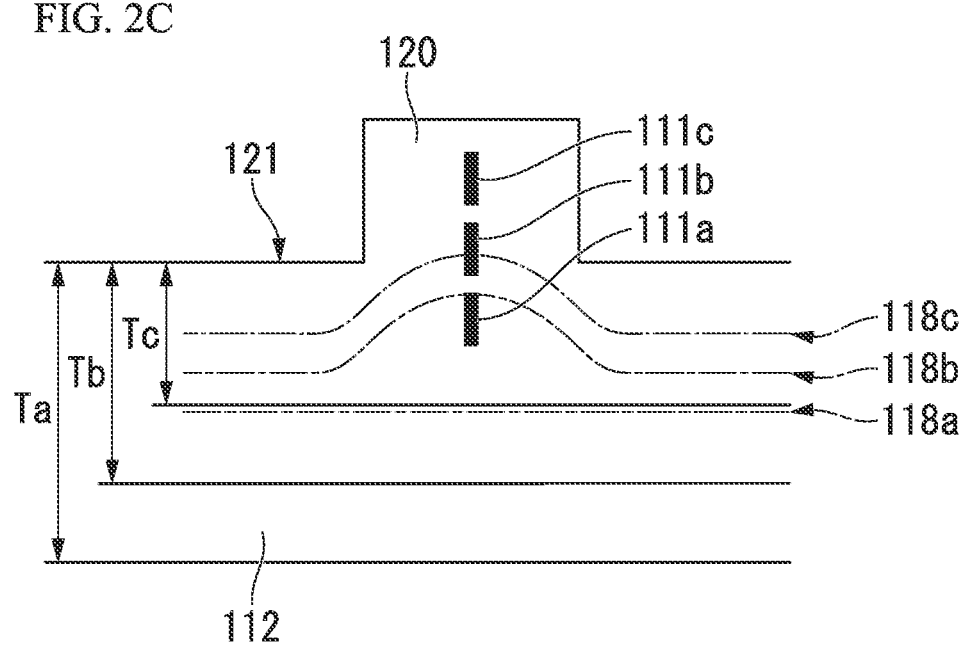
Figure 3:
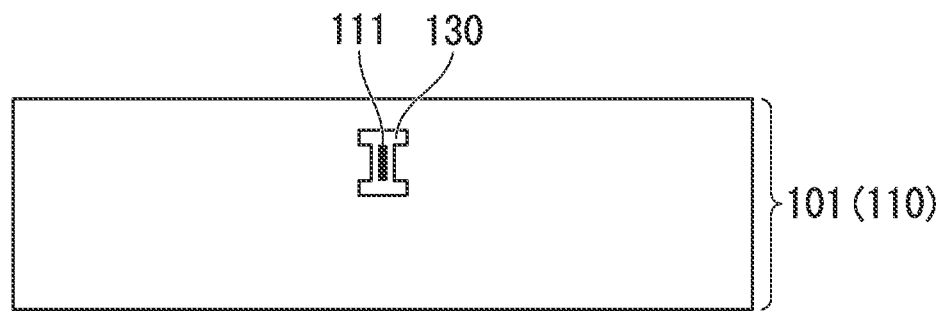
FIG. 3 is a zoomed sectional view around the resonator.

FIG. 1A is a plain view of the resonant pressure sensor 100 in the first embodiment. FIG. 1B is a sectional view of the resonant pressure sensor 100 on the line X1-X1 in the first embodiment. FIGS. 2A, 2B, 2C, and 3 are zoomed sectional views of a main part of the resonant pressure sensor 100. FIGS. 2A, 2B, and 2C illustrate a relation with a resonator and a neutral plane of a diaphragm. FIG. 3 illustrates the resonator. The resonant pressure sensor 100 of the present embodiment includes at least one resonator 111 disposed in a sensor substrate 110. The sensor substrate 110 includes a diaphragm 112.

In FIG. 1A and FIG. 1B, the sensor substrate 110 is made of silicon. The resonator 111 is disposed in the sensor substrate 110 at a first surface (upper surface) 113 of the sensor substrate 110. A second surface (under surface) 114 is ground and polished to reduce the thickness of the sensor substrate 110 to the predetermined thickness of the diaphragm 112, and a depression 115 is formed on a second surface (under surface) 114 of the sensor substrate 110 by etching.

Thickness of the diaphragm 112 is determined by subtracting an etching amount of a depression 121 on the upper side of the sensor substrate 110 and an etching amount of the depression 115 on the underside of the sensor substrate 110 from a thickness of the sensor substrate 110. Therefore, accuracy of the thickness of the diaphragm 112 corresponds to sum of grinding and polishing accuracy of several micrometers and etching accuracy of submicrometer. As the result, the accuracy of the thickness of the diaphragm 112 is accuracy of several micrometers.

Roundness 650 is formed on the depression 115 of the sensor substrate 110 by isotropic etching. Stress of the diaphragm 112 can be deconcentrated by the roundness 650. As the result, pressure capacity of the diaphragm 112 is increased. The depression 115 is formed by plasma etching, wet etching, or the like.

Because there is no need to etch the depression 115 deeply with alkali solution (such as KOH, TMAH, and so on), the diaphragm gap is from submicrometer to several tens of micrometers can be formed accurately and easily. For the reason, the diaphragm gap can be designed flexibly with consideration for foreign substance mixing. Also, the resonant pressure sensor 100 can be designed flexibly with consideration for movement range of the diaphragm 112.

Size of the diaphragm 112 is determined according to the size of the depression 115 of the sensor substrate 110. For example, the shape of the diaphragm 112 is quadrangular, circular, polygonal, or the like. Because the depression 115 of the sensor substrate 110 is a narrow gap of which depth is from submicrometer to several tens of micrometers, different from forming the diaphragm 112 by etching deeply with alkali solution (such as KOH, TMAH, and so on), the size of the depression 115 in a substrate plane direction is unlimited by an etching plane. Therefore, the shape is unlimited by a crystal orientation of the diaphragm 112, and the shape is designed flexibly.

The resonator 111 is disposed on a side of the first surface (upper surface) 113 of the diaphragm 112. Specifically, in the resonant pressure sensor 100 of the present embodiment, the diaphragm 112 includes a projection 120 disposed on the upper surface 113. At least a part of the resonator 111 is included in the projection 120, and the resonator 111 is disposed apart from the neutral plane 118 of the sensor substrate 110. The neutral plane 118 is an intermediate level positioned on a bisector dividing the sensor substrate 110 into two substantially-equal thickness parts. The term of "substantially" as used herein means a reasonable amount of deviation of the modified term such that the end result is not significantly changed. For example, the term can be construed as including a deviation of at least ±5 percent of the modified term if this deviation would not negate the meaning of the word it modifies. For example, a distance between the top of the projection 120 and the neutral plane 118 may be longer by 5 percent.

As shown in FIG. 2A, the projection 120 is disposed on the upper surface 113 of the diaphragm 112. In other words, the projection 120 is disposed on an opposite side of the second surface (under surface) 114 of the diaphragm 112.

The depression 115 is disposed on the under surface 114. When applying pressure P to the diaphragm 112 upward, diaphragm 112 becomes convex upward. In FIG. 2A, the depression 121 is disposed around the projection 120. The neutral plane 118, which is positioned on a bisector dividing the sensor substrate 110 into two substantially-equal thickness parts, is shown with an alternate long and short dash line. Although the pressure P is applied to the diaphragm 112 upward, the pressure P may be applied to the diaphragm 112 downward.

FIG. 2B is a drawing illustrating a relation between the neutral plane of the diaphragm 112 and inner stress. Also, FIG. 2B is a magnified view around the projection 120 shown in FIG. 2A. In FIG. 2B, the neutral plane 118, which is centrally positioned in the thickness direction of the diaphragm 112, is shown with an alternate long and short dash line.

When applying the pressure P to the diaphragm 112 upward, tensile stress is applied to a side of the upper surface 113 of the diaphragm 112. The side of the upper surface 113 is a part of the diaphragm 112 above the neutral plane 118 (boundary plane of which bending stress is 0). On the other hand, compression stress is applied to a side of the under surface 114 of the diaphragm 112. The side of the under surface 114 is a part of the diaphragm 112 under the neutral plane.

In a case where the resonator 111 is disposed in the diaphragm 112 at the side of the upper surface 113, the resonator 111 detects the tensile stress. To the contrary, in a case where the resonator 111 is disposed in the diaphragm 112 at the side of the under surface 114, the resonator 111 detects the compression stress.

Although the resonant pressure sensor 100 can be applicable to the former constitution and the latter constitution, the former constitution (the resonator 111 is disposed in the diaphragm 112 at the side of the upper surface 113) is described mainly below.

As shown in FIG. 2B, in the resonant pressure sensor 100 of the present embodiment, at an area where the projection 120 does not exist, the neutral plane 118 is positioned at a depth of one-half of thickness A of the diaphragm 112. On the other hand, at an area where the projection 120 exists, the neutral plane 118 curves upward to the projection 120. As is the case with a conventional diaphragm, the tensile stress is applied to a part of the diaphragm 112 above the neutral plane, and the compression stress is applied to a part of the diaphragm 112 under the neutral plane. However, in the present embodiment, even if the neutral plane 118 curves upward to the projection 120, the resonator 111 can be disposed at a position apart from the neutral plane 118.

FIG. 2C is a drawing illustrating a relation between the neutral plane 118 of the diaphragm 112 and the resonator 111. Ta, Tb, and Tc (Ta>Tb>Tc) indicate thicknesses of the diaphragm 112. The neutral planes 118a, 118b, and 118c correspond to the thicknesses Ta, Tb, and Tc respectively.

As shown in FIG. 2C, if the diaphragm 112 is thick enough (Ta corresponds to the thickness of the conventional diaphragm), the resonator 111a can be disposed apart from the neutral plane 118 without forming the projection 120. To the contrary, if the diaphragm 112 is thin (Tb), sensitivity of the resonator 111a is reduced because the resonator 111a is disposed on the neutral plane 118b.

In the present embodiment, the projection 120 is disposed on the diaphragm 112, the resonator 111b is disposed in an area apart from the neutral plane 118b, and the projection 120 includes at least a part of the area in which the resonator 111b is disposed. Therefore, it is possible that the resonator 111*b* is disposed apart from the neutral plane 118*b*. By the constitution, the diaphragm 112 can be thinner, and the sensitivity of the resonator 111*b* can be improved. In a case of the thickness Tb, a size (height) of the projection 120 is determined so that the projection 120 includes at least a part of the resonator 111*b*.

However, if the diaphragm 112 is thinner (Tc), it is difficult that the resonator 111*b* is disposed apart from the neutral plane 118*c*. In this case, the resonator 111*c* is disposed apart from the neutral plane 118*c*, and the projection 120 encloses the resonator 111*c* entirely. By the constitution, the resonator 111*c* can be disposed apart from the neutral plane 118*c* and disposed in the projection 120. As the result, the diaphragm 112 can be thinner, and the sensitivity of the resonator 111*b* can be more improved. In a case of the thickness Tc, a size (height) of the projection 120 is determined so that the projection 120 encloses the resonator 111*c* entirely.

As shown in FIGS. 1A and 1B, in the resonant pressure sensor 100, different thickness areas (the projection 120 and the depression 121) are formed in the diaphragm 112 of the sensor substrate 110. At least a part of the resonator 111 or entire resonator 111 is included in a thick-part (the projection 120) of the diaphragm 112. Two resonators 111 are disposed in the projection 120 of the diaphragm 112 in line alignment. Wirings (not shown in FIG. 1A) are disposed in a same layer with the resonators 111. A number of the resonators 111 is not limited to two.

FIG. 3 is a magnified view around the resonator 111 of the resonant pressure sensor 100 shown in FIG. 1B. As shown in FIG. 3, the resonator 111 is disposed in a vacuum chamber 130. Tensile stress is applied to the resonator 111.

As shown in FIG. 2B, the resonator 111 is disposed in the projection 120 of the diaphragm 112 so that the resonator 111 can be disposed apart from the neutral plane 118 of the diaphragm 112 regardless of the thickness of the diaphragm 112. When designing the diaphragm 112 to improve the sensitivity of the resonator 111, there is no need to consider reduction of the sensitivity caused by the neutral plane 118 of the diaphragm 112. Therefore, the diaphragm 112 can be designed with two parameters which are the thickness of the diaphragm 112 and the diameter of the diaphragm 112. As described above, the sensitivity of the resonator 111 can be improved by making the diaphragm 112 thinner, and the resonant pressure sensor 100 can detect micro-pressure. Also, the constitution of the present embodiment can (1) improve the pressure capacity of the diaphragm 112, and (2) make chip size smaller. These are problems caused by making the diaphragm 112 thinner.

Figure 4:
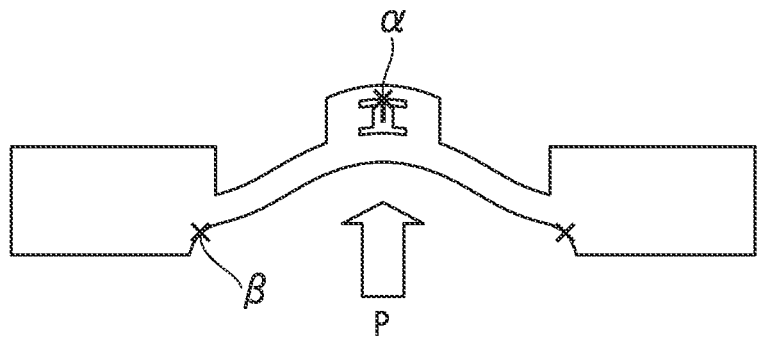
FIG. 4 is a drawing illustrating stress concentration to the diaphragm.

With respect to (1) improve the pressure capacity of the diaphragm 112, if the diaphragm 112 is made thinner, as shown in FIG. 4, stress concentrates on a part α of a shell and corners β of the diaphragm 112. Breaking of the diaphragm 112 is to begin from the positions α and β. To prevent the problem, the shell is made thicker, or curvatures are made on the corners β of the diaphragm 112. By the constitution, the stress concentration applied to the diaphragm 112 can be suppressed, and the pressure capacity of the diaphragm 112 can be increased. In the constitution shown in FIGS. 2A, 2B, and 2C, even if the shell is made thicker, a distance between the resonator 111 and the neutral plane 118 of the diaphragm 112 does not change. Therefore, reduction of the sensitivity of the resonator 111 can be suppressed.

With respect to (2) make chip size smaller, in general, as the diaphragm 112 is formed by etching deeply with alkali solution, vertical shape cannot be formed, but sloping shape is formed. For the reason, the size of the diaphragm 112 is different from its opening. Specifically, if the diaphragm 112 is thinner, the chip size is larger. However, as with the present embodiment, if the diaphragm 112 is formed by grinding, polishing, and etching, the size of the diaphragm 112 is not different from its opening. Therefore, the chip size can be smaller.

As described above, by the constitution of the present embodiment, the diaphragm 112 can be formed stably and reproducibly to be thin, small, high accuracy, and high pressure capacity. Therefore, the present embodiment has a cost advantage.

FIGS. 5A, 5B, 6A, 6B, 7A, 7B, 8A, and 8B are drawings illustrating other embodiments of the shapes of the projection 120 and the depression 121. FIGS. 5A, 6A, 7A, and 8A are plain views of the resonant pressure sensor 100. FIGS. 5B, 6B, 7B, and 8B are sectional views of the resonant pressure sensor 100. The shapes of the projection 120 and the depression 121 are not limited to the shapes shown in FIG. 1. For example, the shapes may be implemented with the shapes shown in FIGS. 5A, 5B, 6A, 6B, 7A, 7B, 8A, and 8B.

Figure 5A:
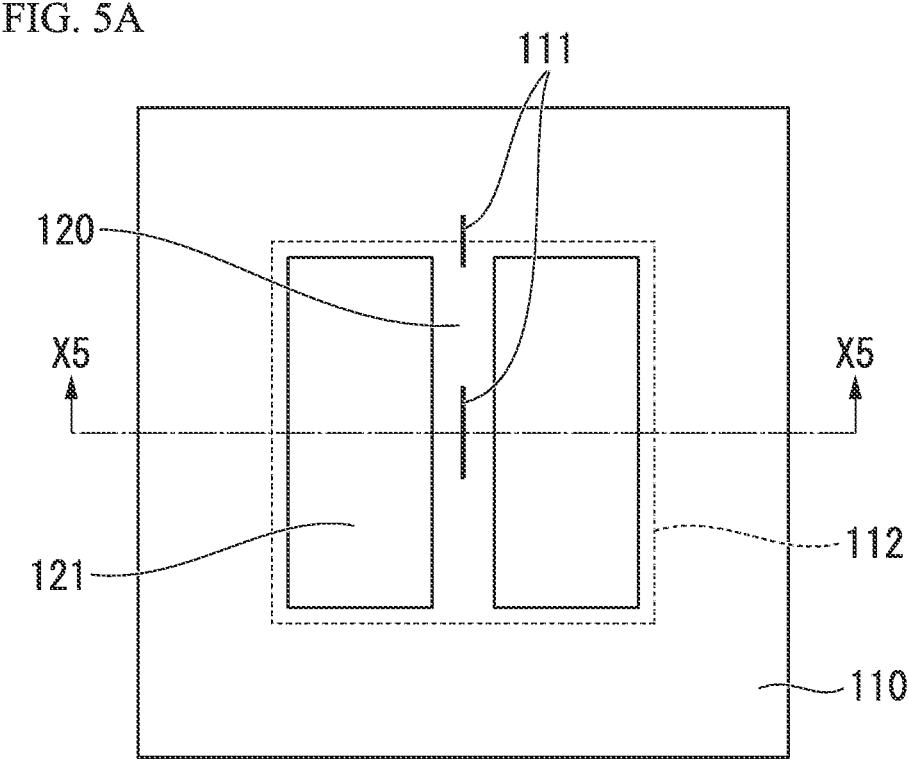
FIGS. 5A and 5B are drawings illustrating other example of shapes of the projection and the depression.
Figure 5B:
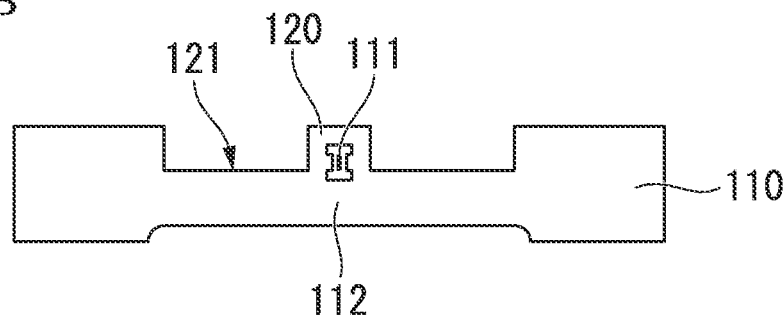

FIG. 5A is a plain view of the resonant pressure sensor 100. FIG. 5B is a sectional view on the line X5-X5 in FIG. 5A. In FIG. 5A and FIG. 5B, the depression 121 is quadrangular, and the thick-part (the projection 120) of the diaphragm 112 is I-line-shaped. Also, the depression 121 is disposed at both sides of the projection 120. The projection 120 includes the resonator 111 disposed in a center of the diaphragm 112 and the resonator 111 disposed in an outer circumference of the diaphragm 112.

Figure 6A:
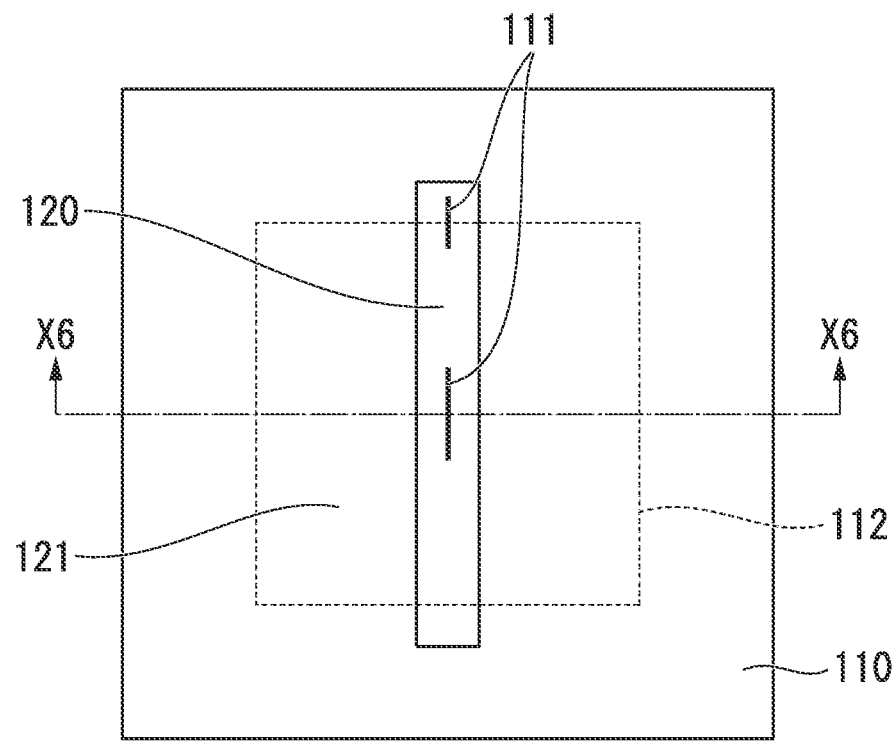
FIGS. 6A and 6B are drawings illustrating other example of shapes of the projection and the depression.
Figure 6B:
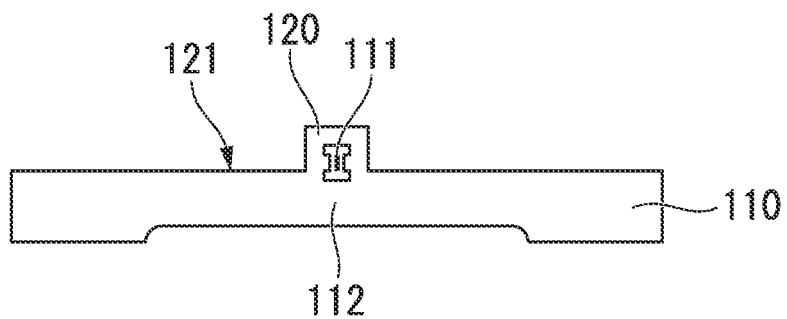

FIG. 6A is a plain view of the resonant pressure sensor 100. FIG. 6B is a sectional view on the line X6-X6 in FIG. 6A. In FIG. 6A and FIG. 6B, only the I-line-shaped thick-part (the projection 120) is disposed on the upper surface of the sensor substrate 110. The other constitutions are same with FIG. 5A and FIG. 5B. The I-line-shaped projection 120 includes the resonator 111 disposed in a center of the diaphragm 112 and the resonator 111 disposed in an outer circumference of the diaphragm 112.

Figure 7A:
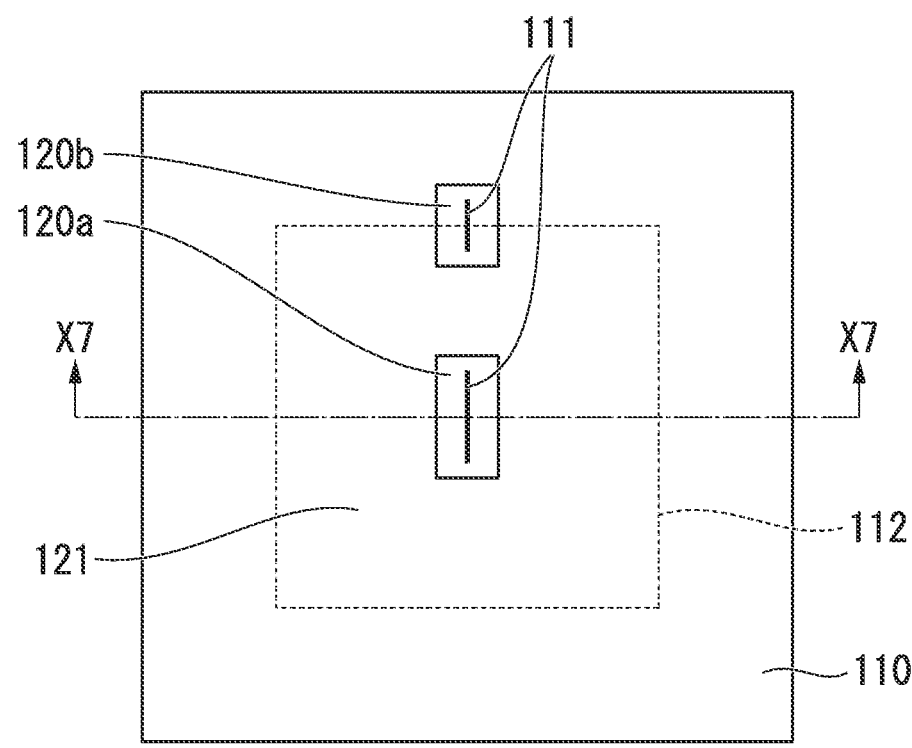
FIGS. 7A and 7B are drawings illustrating other example of shapes of the projection and the depression.
Figure 7B:
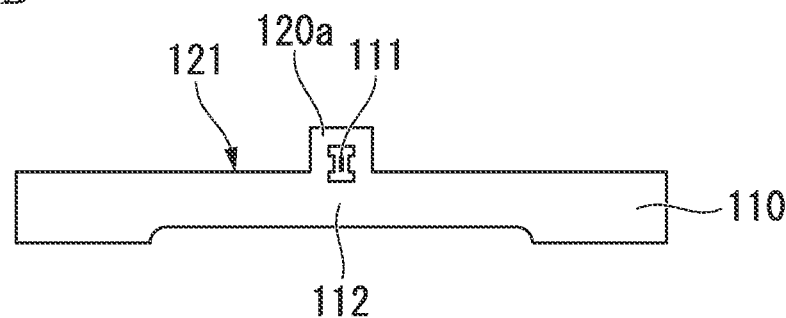

FIG. 7A is a plain view of the resonant pressure sensor 100. FIG. 7B is a sectional view on the line X7-X7 in FIG. 7A. In FIG. 7A and FIG. 7B, the I-line-shaped thick-part (the projection 120) is divided into two parts 120*a* (first projection) and 120*b* (second projection). The two parts 120*a* and 120*b* are separated each other and disposed on the upper surface of the sensor substrate 110. The other constitutions are same with FIG. 6A and FIG. 6B. The part 120*a* includes the resonator 111 disposed in a center of the diaphragm 112. The part 120*b* includes the resonator 111 disposed in an outer circumference of the diaphragm 112. In FIG. 7A and FIG. 7B, the projection 120 is locally-shaped to include only areas where the resonators 111 are disposed.

In the examples shown in FIGS. 5A, 5B, 6A, 6B, 7A, and 7B, the shape of the diaphragm 112 is quadrangular, but the shape is not limited thereto. For example, the shape of the diaphragm 112 may be circular as shown in FIG. 1.

Figure 8A:
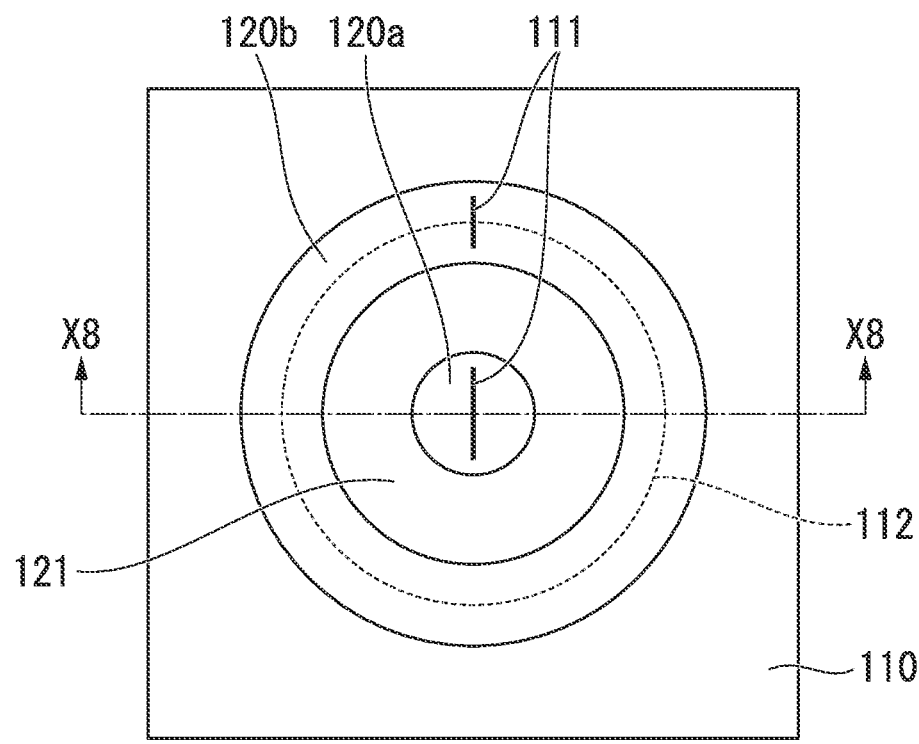
FIGS. 8A and 8B are drawings illustrating other example of shapes of the projection and the depression.
Figure 8B:
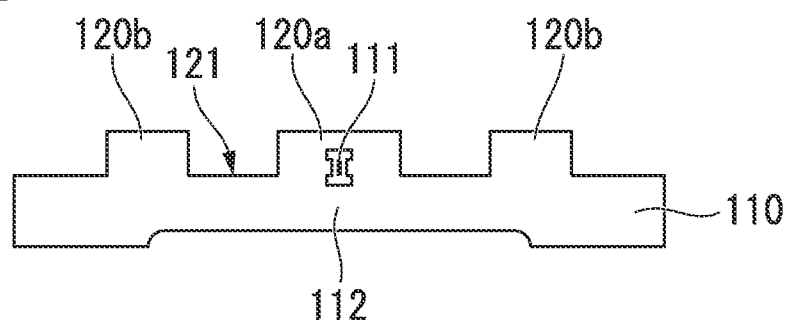

FIG. 8A is a plain view of the resonant pressure sensor 100. FIG. 8B is a sectional view on the line X8-X8 in FIG. 8A. In FIG. 8A and FIG. 8B, the projection 120 is divided into two parts 120*a* (first projection) and 120*b* (second projection). The parts 120*a* and 120*b* are concentric with each other. The part 120*a* includes the resonator 111 disposed in a center of the diaphragm 112. The part 120*b* includes the resonator 111 disposed in an outer circumference of the diaphragm 112. By the constitution shown in FIG. 8A and FIG. 8B, stress distribution can be uniformed in the circular diaphragm 112. The shape of the two parts 120a and 120b are concentric circles, but the shape is not limited thereto. For example, the shape of the two parts 120a and 120b may be quadrangular or polygonal.

Figure 9A:
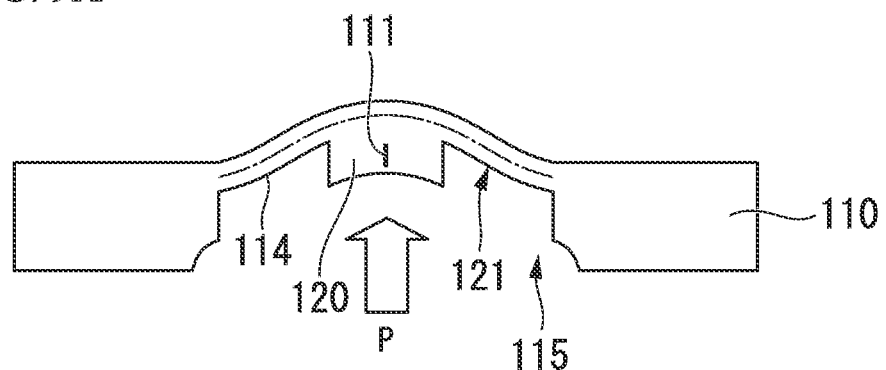
FIGS. 9A and 9B are a drawing illustrating other example of disposition of the projection.
Figure 9B:
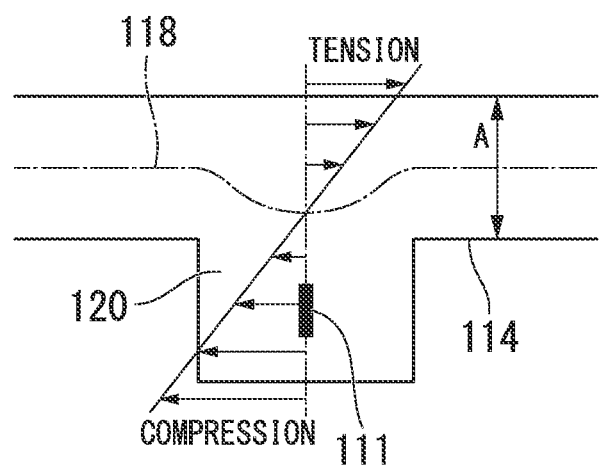

In the embodiment described above, the projection 120 is disposed on the upper surface 113 of the sensor substrate 110. The upper surface 113 is a surface which becomes convex upward when applying the pressure P to the diaphragm 112 upward. In other words, the projection 120 is disposed on an opposite side of the depression 115. But, the position of the projection 120 is not limited thereto. For example, as shown in FIG. 9A and FIG. 9B, the projection 120 may be disposed on the under surface 114 of the sensor substrate 110. The under surface 114 is a surface which becomes concave when applying the pressure P to the diaphragm 112 upward. In other words, the projection 120 may be disposed on a same side of the depression 115.

FIGS. 10A, 10B, 10C, 10D, 10E, 10F, and 10G are drawings for describing a manufacturing method of the resonant pressure sensor 100. The manufacturing method of the resonant pressure sensor 100 includes a process of forming the resonator 111 and a process of forming the projection 120 on the first surface (upper surface) 113 of the sensor substrate 110, so that the projection 120 includes at least a part of the resonator 111.

Figure 10A:
FIGS. 10A, 10B, 10C, 10D, 10E, 10F, and 10G are drawings illustrating an example of manufacturing process of the resonant pressure sensor.
Figure 10B:
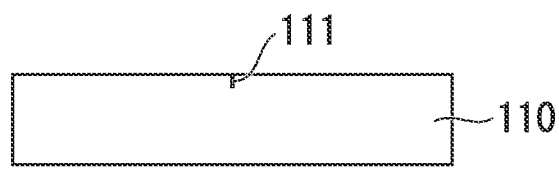

FIG. 10A is a drawing for describing a process of manufacturing the resonant pressure sensor 100. First, as shown in FIG. 10A, a silicon substrate 101 to become the sensor substrate 110 is prepared. Next, as shown in FIG. 10B, the resonator 111 is formed in the sensor substrate 110 at a side of the upper surface 113. At this time, the resonator 111 is formed so that the projection 120 formed in a post-process includes at least a part of the resonator 111.

For example, manufacturing processes of the resonator 111 are described in Japanese Examined Patent Application Publication No. 7-104217 and Japanese Unexamined Patent Application Publication No. 2013-246083. If the deformation of the diaphragm 112 can be measured, the shape of the resonator 111 is not limited thereto.

Figure 10C:
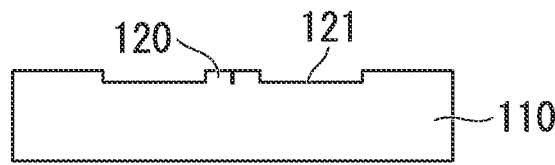

FIG. 10C is a drawing for describing a process of forming the projection 120 of the sensor substrate 110. The depression 121 is formed by etching process on the first surface (upper surface) of the sensor substrate 110 to form the diaphragm 112. By this process, the projection 120 is formed on the first surface (upper surface) of the sensor substrate 110. An aperture is formed on a sensor surface by photolithography with resist material. The aperture is etched by a method such as dry etching. After etching, the resist material is removed, and the depression 121 is formed on the sensor substrate 110. By the process, the projection 120 is formed in an area which is not etched. As described above, the resonator 111 is formed in the sensor substrate 110 at the side of the first surface (upper surface) 113. Also, at least a part of the resonator 111 is included in the projection 120.

Figure 10D:
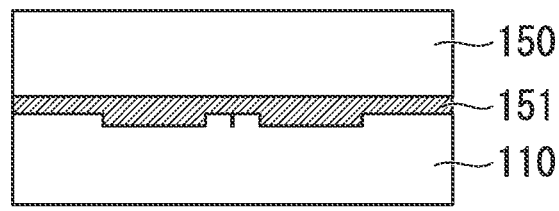

FIG. 10D is a drawing for describing a bonding process of the sensor substrate 110. The first surface (upper surface) of the sensor substrate 110 is bonded to a support substrate 150 with a bonding material 151. For example, the bonding material 151 is thermoplastic adhesive, dissolved-solution type adhesive, UV adhesive, a double-faced tape, WAX, and so on.

Because the thickness variation in bonding process affects accuracy of following grinding and polishing processes, there is a need to control TTV (Total Thickness Variation; difference between a minimum thickness of the wafer and a maximum thickness of the wafer) and warpage. As the support substrate 150, sapphire, glass, silicon, or the like are used. The shape of the support substrate 150 is not limited thereto.

Figure 10E:
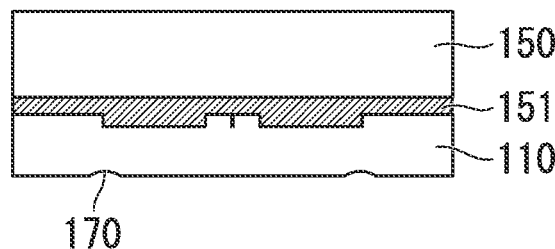

FIG. 10E is a drawing for describing a grinding and polishing process on the under surface 114 of the sensor substrate 110. The sensor substrate 110 bonded to the support substrate 150 is grinded and polished on the second surface (under surface) 114 to achieve a predetermined thickness. At this time, there is a need to polish the under surface 114 until crushed layers and grinding marks are deleted. The diaphragm 112 may be formed by alkali etching until the thickness of the diaphragm 112 becomes a predetermined thickness. Also, as shown in FIG. 1A and FIG. 1B, the diaphragm 112 may be formed with high accuracy by polishing the under surface 114 of the sensor substrate 110 to the extent of the thickness of the diaphragm 112. In the grinding and polishing process, the sensor substrate 110 is grinded and polished in a state where the sensor substrate 110 is bonded to the support substrate 150 with the bonding material 151. Therefore, even if the sensor substrate 110 becomes thinner, the sensor substrate does not break.

Figure 11A:
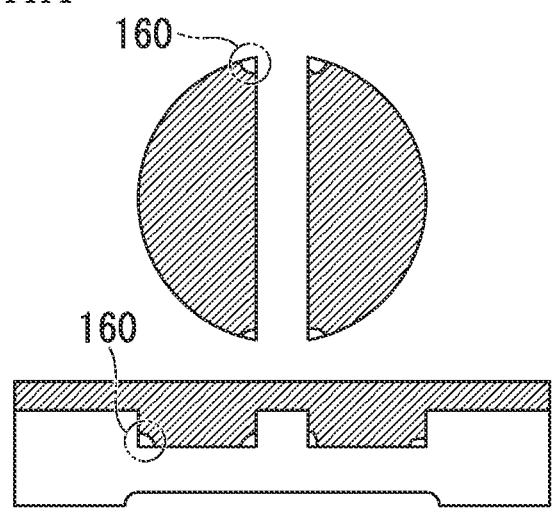
FIG. 11A is a drawing illustrating voids formed in the depression.
Figure 11B:
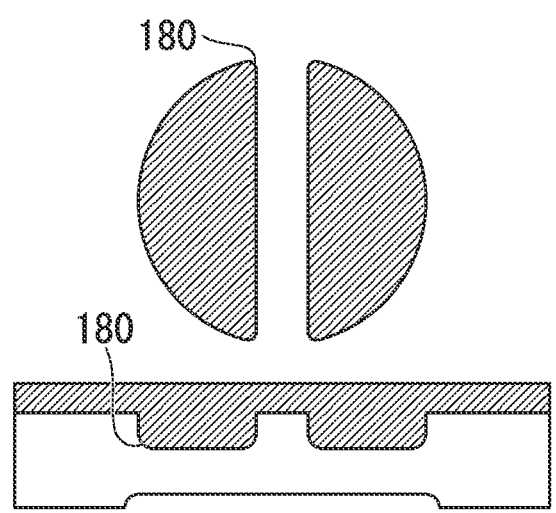
FIG. 11B is a drawing illustrating the diaphragm has rounded corners.

As shown in FIG. 11A, there is the possibility that voids 160 are formed in the high step structure. Also, as shown in FIG. 10E, there is the possibility that surface saggings 170 are formed on the under surface 114 of the sensor substrate 110. For the reason, as shown in FIG. 11B, it is important that the diaphragm 112 has rounded corners. For example, curvatures 180 are formed on the pattern of the depression 121 and the corner and the edge of the bottom surface of the depression 121, and the depression 115 is formed to be larger than the depression 121.

Figure 10F:
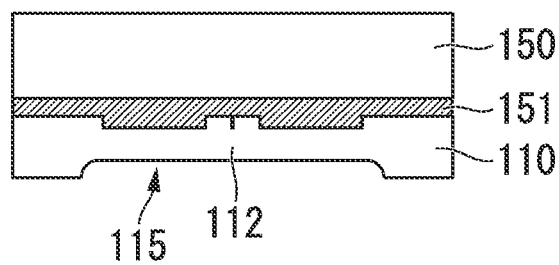

FIG. 10F is a drawing for describing a process of forming patterns on the under surface 114 of the sensor substrate 110. An aperture is formed on a sensor surface by photolithography with resist material. The aperture is etched by a method such as dry etching. After etching, the resist material is removed, and the depression 115 is formed on the under surface 114 of the sensor substrate 110. By the process, the diaphragm 112 is formed.

By these processes, the shape of the diaphragm 112 (for example, the diaphragm 112 is circular and the curvatures are formed on the edge of the diaphragm 112) can be formed regardless of the crystal orientation. Therefore, even if the diaphragm 112 is formed to be thin, the pressure capacity of the diaphragm 112 can be increased.

The convex patterns on the first surface are transferred as the concavo-convex patterns on a second surface (under surface) of the thin polished sensor substrate 110. By the concavo-convex patterns on the polished surface, gaps are formed on a bonding surface, and bonding-deformation is generated. For the reason, the sensor surface (upper surface) of the sensor substrate 110 should be flat.

When grinding and polishing the sensor substrate 110 to less than 200 micrometers thick, the wafer is broken easily. However, in the case that the sensor substrate 110 is bonded to the support substrate 150, the sensor substrate 110 can be ground and polished to less than several tens of micrometers thick without being broken.

After grinding and polishing, a washing process (not shown in the figures) should be performed to clean the polished surface. The washing process is such as physical washing ($CO_2$ washing, or twin-fluid washing) or acid-alkaline washing. There is a need that the washing process is performed at temperatures less than the temperature at which the bonding material is thermally decomposed. Also, there is a need that the bonding material is tolerant of the solution which used in the manufacturing process.

Figure 10G:
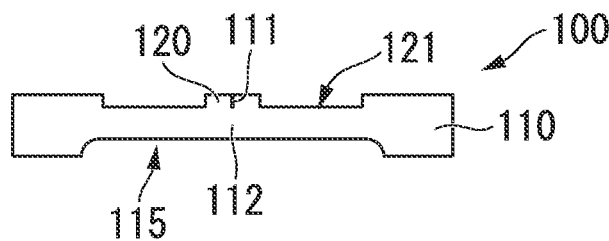

FIG. 10G is a drawing for describing a process of removing the support substrate 150. After the sensor substrate 110 is ground and polished to be thin, the support substrate 150 is removed from the sensor substrate 110. The process of removing the support substrate 150 is different according to types of the bonding material. For example, in a case of a thermoplastic adhesive, the support substrate 150 is removed by raising the temperature of the adhesive and sliding the support substrate 150.

In a case of a thermal-ablation-type double-faced tape, the support substrate 150 is easily removed only by raising the temperature. After removing, the sensor surface should be washed by spin washing, solution immersion, or the like to remove bonding material residue. By these processes, the resonant pressure sensor 100 is completed.

In the resonant pressure sensor 100, the projection 120 is disposed on the diaphragm 112, the resonator 111 is disposed in an area apart from the neutral plane 118 positioned on a bisector dividing the sensor substrate 110 into two substantially-equal thickness parts, and the projection 120 includes at least a part of the area in which the resonator 111 is disposed. By the constitution, the resonator 111 can be disposed apart from the neutral plane 118 of the diaphragm 112 regardless of wide variety of the thickness of the diaphragm 112. Therefore, the diaphragm 112 can be thinner, and the sensitivity of the resonator 111b can be improved.

Second Embodiment

Figure 12A:
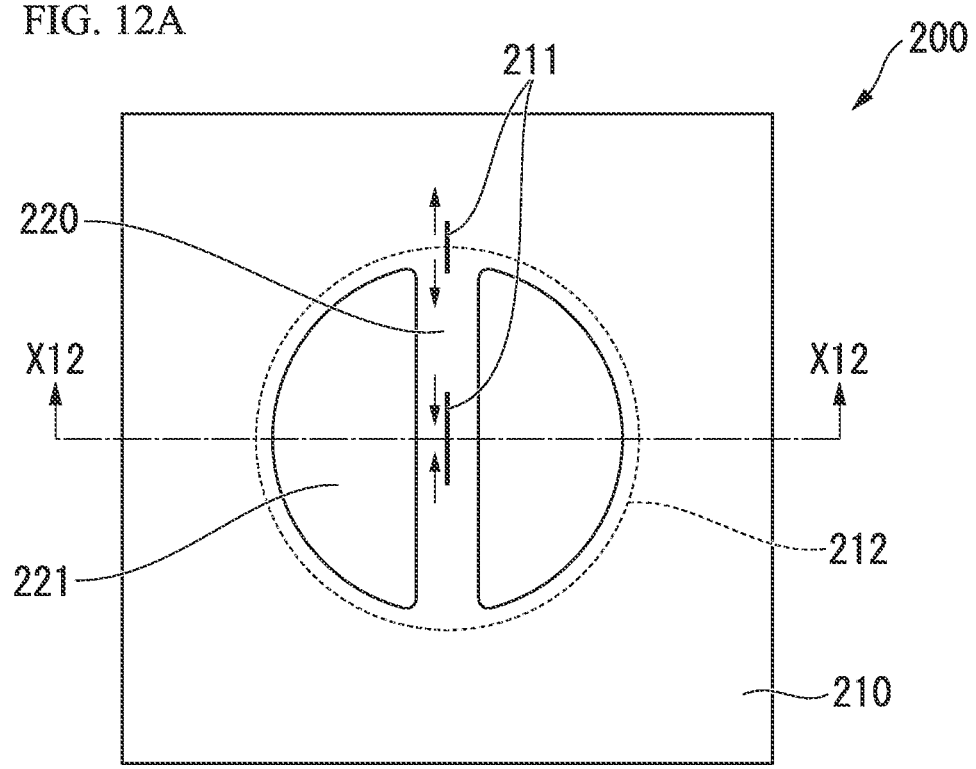
FIG. 12A is a plane view illustrating the resonant pressure sensor of the second embodiment.
Figure 12B:
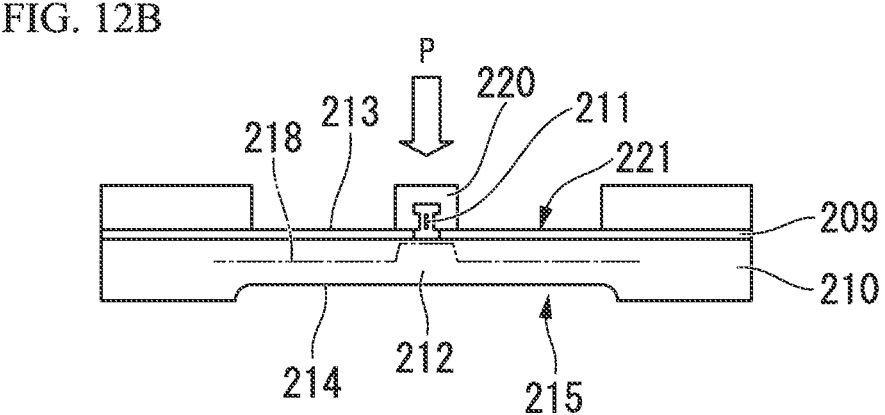
FIG. 12B is a sectional view illustrating the resonant pressure sensor of the second embodiment.
Figure 13A:
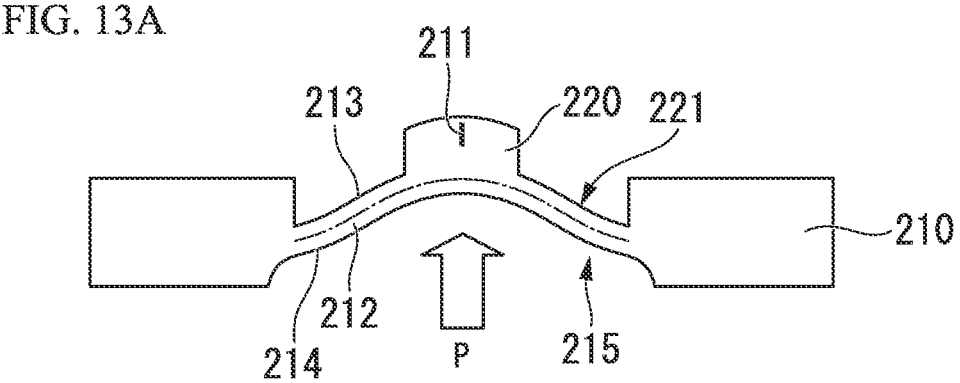
FIGS. 13A, 13B, and 13C are drawings illustrating a relation between the resonator and the neutral plane (intermediate level) of the diaphragm.
Figure 13B:
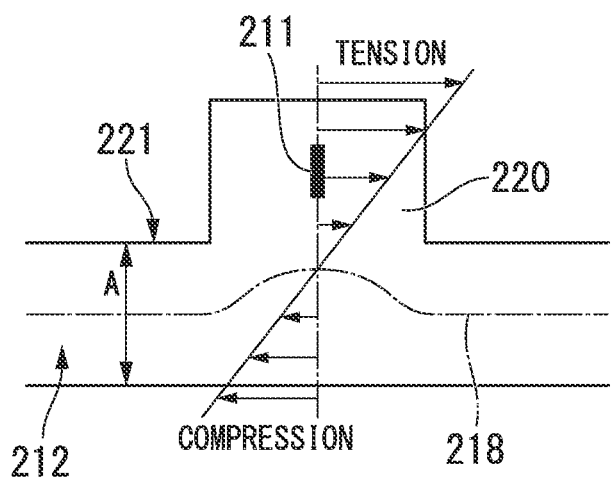
Figure 13C:
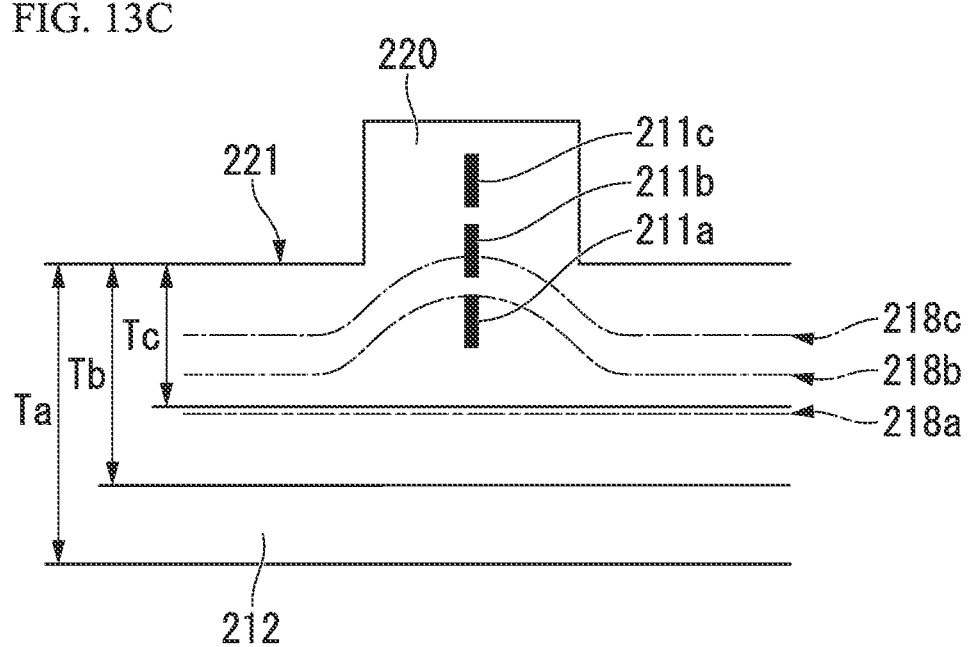
Figure 14:
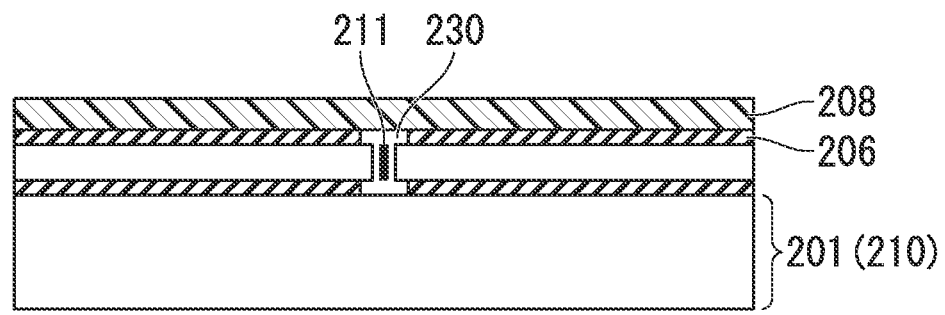
FIG. 14 is a zoomed sectional view around the resonator.

FIG. 12A is a plain view of the resonant pressure sensor 200 in the second embodiment. FIG. 12B is a sectional view of the resonant pressure sensor 200 on the line X12-X12 in the second embodiment. FIGS. 13A, 13B, 13C, and 14 are zoomed sectional views of a main part of the resonant pressure sensor 200. FIGS. 13A, 13B, and 13C illustrate a relation with a resonator and a neutral plane of a diaphragm. FIG. 14 illustrates the resonator. The resonant pressure sensor 200 of the present embodiment includes at least one resonator 211 disposed in a sensor substrate 210. The sensor substrate 210 includes a diaphragm 212.

In the resonant pressure sensor 200, the sensor substrate 210 is an SOI substrate. In the SOI substrate, a silicon dioxide layer ($SiO_2$) 209 is disposed between a silicon (Si) substrate and a superficial silicon (Si) layer. Using the SOI substrate as the sensor substrate 210, the at least one resonator 211 is disposed in at least one projection 220, and the resonator 211 is isolated from the neutral plane 218 by the silicon dioxide layer 209. The thickness of the projection 220 affecting the sensitivity of the resonator 211 is a constant distance between the upper surface of the silicon dioxide layer 209 and the upper surface of the projection 220. Compared to a case where there is no silicon dioxide layer, the thickness can be controlled to be uniformed. Therefore, variation of the sensitivity of the resonator 211 can be more suppressed.

In FIG. 12A and FIG. 12B, the resonator 211 is disposed in the sensor substrate 210 at a first surface (upper surface) 213 of the sensor substrate 210. The second surface (under surface) 214 is ground and polished to reduce the thickness of the sensor substrate 210 to the predetermined thickness of the diaphragm 212, and a depression 215 is formed on a second surface (under surface) 214 of the sensor substrate 110.

Thickness of the diaphragm 212 is determined by subtracting an etching amount of a depression 221 on the upper surface 213 of the sensor substrate 210 and an etching amount of the depression 215 on the under surface 214 of the sensor substrate 210 from a thickness of the sensor substrate 210. Therefore, accuracy of the thickness of the diaphragm 212 corresponds to sum of grinding and polishing accuracy of several micrometers and etching accuracy of submicrometer. As the result, the accuracy of the thickness of the diaphragm 212 is accuracy of several micrometers.

The sensor substrate 210 is an SOI substrate where the silicon dioxide layer ($SiO_2$) is disposed between the silicon (Si) substrate and the superficial silicon (Si) layer. The depression 215 is formed by plasma etching, wet etching, or the like.

Because there is no need to etch the depression 215 deeply with alkali solution (such as KOH, TMAH, and so on), the diaphragm gap is from submicrometer to several tens of micrometers can be formed accurately and easily. For the reason, the diaphragm gap can be designed flexibly with consideration for foreign substance mixing. Also, the resonant pressure sensor 200 can be designed flexibly with consideration for movement range of the diaphragm 212.

Size of the diaphragm 212 is determined according to the size of the depression 215 of the sensor substrate 210. For example, the shape of the diaphragm 212 is quadrangular, circular, polygonal, or the like. Because the depression 215 of the sensor substrate 210 is a narrow gap of which depth is from submicrometer to several tens of micrometers, different from forming the diaphragm 212 by etching deeply with alkali solution (such as KOH, TMAH, and so on), the size of the depression 215 in a substrate plane direction is unlimited by an etching plane. Therefore, the shape is unlimited by a crystal orientation of the diaphragm 212, and the shape is designed flexibly.

The resonator 211 is disposed on a side of the first surface (upper surface) 213 of the diaphragm 212. Specifically, in the resonant pressure sensor 200 of the present embodiment, the diaphragm 212 includes a projection 220 disposed on the upper surface 213. At least a part of the resonator 211 is included in the projection 220, and the resonator 211 is disposed apart from the neutral plane 218 of the sensor substrate 210. The neutral plane 218 is an intermediate level positioned on a bisector dividing the sensor substrate 210 into two substantially-equal thickness parts. The term of "substantially" as used herein means a reasonable amount of deviation of the modified term such that the end result is not significantly changed. For example, the term can be construed as including a deviation of at least ±5 percent of the modified term if this deviation would not negate the meaning of the word it modifies. For example, a distance between the top of the projection 220 and the neutral plane 218 may be longer by 5 percent.

As shown in FIG. 13A, the projection 220 is disposed on the upper surface 213 of the diaphragm 212. In other words, the projection 220 is disposed on an opposite side of the second surface (under surface) 214 of the diaphragm 212. The depression 215 is disposed on the under surface 214. When applying pressure P to the diaphragm 212 upward, diaphragm 212 becomes convex upward. In FIG. 13A, the depression 221 is disposed around the projection 220. The neutral plane 218, which is centrally positioned in the thickness direction of the diaphragm 212, is shown with an alternate long and short dash line. Although the pressure P is applied to the diaphragm 212 upward, the pressure P may be applied to the diaphragm 212 downward.

FIG. 13B is a drawing illustrating a relation between the neutral plane of the diaphragm 212 and inner stress. Also, FIG. 13B is a magnified view around the projection 220 shown in FIG. 13A. In FIG. 13B, the neutral plane 218, which is centrally positioned in the thickness direction of the diaphragm 212, is shown with an alternate long and short dash line.

When applying the pressure P to the diaphragm 212 upward, tensile stress is applied to a side of the upper surface 213 of the diaphragm 212. The side of the upper surface 213 is a part of the diaphragm 212 above the neutral plane 218 (boundary plane of which bending stress is 0). On the other hand, compression stress is applied to a side of the under surface 214 of the diaphragm 212. The side of the under surface 214 is a part of the diaphragm 212 under the neutral plane 218.

In a case where the resonator 211 is disposed in the diaphragm 212 at the side of the upper surface 213, the resonator 211 detects the tensile stress. To the contrary, in a case where the resonator 211 is disposed in the diaphragm 212 at the side of the under surface 214, the resonator 211 detects the compression stress.

Although the resonant pressure sensor 200 can be applicable to the former constitution and the latter constitution, the former constitution (the resonator 211 is disposed in the diaphragm 212 at the side of the upper surface 213) is described mainly below.

As shown in FIG. 13B, in the resonant pressure sensor 200 of the present embodiment, at an area where the projection 220 does not exist, the neutral plane 218 is positioned at a depth of one-half of thickness A of the diaphragm 212. On the other hand, at an area where the projection 220 exists, the neutral plane 218 curves upward to the projection 220. As is the case with a conventional diaphragm, the tensile stress is applied to a part of the diaphragm 212 above the neutral plane, and the compression stress is applied to a part of the diaphragm 212 under the neutral plane. However, in the present embodiment, even if the neutral plane 218 curves upward to the projection 220, the resonator 211 can be disposed at a position apart from the neutral plane 218. FIG. 13C is a drawing illustrating a relation between the neutral plane 218 of the diaphragm 212 and the resonator 211. Ta, Tb, and Tc (Ta>Tb>Tc) indicate thicknesses of the diaphragm 212. The neutral planes 218a, 218b, and 218c correspond to the thicknesses Ta, Tb, and Tc respectively.

As shown in FIG. 13C, if the diaphragm 212 is thick enough (Ta corresponds to the thickness of the conventional diaphragm), the resonator 211a can be disposed apart from the neutral plane 218 without forming the projection 220. To the contrary, if the diaphragm 212 is thin (Tb), sensitivity of the resonator 211a is reduced because the resonator 211a is disposed on the neutral plane 218b.

In the present embodiment, the projection 220 is disposed on the diaphragm 212, the resonator 211b is disposed apart from the neutral plane 218b, and the projection 220 includes at least a part of the resonator 211b. Therefore, it is possible that the resonator 211b is disposed apart from the neutral plane 218b. By the constitution, the diaphragm 212 can be thinner, and the sensitivity of the resonator 211b can be improved. In a case of the thickness Tb, a size (height) of the projection 220 is determined so that the projection 220 includes at least a part of the resonator 211b.

However, if the diaphragm 212 is thinner (Tc), it is difficult that the resonator 211b is disposed apart from the neutral plane 218c. In this case, the resonator 211c is disposed apart from the neutral plane 218c, and the projection 220 encloses the resonator 211c entirely. By the constitution, the resonator 211c can be disposed apart from the neutral plane 218c and disposed in the projection 220. As the result, the diaphragm 212 can be thinner, and the sensitivity of the resonator 211b can be more improved. In a case of the thickness Tc, a size (height) of the projection 220 is determined so that the projection 220 encloses the resonator 211c entirely.

As shown in FIGS. 12A and 12B, in the resonant pressure sensor 200, different thickness areas (the projection 220 and the depression 221) are formed in the diaphragm 212 of the sensor substrate 210. At least a part of the resonator 211 or entire resonator 211 is included in a thick-part (the projection 220) of the diaphragm 212. The neutral plane (intermediate level) 218 is positioned in the silicon substrate. The resonator 211 is disposed in the projection 220 included in the superficial silicon layer. Two resonators 211 are disposed in the projection 220 of the diaphragm 212 in line alignment. Wirings (not shown in FIG. 12A) are disposed in a same layer with the resonators 211. A number of the resonators 211 is not limited to two.

FIG. 14 is a magnified view around the resonator 211 of the resonant pressure sensor 200 shown in FIG. 12B. As shown in FIG. 14, the resonator 211 is disposed in a vacuum chamber 230. Tensile stress is applied to the resonator 211.

As shown in FIG. 13B, the resonator 211 is disposed in the projection 220 of the diaphragm 212 so that the resonator 211 can be disposed apart from the neutral plane 218 of the diaphragm 212 regardless of the thickness of the diaphragm 212. When designing the diaphragm 212 to improve the sensitivity of the resonator 211, there is no need to consider reduction of the sensitivity caused by the neutral plane 218 of the diaphragm 212. Therefore, the diaphragm 212 can be designed with two parameters which are the thickness of the diaphragm 212 and the diameter of the diaphragm 212. As described above, the sensitivity of the resonator 211 can be improved by making the diaphragm 212 thinner, and the resonant pressure sensor 200 can detect micro-pressure.

Also, the constitution of the present embodiment can (1) improve the pressure capacity of the diaphragm 212, (2) make chip size smaller, and (3) suppress variability of the thickness of the diaphragm 212. These are problems caused by making the diaphragm 212 thinner.

Figure 15:
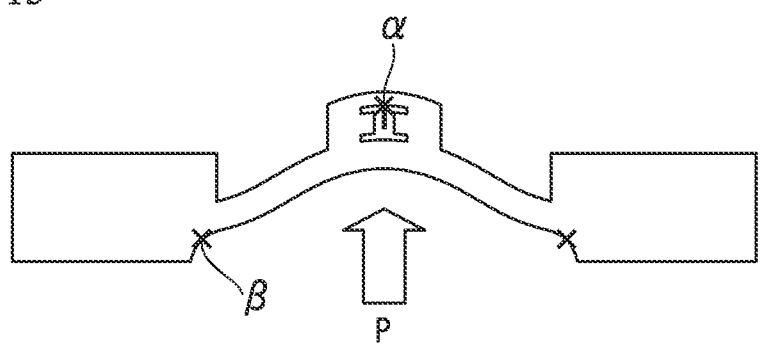
FIG. 15 is a drawing illustrating stress concentration to the diaphragm.

With respect to (1) improve the pressure capacity of the diaphragm 212, if the diaphragm 212 is made thinner, as shown in FIG. 15, stress concentrates on a part α of a shell and corners β of the diaphragm 212. Breaking of the diaphragm 212 is to begin from the positions α and β. To prevent the problem, the shell is made thicker, or curvatures are made on the corners β of the diaphragm 212. By the constitution, the stress concentration applied to the diaphragm 212 can be suppressed, and the pressure capacity of the diaphragm 212 can be increased. In the constitution shown in FIGS. 13A, 13B, and 13C, even if the shell is made thicker, a distance between the resonator 211 and the neutral plane 218 of the diaphragm 212 does not change. Therefore, reduction of the sensitivity of the resonator 211 can be suppressed.

With respect to (2) make chip size smaller, in general, as the diaphragm 212 is formed by etching deeply with alkali solution, vertical shape cannot be formed, but sloping shape is formed. For the reason, the size of the diaphragm 212 is different from its opening. Specifically, if the diaphragm 212 is thinner, the chip size is larger. However, as with the present embodiment, if the diaphragm 212 is formed by grinding, polishing, and etching, the size of the diaphragm 212 is not different from its opening. Therefore, the chip size can be smaller.

With respect to (3) suppress variation of the thickness of the diaphragm 212, when the different thickness areas (the projection 220 and the depression 221) are formed, the silicon dioxide layer of the SOI substrate stops the etching as an etching stop layer, and the under surface 214 of the sensor substrate 210 is ground to achieve a predetermined thickness corresponding to the thickness of the diaphragm 212. By the constitution, the variation of the thickness of the diaphragm 212 can be suppressed to about 1 micrometer, and the diaphragm 212 can be formed with high accuracy.

As described above, by the constitution of the present embodiment, the diaphragm 212 can be formed stably and reproducibly to be thin, small, high accuracy, and high pressure capacity. Therefore, the present embodiment has a cost advantage.

FIGS. 16A, 16B, 17A, 17B, 18A, 18B, 19A, and 19B are drawings illustrating other embodiments of the shapes of the projection 220 and the depression 221. FIGS. 16A, 17A, 18A, and 19A are plain views of the resonant pressure sensor 200. FIGS. 16B, 17B, 18B, and 19B are sectional views of the resonant pressure sensor 200. The shapes of the projection 220 and the depression 221 are not limited to the shapes shown in FIG. 12. For example, the shapes may be implemented with the shapes shown in FIGS. 16A, 16B, 17A, 17B, 18A, 18B, 19A, and 19B.

Figure 16A:
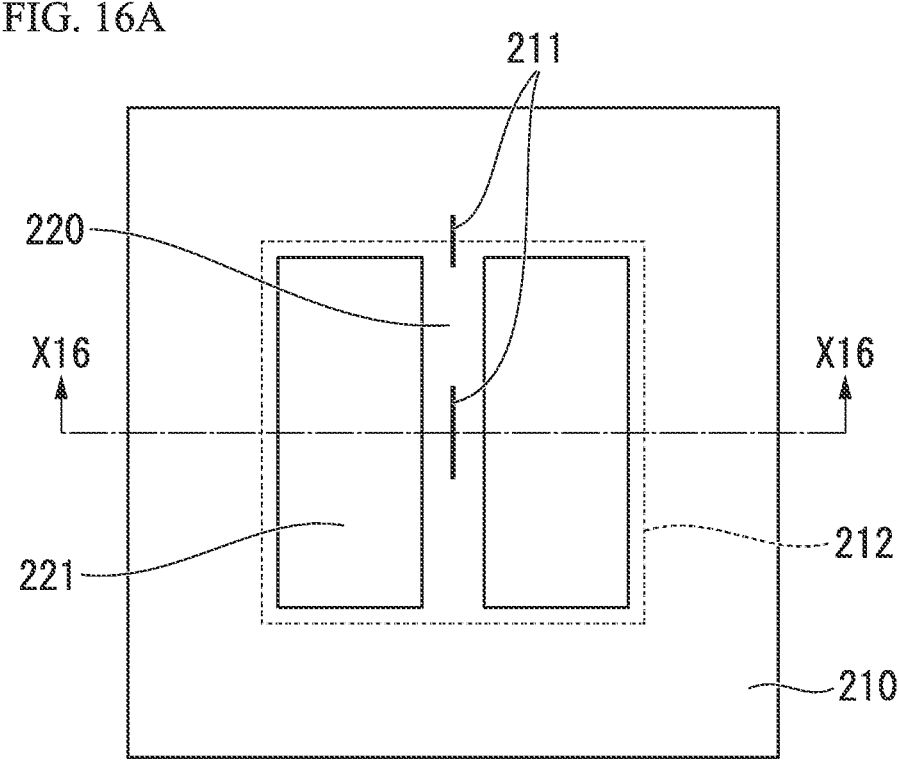
FIGS. 16A and 16B are drawings illustrating other example of shapes of the projection and the depression.
Figure 16B:
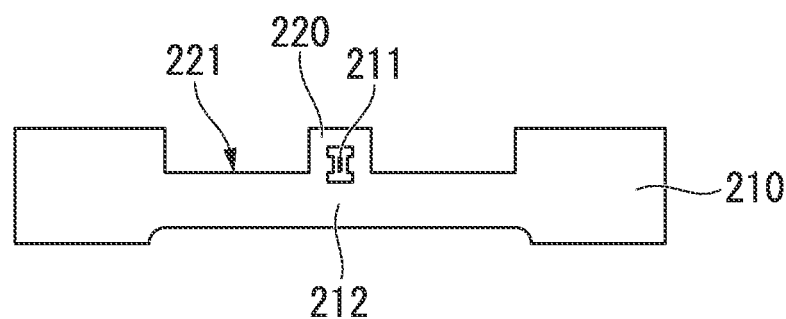

FIG. 16A is a plain view of the resonant pressure sensor 200. FIG. 16B is a sectional view on the line X16-X16 in FIG. 16A. In FIG. 16A and FIG. 16B, the depression 221 is quadrangular, and the thick-part (the projection 220) of the diaphragm 212 is I-line-shaped. Also, the depression 221 is disposed at both sides of the projection 220. The projection 220 includes the resonator 211 disposed in a center of the diaphragm 212 and the resonator 211 disposed in an outer circumference of the diaphragm 212.

Figure 17A:
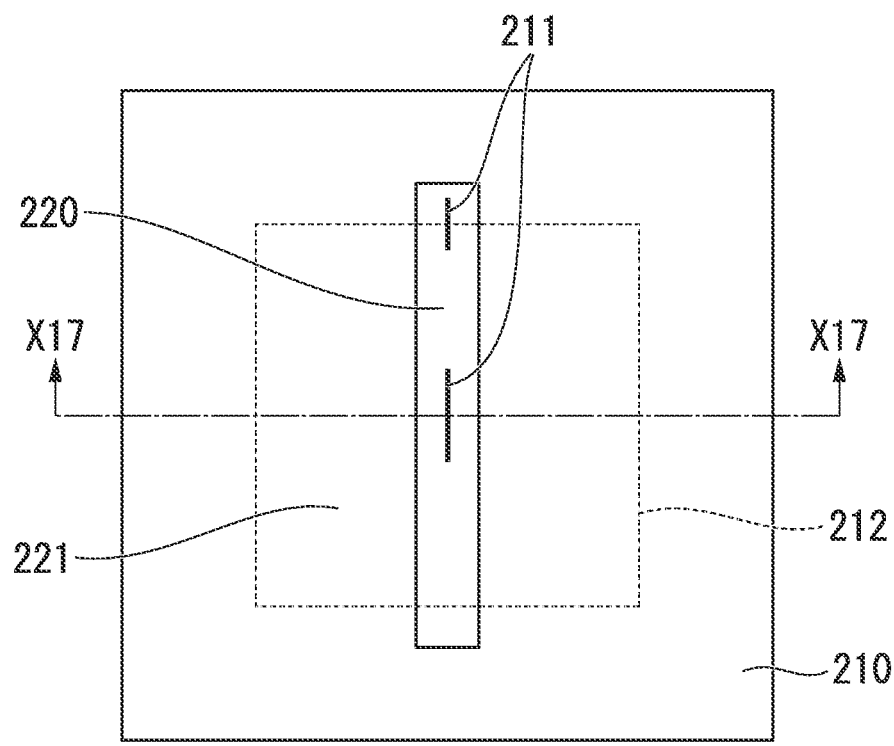
FIGS. 17A and 17B are drawings illustrating other example of shapes of the projection and the depression.
Figure 17B:
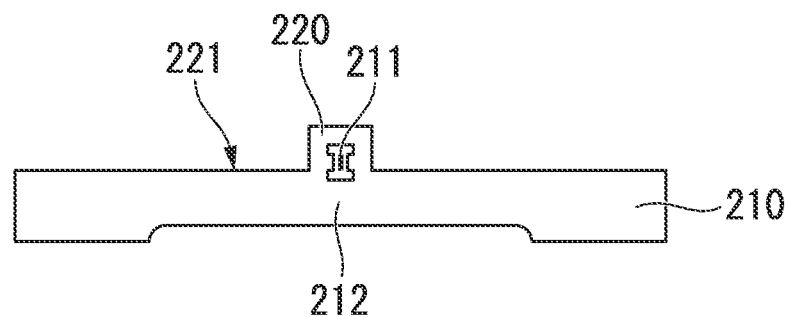

FIG. 17A is a plain view of the resonant pressure sensor 200. FIG. 17B is a sectional view on the line X17-X17 in FIG. 17A. In FIG. 17A and FIG. 17B, only the I-line-shaped thick-part (the projection 220) is disposed on the upper surface of the sensor substrate 210. The other constitutions are same with FIG. 16A and FIG. 16B. The I-line-shaped projection 220 includes the resonator 211 disposed in a center of the diaphragm 212 and the resonator 211 disposed in an outer circumference of the diaphragm 212.

Figure 18A:
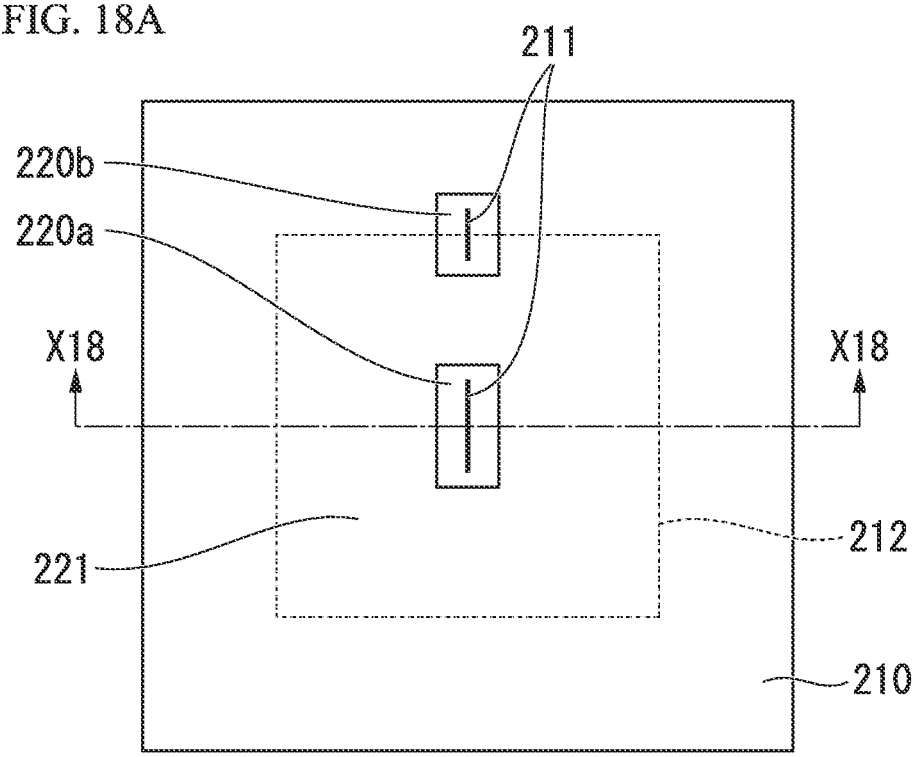
FIGS. 18A and 18B are drawings illustrating other example of shapes of the projection and the depression.
Figure 18B:
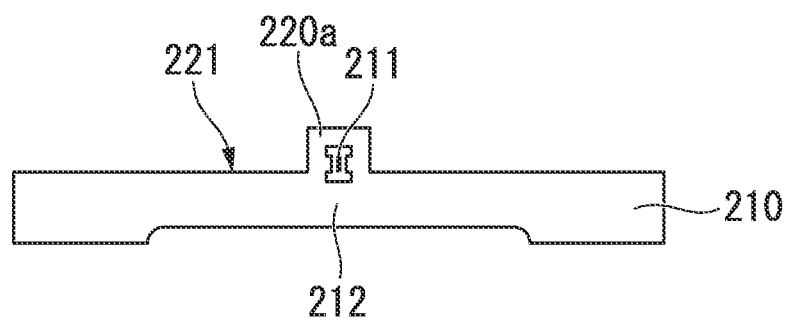

FIG. 18A is a plain view of the resonant pressure sensor 200. FIG. 18B is a sectional view on the line X18-X18 in FIG. 18A. In FIG. 18A and FIG. 18B, the I-line-shaped thick-part (the projection 220) is divided into two parts 220a (first projection) and 220b (second projection). The two parts 220a and 220b are separated each other and disposed on the upper surface of the sensor substrate 210. The other constitutions are same with FIG. 17A and FIG. 17B. The part 220a includes the resonator 211 disposed in a center of the diaphragm 212. The part 220b includes the resonator 211 disposed in an outer circumference of the diaphragm 212. In FIG. 18A and FIG. 18B, the projection 220 is locally-shaped to include only areas where the resonators 211 are disposed.

In the examples shown in FIGS. 16A, 16B, 17A, 17B, 18A, and 18B, the shape of the diaphragm 212 is quadrangular, but the shape is not limited thereto. For example, the shape of the diaphragm 212 may be circular as shown in FIG. 12.

Figure 19A:
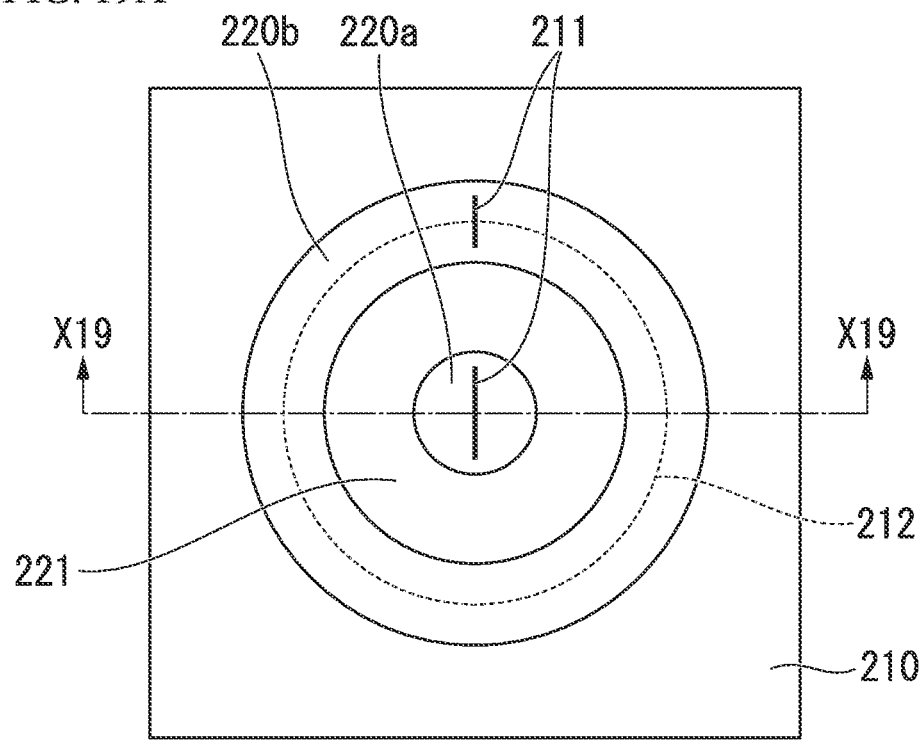
FIGS. 19A and 19B are drawings illustrating other example of shapes of the projection and the depression.
Figure 19B:
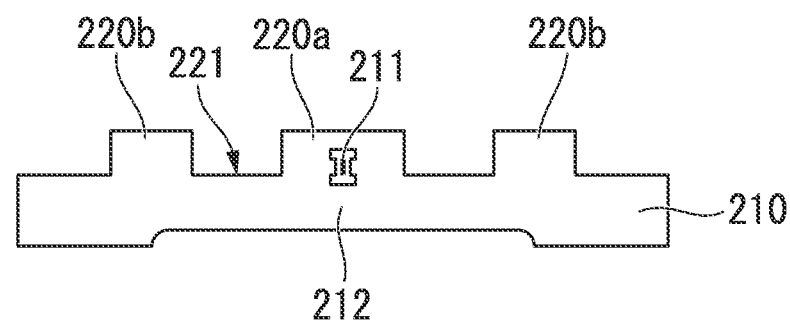

FIG. 19A is a plain view of the resonant pressure sensor 200. FIG. 19B is a sectional view on the line X19-X19 in FIG. 19A. In FIG. 19A and FIG. 19B, the projection 220 is divided into two parts 220a (first projection) and 220b (second projection). The parts 220a and 220b are concentric with each other. The part 220a includes the resonator 211 disposed in a center of the diaphragm 212. The part 220b includes the resonator 211 disposed in an outer circumference of the diaphragm 212. By the constitution shown in FIG. 19A and FIG. 19B, stress distribution can be uniformed in the circular diaphragm 212. The shape of the two parts 220a and 220b are concentric circles, but the shape is not limited thereto. For example, the shape of the two parts 220a and 220b may be quadrangular or polygonal.

Figure 20A:
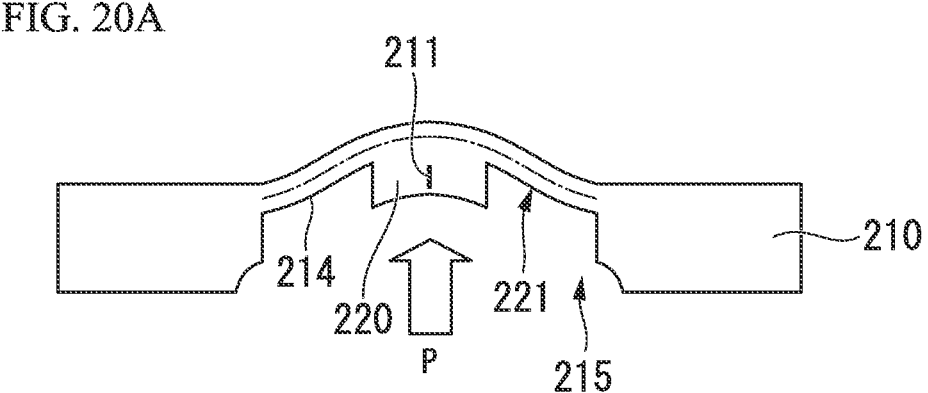
FIGS. 20A and 20B are a drawing illustrating other example of disposition of the projection.
Figure 20B:
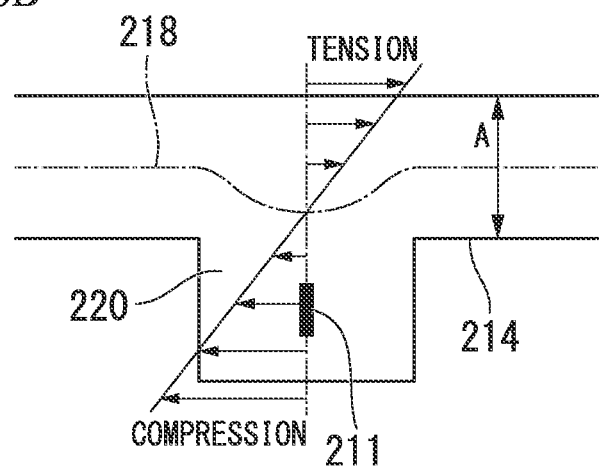

In the embodiment described above, the projection 220 is disposed on the upper surface 213 of the sensor substrate 210. The upper surface 213 is a surface which becomes convex upward when applying the pressure P to the diaphragm 212 upward. In other words, the projection 220 is disposed on an opposite side of the depression 215. But, the position of the projection 220 is not limited thereto. For example, as shown in FIG. 20A and FIG. 20B, the projection 220 may be disposed on the under surface 214 of the sensor substrate 210. The under surface 214 is a surface which becomes concave when applying the pressure P to the diaphragm 212 upward. In other words, the projection 220 may be disposed on a same side of the depression 215.

FIGS. 21A, 21B, 21C, 21D, 21E, 21F, and 21G are drawings for describing a manufacturing method of the resonant pressure sensor 200. The manufacturing method of the resonant pressure sensor 200 includes a process of forming the resonator 211 and a process of forming the projection 220 on the first surface (upper surface) 213 of the sensor substrate 210, so that the projection 220 includes at least a part of the resonator 211.

Figure 21A:
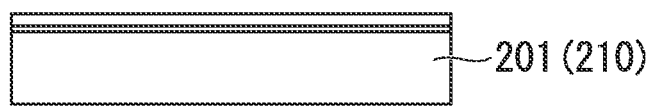
FIGS. 21A, 21B, 21C, 21D, 21E, 21F, and 21G are drawings illustrating an example of manufacturing process of the resonant pressure sensor.
Figure 21B:
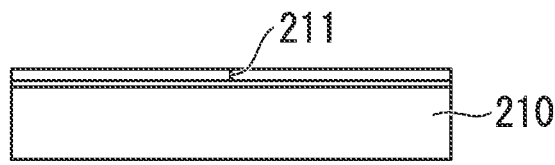

FIG. 21A is a drawing for describing a process of manufacturing the resonant pressure sensor 200. First, as shown in FIG. 21A, an SOI substrate 201 to become the sensor substrate 210 is prepared. Next, as shown in FIG. 21B, the resonator 211 is formed in the sensor substrate 210 at a side of the upper surface 213. At this time, the resonator 211 is formed so that the projection 220 formed in a post-process includes at least a part of the resonator 211.

For example, manufacturing processes of the resonator 211 are described in Japanese Unexamined Patent Application Publication No. 2012-58127. If the deformation of the diaphragm 212 can be measured, the shape of the resonator 211 is not limited thereto.

Figure 21C:
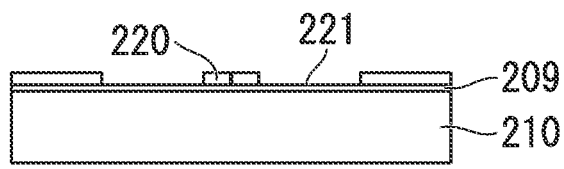

FIG. 21C is a drawing for describing a process of forming the projection 220 of the sensor substrate 210. The depression 221 is formed by etching process on the first surface (upper surface) of the sensor substrate 210 to form the diaphragm 212. By this process, the projection 220 is formed on the first surface (upper surface) of the sensor substrate 210.

An aperture is formed on a sensor surface by photolithography with resist material. The aperture is etched by a method such as dry etching. In FIG. 21C, when the different thickness areas (the projection 220 and the depression 221) are formed by using the SOI substrate 201, the silicon dioxide layer ($SiO_2$) 209 is used as a etch stop layer. By this process, the depression 221 which has uniform depth can be formed. Two resonators 211 are disposed in the projection 220 of the diaphragm 212 in line alignment. Wirings (not shown in the figures) are disposed in a same layer with the resonators 211.

The silicon dioxide layer ($SiO_2$) 209 of the depression 221 may be removed. In a case where an aperture of the depression 221 is wide, etching residues of the silicon are easy to accumulate. However, the etching residues can be lifted off by etching the silicon dioxide layer 209, the etching residues can be removed from the etched plane. After etching, the resist material is removed, and the depression 221 is formed on the sensor substrate 210. By the process, the projection 220 is formed in an area which is not etched. As described above, the resonator 211 is formed in the sensor substrate 210 at the side of the first surface (upper surface) 213. Also, at least a part of the resonator 211 is included in the projection 220.

Figure 21D:
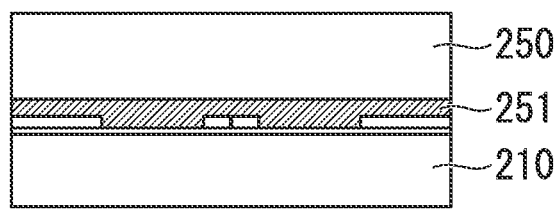

FIG. 21D is a drawing for describing a bonding process of the sensor substrate 210. The first surface (upper surface) of the sensor substrate 210 is bonded to a support substrate 250 with a bonding material 251. For example, the bonding material 251 is thermoplastic adhesive, dissolved-solution type adhesive, UV adhesive, double-faced tape, WAX, and so on.

Because the thickness variation in bonding process affects accuracy of following grinding and polishing processes, there is a need to control TTV (Total Thickness Variation; difference between a minimum thickness of the wafer and a maximum thickness of the wafer) and warpage. As the support substrate 250, sapphire, glass, silicon, or the like are used. The shape of the support substrate 250 is not limited thereto.

Figure 21E:
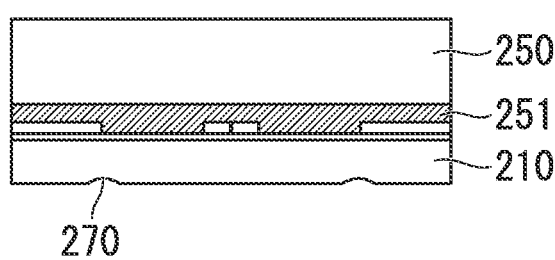

FIG. 21E is a drawing for describing a grinding and polishing process on the under surface 214 of the sensor substrate 210. The sensor substrate 210 bonded to the support substrate 250 is grinded and polished on the second surface (under surface) 214 to achieve a predetermined thickness. At this time, there is a need to grind the under surface 214 until crushed layers and grinding marks are deleted. The diaphragm 212 may be formed by alkali etching until the thickness of the diaphragm 212 becomes a predetermined thickness. Also, as shown in FIG. 21E, the diaphragm 212 may be formed with high accuracy by polishing the under surface 214 of the sensor substrate 210 to the extent of the thickness of the diaphragm 212. In the grinding and polishing process, the sensor substrate 210 is grinded and polished in a state where the sensor substrate 210 is bonded to the support substrate 250 with the bonding material 251. Therefore, even if the sensor substrate 210 becomes thinner, the sensor substrate does not break.

Figure 22A:
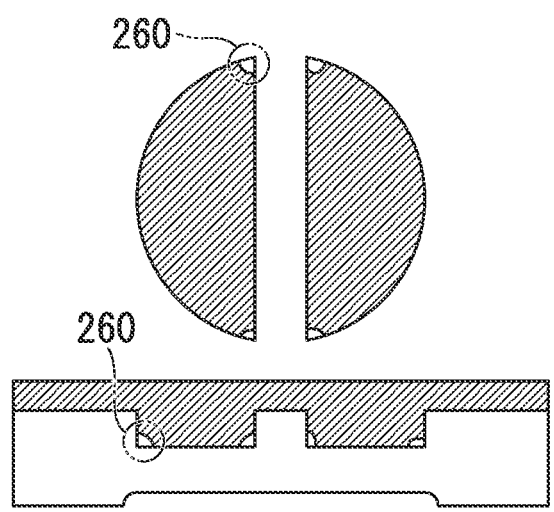
FIG. 22A is a drawing illustrating voids formed in the depression.
Figure 22B:
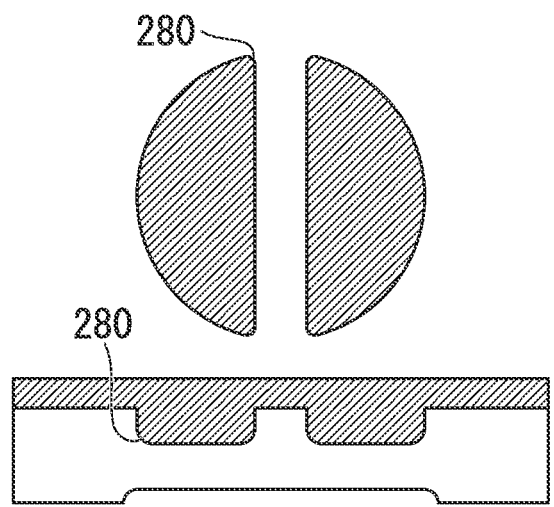
FIG. 22B is a drawing illustrating the diaphragm has rounded corners.

As shown in FIG. 22A, there is the possibility that voids 260 are formed in the high step structure. Also, as shown in FIG. 21E, there is the possibility that surface saggings 270 are formed on the under surface 214 of the sensor substrate 210. For the reason, as shown in FIG. 22B, it is important that the diaphragm 212 has rounded corners. For example, curvatures 280 are formed on the pattern of the depression 221 and the corner and the edge of the bottom surface of the depression 221, and the depression 215 is formed to be larger than the depression 221.

Figure 21F:
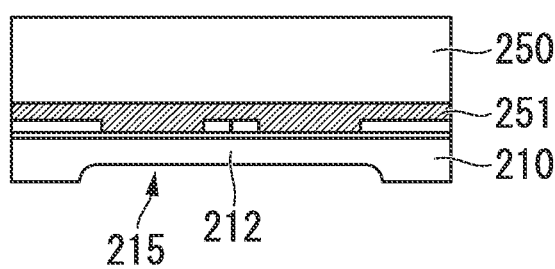

FIG. 21F is a drawing for describing a process of forming patterns on the under surface 214 of the sensor substrate 210. An aperture is formed on a sensor surface by photolithography with resist material. The aperture is etched by a method such as dry etching. After etching, the resist material is removed, and the depression 215 is formed on the under surface 214 of the sensor substrate 210. By the process, the diaphragm 212 is formed.

By these processes, the shape of the diaphragm 212 (for example, the diaphragm 212 is circular and the curvatures are formed on the edge of the diaphragm 212) can be formed regardless of the crystal orientation. Therefore, even if the diaphragm 212 is formed to be thin, the pressure capacity of the diaphragm 212 can be increased.

The convex patterns on the first surface are transferred as the concavo-convex patterns on a second surface (under surface) of the thin polished sensor substrate 210. By the concavo-convex patterns on the polished surface, gaps are formed on a bonding surface, and bonding-deformation is generated. For the reason, the sensor surface upper surface of the sensor substrate 210 should be flat.

When grinding and polishing the sensor substrate 210 to less than 200 micrometers thick, the wafer is broken easily. However, in a state where the sensor substrate 210 is bonded to the support substrate 250, the sensor substrate 210 can be ground and polished to less than several tens of micrometers thick without being broken.

After grinding and polishing, a washing process (not shown in the figures) should be performed to clean the polished surface. The washing process is such as physical washing ($CO_2$ washing, or twin-fluid washing) or acid-alkaline washing. There is a need that the washing process is performed at temperatures less than the temperature at which the bonding material is thermally decomposed. Also, there is a need that the bonding material is tolerant of the solution which used in the manufacturing process.

Figure 21G:
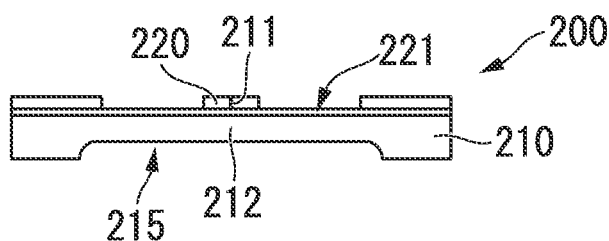

FIG. 21G is a drawing for describing a process of removing the support substrate 250. After the sensor substrate 210 is ground and polished to be thin, the support substrate 250 is removed from the sensor substrate 210. The process of removing the support substrate 250 is different according to types of the bonding material. For example, in a case of thermoplastic adhesive, the support substrate 250 is removed by raising the temperature of the adhesive and sliding the support substrate 250.

In a case of a thermal-ablation-type double-faced tape, the support substrate 250 is easily removed only by raising the temperature. After removing, the sensor surface should be washed by spin washing, solution immersion, or the like to remove bonding material residue. By these processes, the resonant pressure sensor 200 is completed.

In the resonant pressure sensor 200, the projection 220 is disposed on the diaphragm 212, the resonator 211 is disposed in an area apart from the neutral plane 218 which is centrally positioned in a thickness direction of the diaphragm 212, and the projection 220 includes at least a part of the area in which the resonator 211 is disposed. By the constitution, the resonator 211 can be disposed apart from the neutral plane 218 of the diaphragm 212 regardless of wide variety of the thickness of the diaphragm 212. Therefore, the diaphragm 212 can be thinner, and the sensitivity of the resonator 211*b* can be improved.

Specifically, in the present embodiment, by using an SOI substrate as the sensor substrate 210, the resonator 211 is included in the projection 220 which is the superficial silicon layer, and the silicon dioxide layer 209 exists between the superficial silicon layer and the silicon substrate. In other words, the resonator 211 is isolated from the neutral plane 218 by the silicon dioxide layer 209. The thickness of the projection 220 affecting the sensitivity of the resonator 211 is a constant distance between the upper surface of the silicon dioxide layer 209 and the upper surface of the projection 220. Compared to a case where there is no silicon dioxide layer, the thickness can be controlled to be uniformed. Therefore, variability of the sensitivity of the resonator 211 can be more suppressed.

Third Embodiment

Figure 23A:
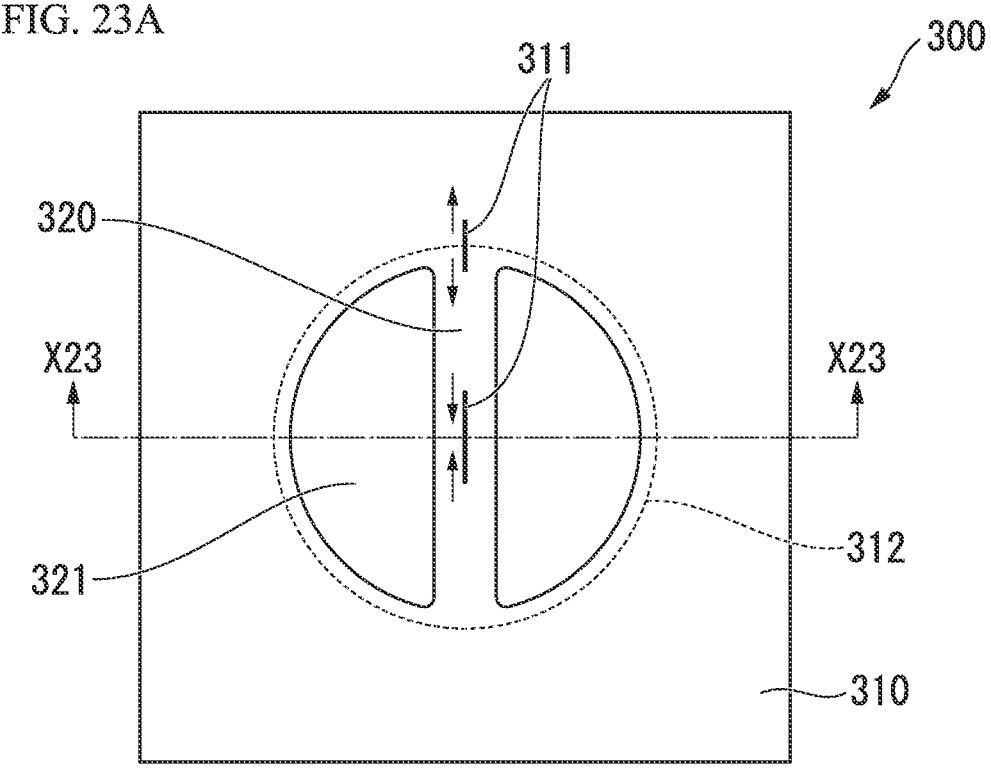
FIG. 23A is a plane view illustrating the resonant pressure sensor of the third embodiment.
Figure 23B:
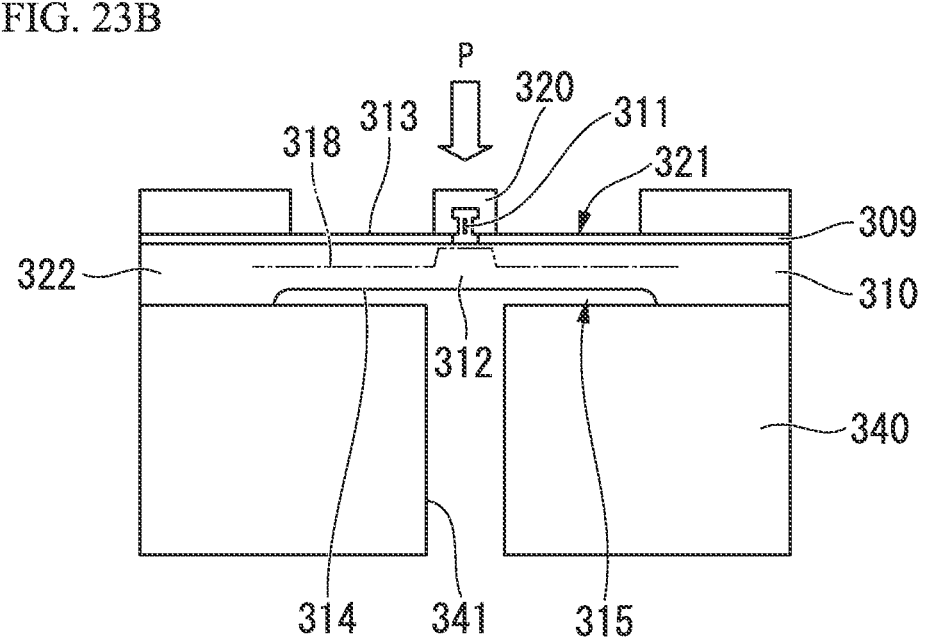
FIG. 23B is a sectional view illustrating the resonant pressure sensor of the third embodiment.
Figure 24A:
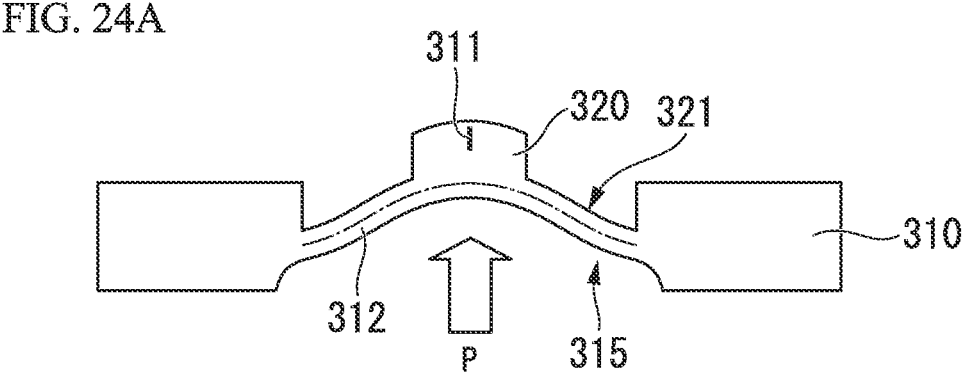
FIGS. 24A, 24B, and 24C are drawings illustrating a relation between the resonator and the neutral plane (intermediate level) of the diaphragm.
Figure 24B:
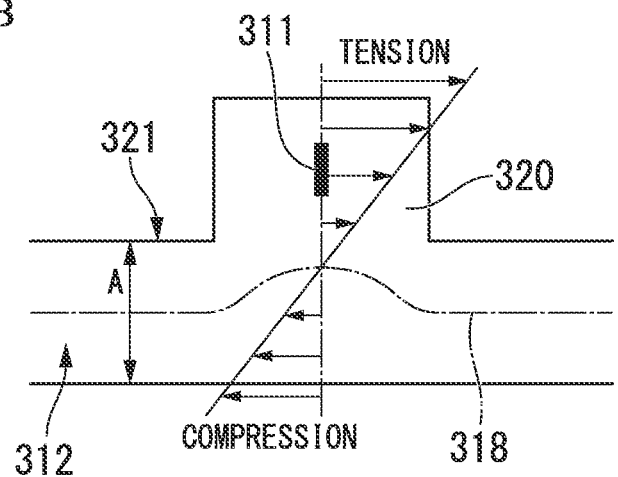
Figure 24C:
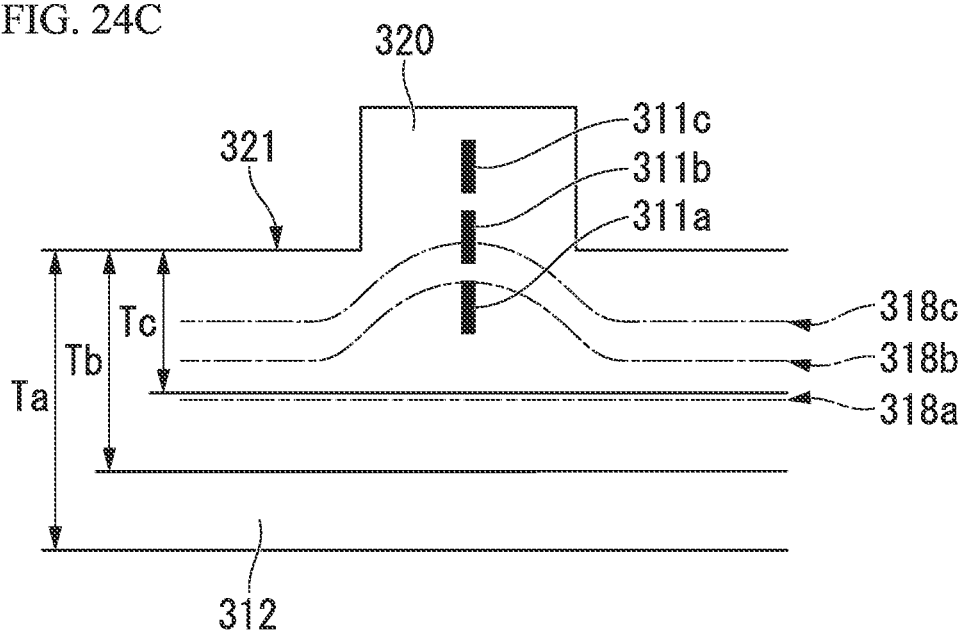
Figure 25:
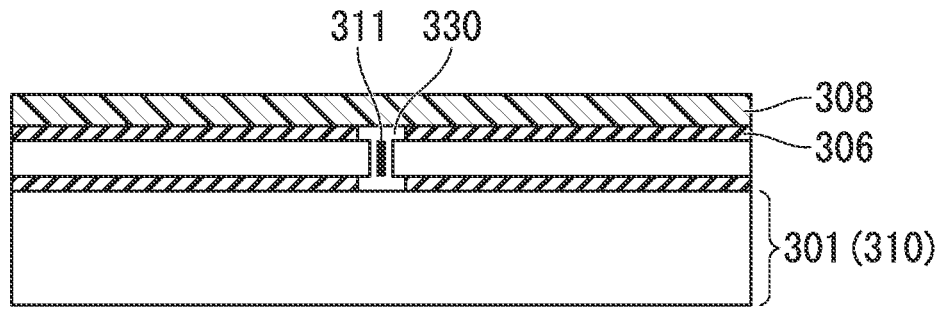
FIG. 25 is a zoomed sectional view around the resonator.

FIG. 23A is a plain view of the resonant pressure sensor 300 in the third embodiment. FIG. 23B is a sectional view of the resonant pressure sensor 300 on the line X23-X23 in the third embodiment. FIGS. 24A, 24B, 24C and 25 are zoomed sectional views of a main part of the resonant pressure sensor 300. FIGS. 24A, 24B, and 24C illustrate a relation with a resonator and a neutral plane of a diaphragm. FIG. 25 illustrates the resonator. The resonant pressure sensor 300 of the present embodiment includes at least one resonator 311 disposed in a sensor substrate 310. The sensor substrate 310 includes a diaphragm 312.

In FIG. 23A and FIG. 23B, the sensor substrate 310 is an SOI substrate. The resonator 311 is disposed in the sensor substrate 310 at a first surface (upper surface) 313 of the sensor substrate 310. The resonator 311 is included in the projection 320. The second surface (under surface) 314 is ground and polished to reduce the thickness of the sensor substrate 310 to the predetermined thickness of the diaphragm 312, and a depression 315 is formed on a second surface (under surface) 314 of the sensor substrate 310.

In the SOI substrate, a silicon dioxide layer ($SiO_2$) 309 is disposed between a silicon substrate and a superficial silicon layer. Using the SOI substrate as the sensor substrate 310, the at least one resonator 311 is disposed in at least one projection 320, and the resonator 311 is isolated from the neutral plane 318 by the silicon dioxide layer 309. The thickness of the projection 320 affecting the sensitivity of the resonator 311 is a constant distance between the upper surface of the silicon dioxide layer 309 and the upper surface of the projection 320. Compared to a case where there is no silicon dioxide layer, the thickness can be controlled to be uniformed. Therefore, variation of the sensitivity of the resonator 311 can be more suppressed.

In the resonant pressure sensor 300 of the present embodiment, the sensor substrate 310 includes a supporter 322. An under surface of the supporter 322 is bonded to a base substrate 340. For example, the base substrate 340 is made of silicon, glass, or ceramic.

The depression 315 is disposed on the under surface 314 of the sensor substrate 310. A diaphragm 312 is disposed in the sensor substrate 310. Movement range of the diaphragm 312 is not limited by foreign substance mixing. An interspace exists at the depression 315. The interspace filled with fluid works as damper to suppress resonance of the diaphragm 312 excited by vibration of the resonator 311.

A pressure-hole 341 is formed in the base substrate 340. Pressure is propagated through the pressure-hole 341 by the fluid flowing into the pressure-hole 341. In other words, the pressure-hole 341 allows externally applied pressure to be propagated to the diaphragm 312. As described above, the resonant pressure sensor 300 includes the sensor substrate 310 and the base substrate 340. The pressure-hole 341 is formed on the base substrate 340 by alkali etching, plasma etching, and so on. A shape of the pressure-hole 341 is not limited. The resonator 311 is disposed on the upper surface 313 of the diaphragm 312.

The sensor substrate 310 is an SOI substrate. Between the sensor substrate 310 and the base substrate 340, there is no material such as a silicon dioxide layer, or other material. Therefore, breaking strength of an interface between the sensor substrate 310 and the base substrate 340 can be substantially same with breaking strength of silicon material. Also, temperature characteristics of the resonant pressure sensor 300 can be improved.

The depression 315 is formed by plasma etching, wet etching, or the like. Because there is no need to etch the depression 315 deeply with alkali solution (such as KOH, TMAH, and so on), diaphragm gap is from submicrometer to several tens of micrometers can be formed accurately and easily. For the reason, the diaphragm 312 can be designed flexibly with consideration for foreign substance mixing. Also, the resonant pressure sensor 300 can be designed flexibly with consideration for movement range of the diaphragm 312.

Size of the diaphragm 312 is determined according to the size of the depression 315 of the sensor substrate 310. For example, the shape of the diaphragm 312 is quadrangular, circular, polygonal, or the like. Because the depression 315 of the sensor substrate 310 is a narrow gap of which depth is from submicrometer to several tens of micrometers, different from forming the diaphragm 312 by etching deeply with alkali solution (such as KOH, TMAH, and so on), the size of the depression 315 in a substrate plane direction is unlimited by an etching plane. Therefore, the shape is unlimited by a crystal orientation of the diaphragm 312, and the shape is designed flexibly.

The resonator 311 is disposed on a side of the first surface (upper surface) 313 of the diaphragm 312. Specifically, in the resonant pressure sensor 300 of the present embodiment, the diaphragm 312 includes a projection 320 disposed on the upper surface 313. At least a part of the resonator 311 is included in the projection 320, and the resonator 311 is disposed apart from the neutral plane 318 of the sensor substrate 310. The neutral plane 318 is an intermediate level positioned on a bisector dividing the sensor substrate 310 into two substantially-equal thickness parts. The term of "substantially" as used herein means a reasonable amount of deviation of the modified term such that the end result is not significantly changed. For example, the term can be construed as including a deviation of at least ±5 percent of the modified term if this deviation would not negate the meaning of the word it modifies. For example, a distance between the top of the projection 320 and the neutral plane 318 may be longer by 5 percent. Also, the projection 320 includes at least a part of the area in which the resonator 311 is disposed.

As shown in FIG. 24A, the projection 320 is disposed on the upper surface 313 of the diaphragm 312. In other words, the projection 320 is disposed on an opposite side of the second surface (under surface) 314 of the diaphragm 312. The depression 315 is disposed on the under surface 314. When applying pressure P to the diaphragm 312 upward, diaphragm 312 becomes convex upward. In FIG. 24A, the depression 321 is disposed around the projection 320. The neutral plane 318, which is positioned on a bisector dividing the sensor substrate 310 into two substantially-equal thickness parts, is shown with an alternate long and short dash line. Although the pressure P is applied to the diaphragm 312 upward, the pressure P may be applied to the diaphragm 312 downward.

FIG. 24B is a drawing illustrating a relation between the neutral plane of the diaphragm 312 and inner stress. Also, FIG. 24B is a magnified view around the projection 320 shown in FIG. 24A. In FIG. 24B, the neutral plane 318, which is positioned on a bisector dividing the sensor substrate 310 into two substantially-equal thickness parts, is shown with an alternate long and short dash line.

When applying the pressure P to the diaphragm 312 upward, tensile stress is applied to a side of the upper surface 313 of the diaphragm 312. The side of the upper surface 313 is a part of the diaphragm 312 above the neutral plane 318 (boundary plane of which bending stress is 0). On the other hand, compression stress is applied to a side of the under surface 314 of the diaphragm 312. The side of the under surface 314 is a part of the diaphragm 312 under the neutral plane 318.

In a case where the resonator 311 is disposed in the diaphragm 312 at the side of the upper surface 313, the resonator 311 detects the tensile stress. To the contrary, in a case where the resonator 311 is disposed in the diaphragm 312 at the side of the under surface 314, the resonator 311 detects the compression stress.

Although the resonant pressure sensor 300 can be applicable to the former constitution and the latter constitution, the former constitution (the resonator 311 is disposed in the diaphragm 312 at the side of the upper surface 313) is described mainly below.

As shown in FIG. 24B, in the resonant pressure sensor 300 of the present embodiment, at an area where the projection 320 does not exist, the neutral plane 318 is positioned at a depth of one-half of thickness A of the diaphragm 312. On the other hand, at an area where the projection 320 exists, the neutral plane 318 curves upward to the projection 320. As is the case with a conventional diaphragm, the tensile stress is applied to a part of the diaphragm 312 above the neutral plane, and the compression stress is applied to a part of the diaphragm 312 under the neutral plane. However, in the present embodiment, even if the neutral plane 318 curves upward to the projection 320, the resonator 311 can be disposed at a position apart from the neutral plane 318.

FIG. 24C is a drawing illustrating a relation between the neutral plane 318 of the diaphragm 312 and the resonator 311. Ta, Tb, and Tc (Ta>Tb>Tc) indicate thicknesses of the diaphragm 312. The neutral planes 318a, 318b, and 318c correspond to the thicknesses Ta, Tb, and Tc respectively.

As shown in FIG. 24C, if the diaphragm 312 is thick enough (Ta corresponds to the thickness of the conventional diaphragm), the resonator 311a can be disposed apart from the neutral plane 318 without forming the projection 320. To the contrary, if the diaphragm 312 is thin (Tb), sensitivity of the resonator 311a is reduced because the resonator 311a is disposed on the neutral plane 318b.

In the present embodiment, the projection 320 is disposed on the diaphragm 312, the resonator 311b is disposed apart from the neutral plane 318b, and the projection 320 includes at least a part of the resonator 311b. Therefore, it is possible that the resonator 311b is disposed apart from the neutral plane 318b. By the constitution, the diaphragm 312 can be thinner, and the sensitivity of the resonator 311b can be improved. In a case of the thickness Tb, a size (height) of the projection 320 is determined so that the projection 320 includes at least a part of the resonator 311b.

However, if the diaphragm 312 is thinner (Tc), it is difficult that the resonator 311b is disposed apart from the neutral plane 318c. In this case, the resonator 311c is disposed apart from the neutral plane 318c, and the projection 320 encloses the resonator 311c entirely. By the constitution, the resonator 311c can be disposed apart from the neutral plane 318c and disposed in the projection 320. As the result, the diaphragm 312 can be thinner, and the sensitivity of the resonator 311b can be more improved. In a case of the thickness Tc, a size (height) of the projection 320 is determined so that the projection 320 encloses the resonator 311c entirely.

As shown in FIGS. 23A and 23B, in the resonant pressure sensor 300, different thickness areas (the projection 320 and the depression 321) are formed in the diaphragm 312 of the sensor substrate 310. At least a part of the resonator 311 or entire resonator 311 is included in a thick-part (the projection 320) of the diaphragm 312. The neutral plane 318 is disposed in the silicon substrate. The resonator 311 is disposed in the projection 320 which is in the superficial silicon layer. Two resonators 311 are disposed in the projection 320 of the diaphragm 312 in line alignment. Wirings (not shown in FIG. 23A) are disposed in a same layer with the resonators 311. A number of the resonators 311 is not limited to two.

FIG. 25 is a magnified view around the resonator 311 of the resonant pressure sensor 300 shown in FIG. 23B. As shown in FIG. 25, the resonator 311 is disposed in a vacuum chamber 330. Tensile stress is applied to the resonator 311.

As shown in FIG. 24B, the resonator 311 is disposed in the projection 320 of the diaphragm 312 so that the resonator 311 can be disposed apart from the neutral plane 318 of the diaphragm 312 regardless of the thickness of the diaphragm 312. When designing the diaphragm 312 to improve the sensitivity of the resonator 311, there is no need to consider reduction of the sensitivity caused by the neutral plane 318 of the diaphragm 312. Therefore, the diaphragm 312 can be designed with two parameters which are the thickness of the diaphragm 312 and the diameter of the diaphragm 312. As described above, the sensitivity of the resonator 311 can be improved by making the diaphragm 312 thinner, and the resonant pressure sensor 300 can detect micro-pressure.

Also, the constitution of the present embodiment can (1) improve the pressure capacity of the diaphragm 312, (2) make chip size smaller, and (3) suppress variability of the thickness of the diaphragm 312. These are problems caused by making the diaphragm 312 thinner.

Figure 26:
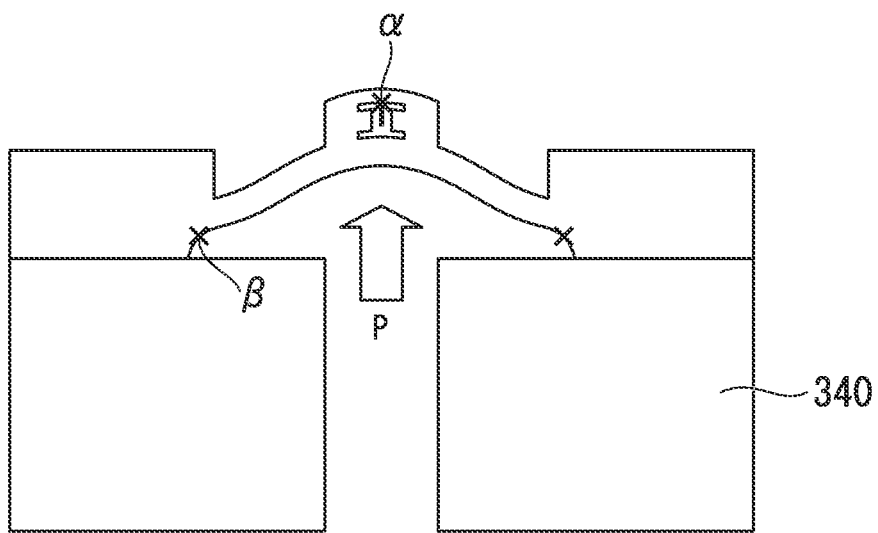
FIG. 26 is a drawing illustrating stress concentration to the diaphragm.

With respect to (1) improve the pressure capacity of the diaphragm 312, if the diaphragm 312 is made thinner, as shown in FIG. 26, stress concentrates on a part α of a shell and corners β of the diaphragm 312. Breaking of the diaphragm 312 is to begin from the positions α and β. To prevent the problem, the shell is made thicker, or curvatures are made on the corners β of the diaphragm 312. By the constitution, the stress concentration applied to the diaphragm 312 can be suppressed, and the pressure capacity of the diaphragm 312 can be increased. In the constitution shown in FIGS. 24A, 24B, and 24C, even if the shell is made thicker, a distance between the resonator 311 and the neutral plane 318 of the diaphragm 312 does not change. Therefore, reduction of the sensitivity of the resonator 311 can be suppressed.

With respect to (2) make chip size smaller, in general, as the diaphragm 312 is formed by etching deeply with alkali solution, vertical shape cannot be formed, but sloping shape is formed. For the reason, the size of the diaphragm 312 is different from its opening. Specifically, if the diaphragm 312 is thinner, the chip size is larger. However, as with the present embodiment, if the diaphragm 312 is formed by grinding, polishing, and etching, the size of the diaphragm 312 is not different from its opening. Therefore, the chip size can be smaller.

With respect to (3) suppress variation of the thickness of the diaphragm 312, when the different thickness areas (the projection 320 and the depression 321) are formed, the silicon dioxide layer of the SOI substrate stops the etching as an etching stop layer, and the under surface 314 of the sensor substrate 310 is ground to achieve a predetermined thickness corresponding to the thickness of the diaphragm 312. By the constitution, the variation of the thickness of the diaphragm 312 can be suppressed to about 1 micrometer, and the diaphragm 312 can be formed with high accuracy.

As described above, by the constitution of the present embodiment, the diaphragm 312 can be formed stably and reproducibly to be thin, small, high accuracy, and high pressure capacity. Therefore, the present embodiment has a cost advantage.

FIGS. 27A, 27B, 28A, 28B, 29A, 29B, 30A, and 30B are drawings illustrating other embodiments of the shapes of the projection 320 and the depression 321. FIGS. 27A, 28A, 29A, and 30A are plain views of the resonant pressure sensor 300. FIGS. 27B, 28B, 29B, and 30B are sectional views of the resonant pressure sensor 300. The shapes of the projection 320 and the depression 321 are not limited to the shapes shown in FIG. 23. For example, the shapes may be implemented with the shapes shown in FIGS. 27A, 27B, 28A, 28B, 29A, 29B, 30A, and 30B.

Figure 27A:
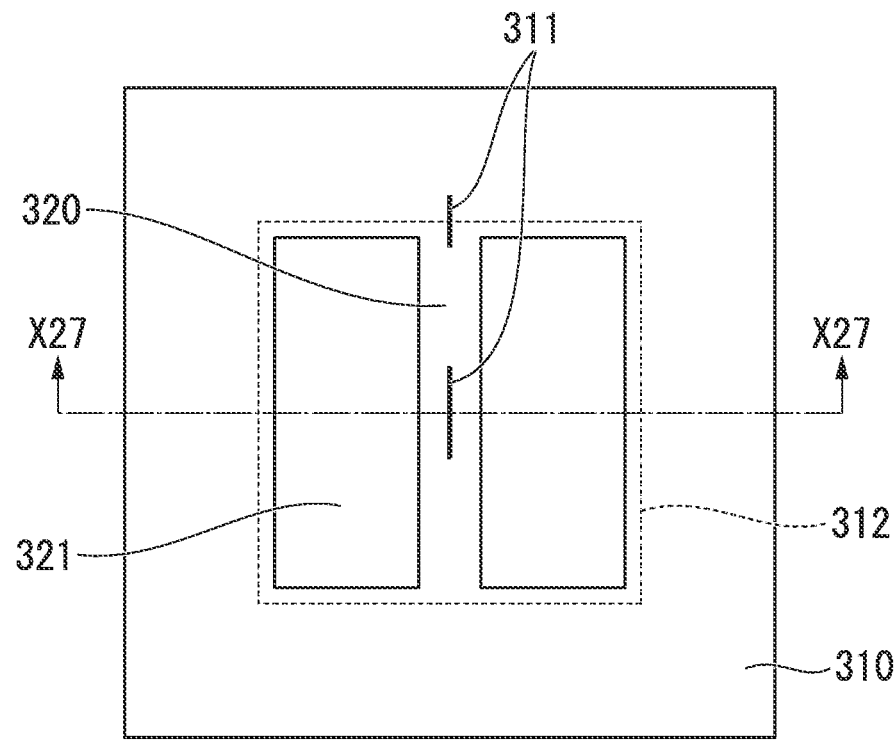
FIGS. 27A and 27B are drawings illustrating other example of shapes of the projection and the depression.
Figure 27B:
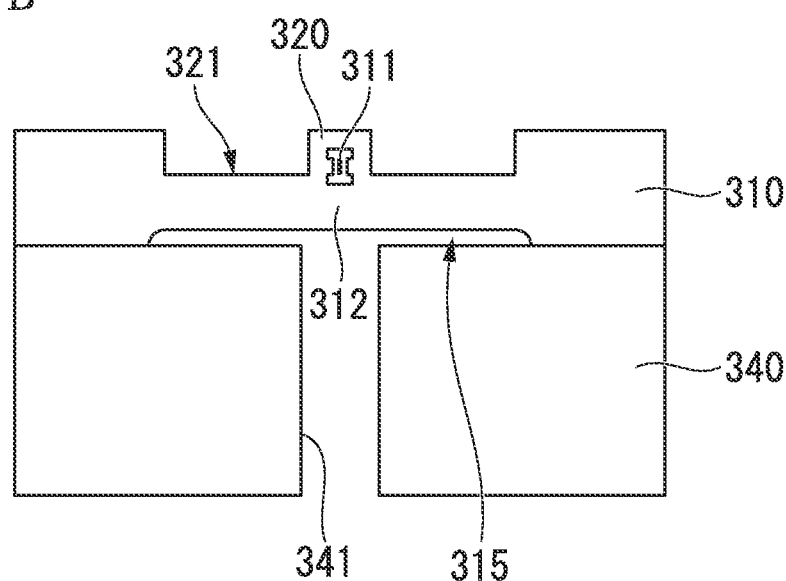

FIG. 27A is a plain view of the resonant pressure sensor 300. FIG. 27B is a sectional view on the line X27-X27 in FIG. 27A. In FIG. 27A and FIG. 27B, the depression 321 is quadrangular, and the thick-part (the projection 320) of the diaphragm 312 is I-line-shaped. Also, the depression 321 is disposed at both sides of the projection 320. The projection 320 includes resonator 311 disposed in a center of the diaphragm 312 and the resonator 311 disposed in an outer circumference of the diaphragm 312.

Figure 28A:
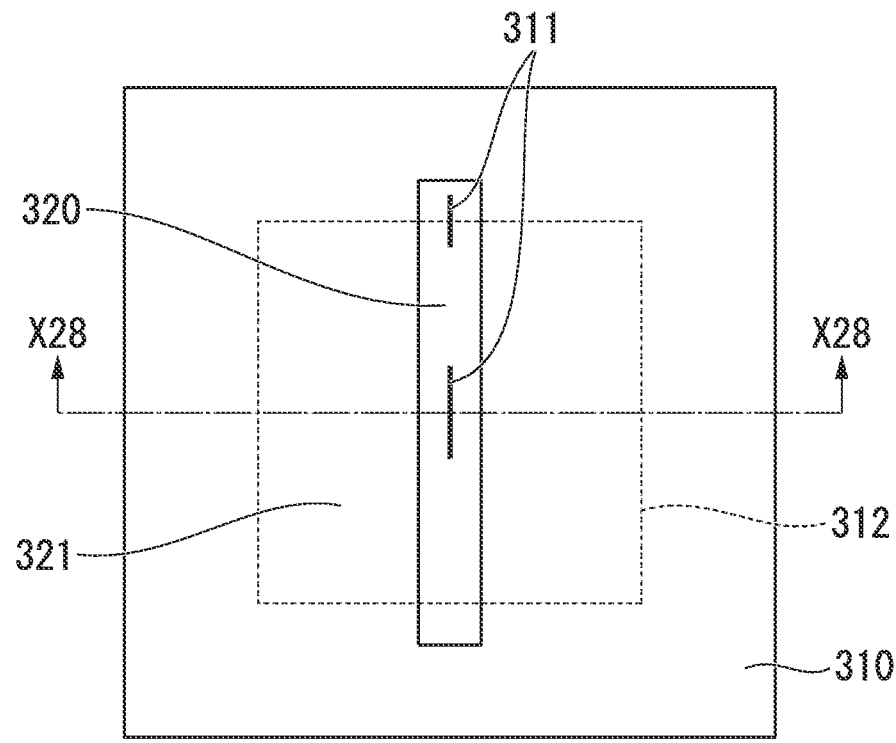
FIGS. 28A and 28B are drawings illustrating other example of shapes of the projection and the depression.
Figure 28B:
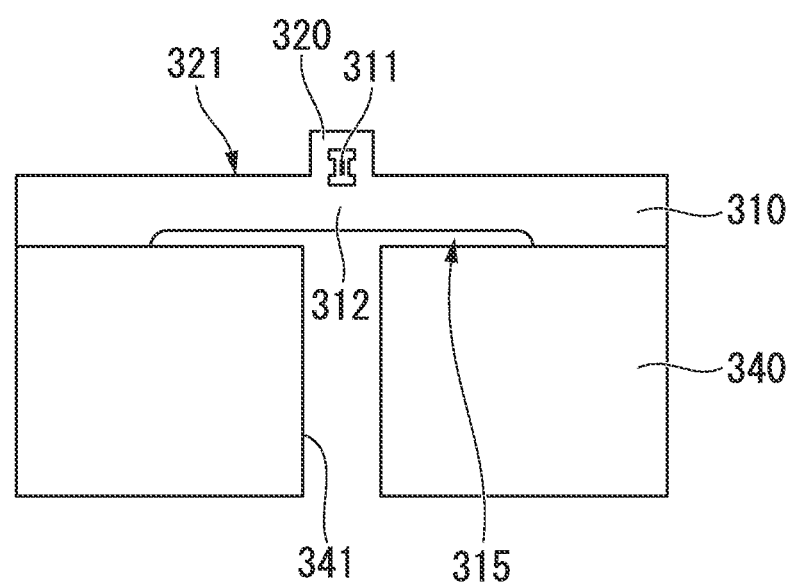

FIG. 28A is a plain view of the resonant pressure sensor 300. FIG. 28B is a sectional view on the line X28-X28 in FIG. 28A. In FIG. 28A and FIG. 28B, only the I-line-shaped thick-part (the projection 320) is disposed on the upper surface of the sensor substrate 310. The other constitutions are same with FIG. 27A and FIG. 27B. The I-line-shaped projection 320 includes the resonator 311 disposed in a center of the diaphragm 312 and the resonator 311 disposed in an outer circumference of the diaphragm 312.

Figure 29A:
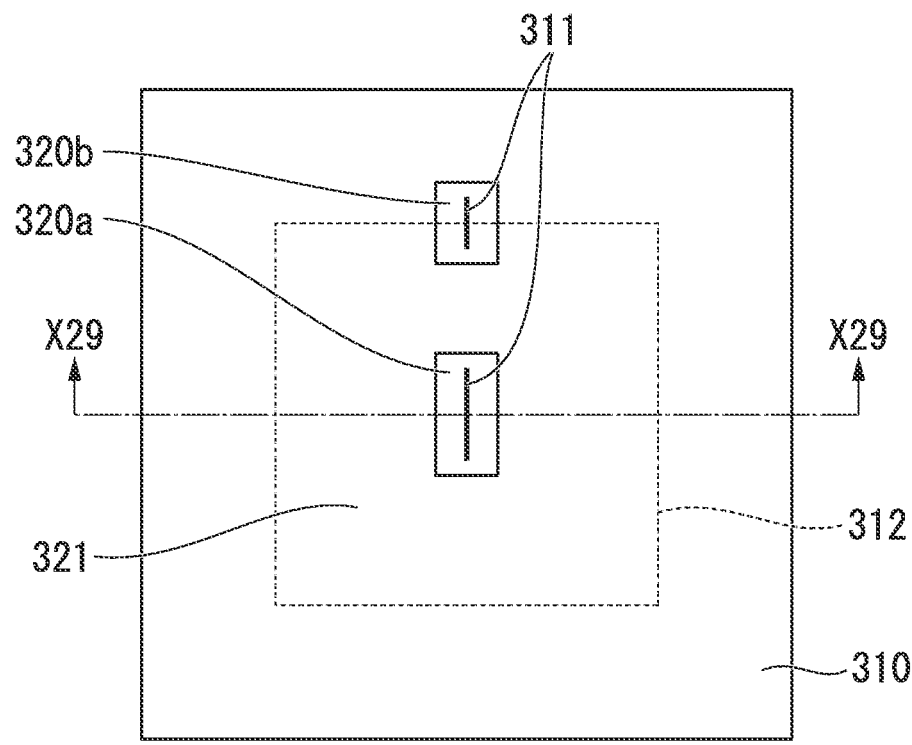
FIGS. 29A and 29B are drawings illustrating other example of shapes of the projection and the depression.
Figure 29B:
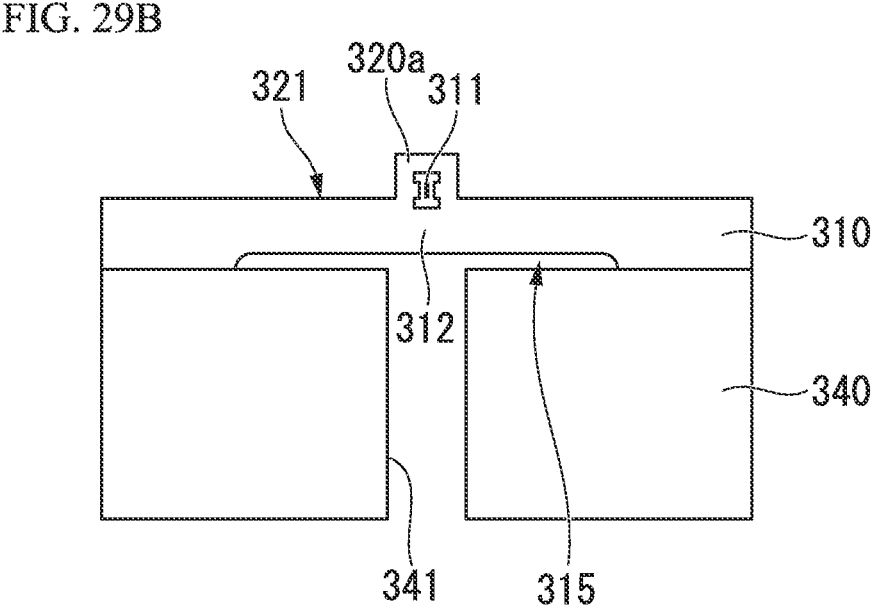

FIG. 29A is a plain view of the resonant pressure sensor 300. FIG. 29B is a sectional view on the line X29-X29 in FIG. 29A. In FIG. 29A and FIG. 29B, the I-line-shaped thick-part (the projection 320) is divided into two parts 320a (first projection) and 320b (second projection). The two parts 320a and 320b are separated each other and disposed on the upper surface of the sensor substrate 310. The other constitutions are same with FIG. 28A and FIG. 28B. The part 320a includes the resonator 311 disposed in a center of the diaphragm 312. The part 320b includes the resonator 311 disposed in an outer circumference of the diaphragm 312. In FIG. 29A and FIG. 29B, the projection 320 is locally-shaped to include only areas where the resonators 311 are disposed.

In the examples shown in FIGS. 27A, 27B, 28A, 28B, 29A, and 29B, the shape of the diaphragm 312 is quadrangular, but the shape is not limited thereto. For example, the shape of the diaphragm 312 may be circular as shown in FIG. 23.

Figure 30A:
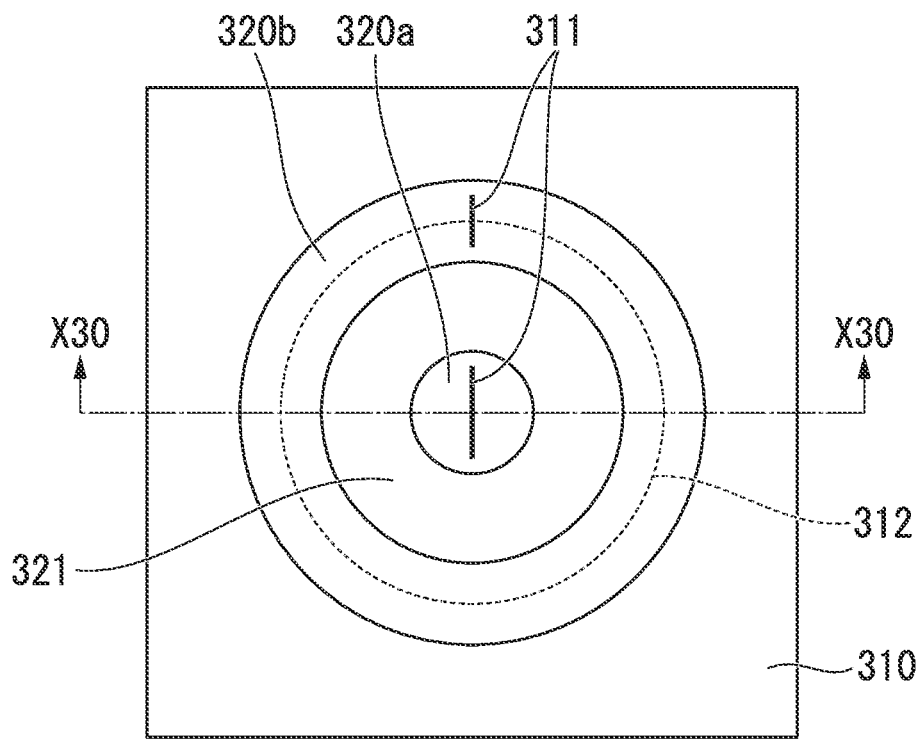
FIGS. 30A and 30B are drawings illustrating other example of shapes of the projection and the depression.
Figure 30B:
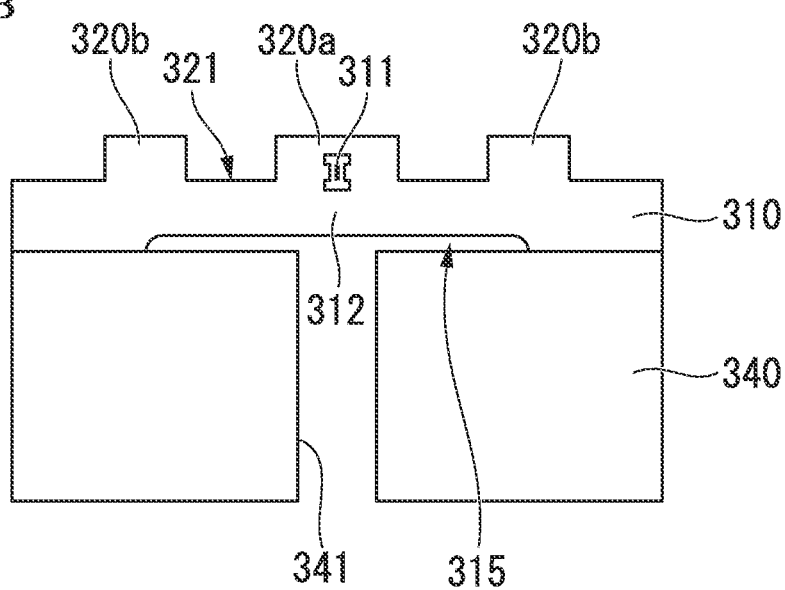

FIG. 30A is a plain view of the resonant pressure sensor 300. FIG. 30B is a sectional view on the line X30-X30 in FIG. 30A. In FIG. 30A and FIG. 30B, the projection 320 is divided into two parts 320a (first projection) and 320b (second projection). The parts 320a and 320b are concentric with each other. The part 320a includes the resonator 311 disposed in a center of the diaphragm 312. The part 320b includes the resonator 311 disposed in an outer circumference of the diaphragm 312. By the constitution shown in FIG. 30A and FIG. 30B, stress distribution can be uniformed in the circular diaphragm 312. The shape of the two parts 320a and 320b are concentric circles, but the shape is not limited thereto. For example, the shape of the two parts 320a and 320b may be quadrangular or polygonal.

Figure 31A:
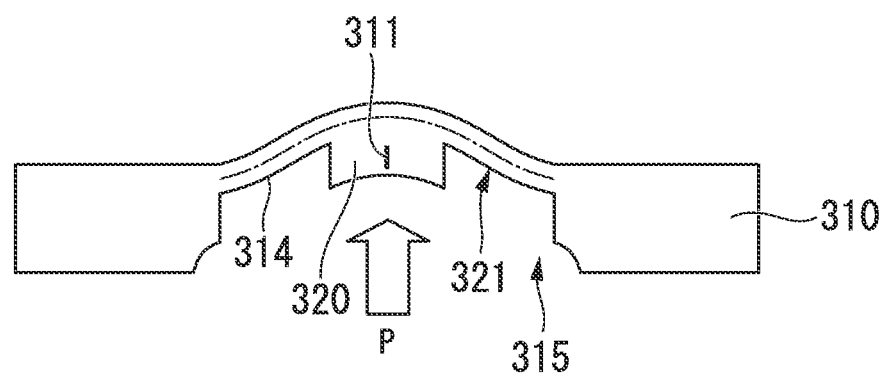
FIGS. 31A and 31B are a drawing illustrating other example of disposition of the projection.
Figure 31B:
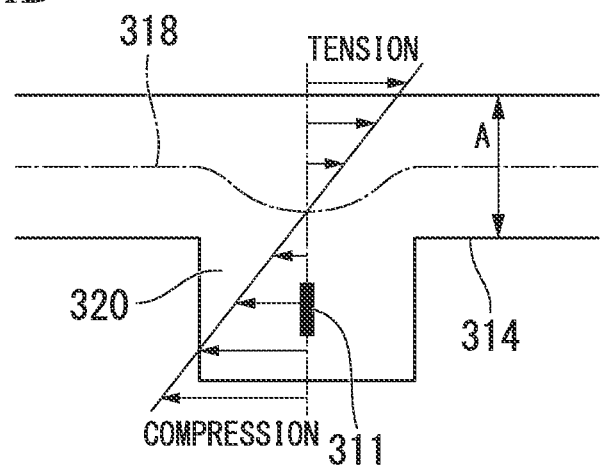

In the embodiment described above, the projection 320 is disposed on the upper surface 313 of the sensor substrate 310. The upper surface 313 is a surface which becomes convex upward when applying the pressure P to the diaphragm 312 upward. In other words, the projection 320 is disposed on an opposite side of the depression 315. But, the position of the projection 320 is not limited thereto. For example, as shown in FIG. 31A and FIG. 31B, the projection 320 may be disposed on the under surface 314 of the sensor substrate 310. The under surface 314 is a surface which becomes concave when applying the pressure P to the diaphragm 312 upward. In other words, the projection 320 may be disposed on a same side of the depression 315.

FIGS. 32A, 32B, 32C, 32D, 32E, 32F, and 32G are drawings for describing a manufacturing method of the resonant pressure sensor 300. The manufacturing method of the resonant pressure sensor 300 includes a process of forming the resonator 311 and a process of forming the projection 320 on the first surface (upper surface) 313 of the sensor substrate 310, so that the projection 320 includes at least a part of the resonator 311.

Figure 32A:
FIGS. 32A, 32B, 32C, 32D, 32E, 32F, 32G, and 32H are drawings illustrating an example of manufacturing process of the resonant pressure sensor.
Figure 32B:

FIG. 32A is a drawing for describing a process of manufacturing the resonant pressure sensor 300. First, as shown in FIG. 32A, an SOI substrate 301 to become the sensor substrate 310 is prepared. Next, as shown in FIG. 32B, the resonator 311 is formed in the sensor substrate 310 at a side of the upper surface 313. At this time, the resonator 311 is formed so that the projection 320 formed in a post-process includes at least a part of the resonator 311.

For example, manufacturing processes of the resonator 311 are described in Japanese Unexamined Patent Application Publication No. 2012-58127. If the deformation of the diaphragm 312 can be measured, the shape of the resonator 311 is not limited thereto.

Figure 32C:
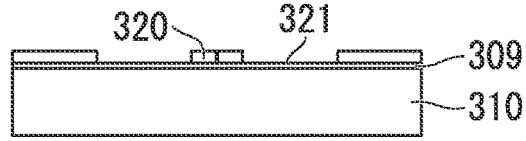

FIG. 32C is a drawing for describing a process of forming the projection 320 of the sensor substrate 310. The depression 321 is formed by etching process on the first surface (upper surface) of the sensor substrate 310 to form the diaphragm 312. By this process, the projection 320 is formed on the first surface (upper surface) of the sensor substrate 310.

An aperture is formed on a sensor surface by photolithography with resist material. The aperture is etched by a method such as dry etching. In FIG. 32C, when the different thickness areas (the projection 320 and the depression 321) are formed by using the SOI substrate 301, the silicon dioxide layer (SiO2) 309 is used as a etch stop layer. By this process, the depression 321 which has uniform depth can be formed. Two resonators 311 are disposed in the projection 320 of the diaphragm 312 in line alignment. Wirings (not shown in the figures) are disposed in a same layer with the resonators 311.

The silicon dioxide layer (SiO2) 309 of the depression 321 may be removed. In a case where an aperture of the depression 321 is wide, etching residues of the silicon are easy to accumulate. However, the etching residues can be lifted off by etching the silicon dioxide layer 309, the etching residues can be removed from the etched plane. After etching, the resist material is removed, and the depression 321 is formed on the sensor substrate 310. By the process, the projection 320 is formed in an area which is not etched. As described above, the resonator 311 is formed in the sensor substrate 310 at the side of the first surface (upper surface) 313. Also, at least a part of the resonator 311 is included in the projection 320.

Figure 32D:
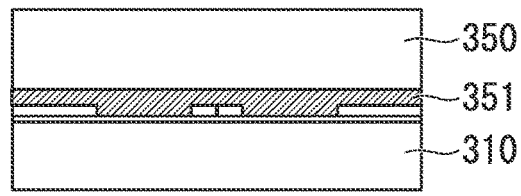

FIG. 32D is a drawing for describing a bonding process of the sensor substrate 310. The first surface (upper surface) of the sensor substrate 310 is bonded to a support substrate 350 with a bonding material 351. For example, the bonding material 351 is thermoplastic adhesive, dissolved-solution type adhesive, UV adhesive, double-faced tape, WAX, and so on.

Because the thickness variation in the bonding process affects accuracy of following grinding and polishing processes, there is a need to control TTV (Total Thickness Variation; difference between a minimum thickness of the wafer and a maximum thickness of the wafer) and warpage. As the support substrate 350, sapphire, glass, silicon, or the like are used. The shape of the support substrate 350 is not limited thereto.

Figure 32E:
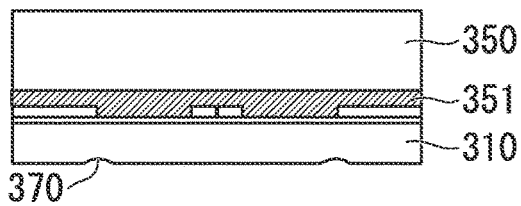

FIG. 32E is a drawing for describing a grinding and polishing process on the under surface 314 of the sensor substrate 310. The sensor substrate 310 bonded to the support substrate 350 is grinded and polished on the second surface (under surface) 314 to achieve a predetermined thickness. At this time, there is a need to polish the under surface 314 until crushed layers and grinding marks are deleted. The diaphragm 312 may be formed by alkali etching until the thickness of the diaphragm 312 becomes a predetermined thickness. Also, as shown in FIG. 32E, the diaphragm 312 may be formed with high accuracy by polishing the under surface 314 of the sensor substrate 310 to the extent of the thickness of the diaphragm 312. In the grinding and polishing process, the sensor substrate 310 is ground and polished in a state where the sensor substrate 310 is bonded to the support substrate 350 with the bonding material 351. Therefore, even if the sensor substrate 310 becomes thinner, the sensor substrate does not break.

Figure 33A:
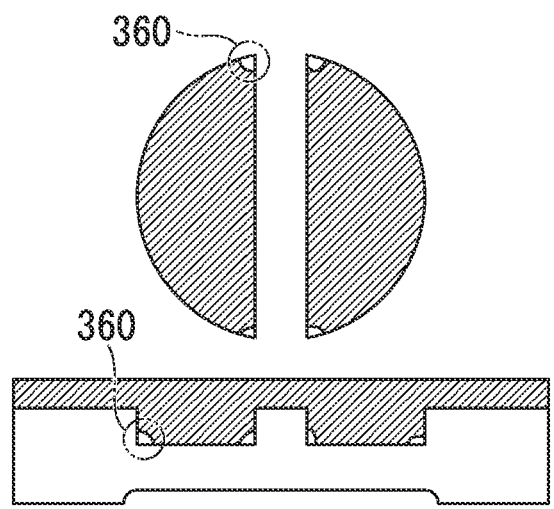
FIG. 33A is a drawing illustrating voids formed in the depression.
Figure 33B:
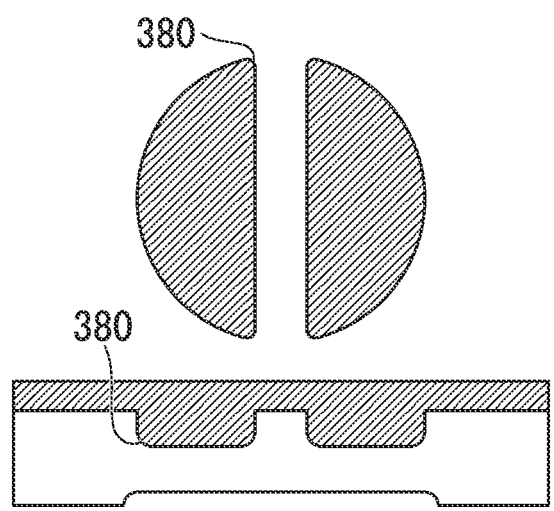
FIG. 33B is a drawing illustrating the diaphragm has rounded corners.

As shown in FIG. 33A, there is the possibility that voids 360 are formed in the high step structure. Also, as shown in FIG. 32E, there is the possibility that surface saggings 370 are formed on the under surface 314 of the sensor substrate 310. For the reason, as shown in FIG. 32B, it is important that the diaphragm 312 has rounded corners. For example, curvatures 380 are formed on the pattern of the depression 321 and the corner and the edge of the bottom surface of the depression 321, and the depression 315 is formed to be larger than the depression 321.

Figure 32F:
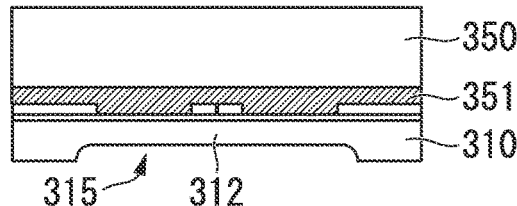

FIG. 32F is a drawing for describing a process of forming patterns on the under surface 314 of the sensor substrate 310. An aperture is formed on a sensor surface by photolithography with resist material. The aperture is etched by a method such as dry etching. After etching, the resist material is removed, and the depression 315 is formed on the under surface 314 of the sensor substrate 310. By the process, the diaphragm 312 is formed.

The diaphragm 312 may be formed by grinding, polishing, and etching. By these processes, the shape of the diaphragm 312 (for example, the diaphragm 312 is circular and the curvatures are formed on the edge of the diaphragm 312) can be formed regardless of the crystal orientation. Therefore, even if the diaphragm 312 is formed to be thin, the pressure capacity of the diaphragm 312 can be increased.

The convex patterns on the first surface are transferred as the concavo-convex patterns on a second surface (under surface) of the thin sensor substrate 310. By the concavo-convex patterns on the polished surface, gaps are formed on a bonding surface, and bonding-deformation is generated. For the reason, the sensor surface (upper surface) of the sensor substrate 310 should be flat.

When grinding and polishing the sensor substrate 310 to less than 300 micrometers thick, the wafer is broken easily. However, in a state where the sensor substrate 310 is bonded to the support substrate 350, the sensor substrate 310 can be ground and polished to less than several tens of micrometers thick without being broken.

After grinding and polishing, a washing process (not shown in the figures) should be performed to clean the polished surface. The washing process is such as physical washing ($CO_2$ washing, or twin-fluid washing) or acid-alkaline washing. There is a need that the washing process is performed at temperatures less than the temperature at which the bonding material is thermally decomposed. Also, there is a need that the bonding material is tolerant of the solution which used in the manufacturing process.

Figure 32G:
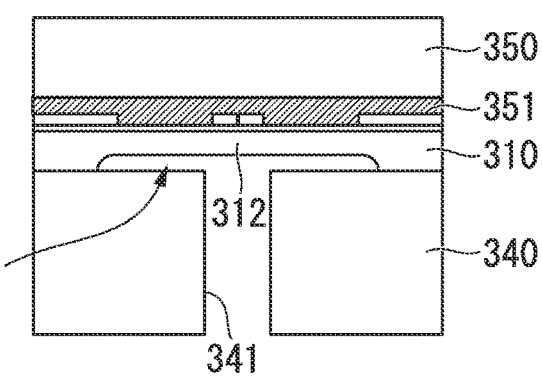

FIG. 32G is a drawing for describing a process of forming the base substrate 340. The pressure-hole 341 is formed in the base substrate 340 by plasma etching, wet etching, or the like. The forming method of the pressure-hole 341 is not limited thereto. Also, the shape of the pressure-hole 341 is not limited thereto.

In FIG. 32G, the base substrate 340 where the pressure-hole 341 is formed is bonded to the sensor substrate 310 where the depression 315 is formed. At the time, there is a need that the base substrate 340 is bonded to the sensor substrate 310 at temperatures less than heatproof temperature of bonding material. Specifically, temperature of an upper limit of bonding material is from 100 to 200 degrees Celsius. Also, temperature of an upper limit of double-faced tape is about 150 degrees Celsius.

To simplify the processes, it is desirable that the bonding process is performed without forming a film on the polished surface and reforming the polished surface. For example, the bonding meeting the requirements includes room-temperature direct bonding, metallic diffusion bonding, and so on.

In the room-temperature direct bonding, after a bonding surface of a substrate is etched by an ion gun or a FAB (fast atomic beam) gun and activated, the bonding process is performed in high vacuum. This technology is characterized in that the bonding process can be performed at room-temperature, and the bonding process is suitable for bonding silicon surfaces. Gas generated from the bonding material adheres to the bonding surface of the substrate and the gas causes a reduction of bonding force, so that there is a need to choose the bonding material which does not generate gas.

The metallic diffusion bonding is performed with metal atomic layer added on a surface of a substrate at an atomic layer level instead of activating bonding surface by etching in the room-temperature direct bonding. The bonding process is performed in high vacuum same with the room-temperature direct bonding. In the metallic diffusion bonding, the substrates can be bonded without worsening characteristics of the resonant pressure sensor 300, as other material (metal) atomic layer is very thin.

The bonding technology at low temperature includes, other than the technology described above, a plasma activating bonding. In the plasma activating bonding, hydroxyl groups are formed on the substrate surface by plasma with gas such as Ar, $N_2$, $O_2$, or the like, bonding substrates are bonded, and annealing at 400 degrees Celsius to make bonding strength higher. In the plasma activating bonding, water can be generated due to the hydroxyl groups, and voids can be generated due to the water. However, in the case of small area bonding, such as diaphragm structure, the water goes away from the bonding area, and the bonding process is performed without any voids.

Figure 32H:
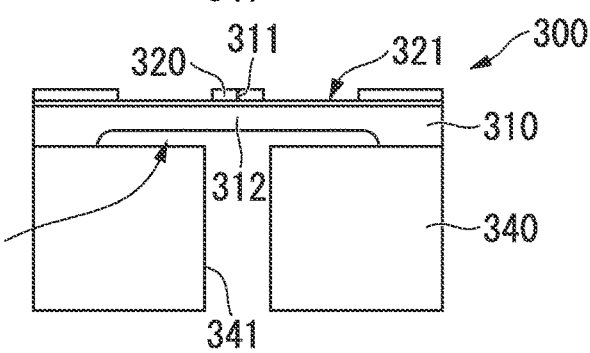

FIG. 32H is a drawing for describing a process of removing the support substrate 350. After the sensor substrate 310 is ground and polished to be thin, the support substrate 350 is removed from the sensor substrate 310. The process of removing the support substrate 350 is different according to types of the bonding material. For example, in a case of thermoplastic adhesive, the support substrate 350 is removed by raising the temperature of the adhesive and sliding the support substrate 350.

In a case of a thermal-ablation-type double-faced tape, the support substrate 350 is easily removed only by raising the temperature. After removing, the sensor surface should be washed by spin washing, solution immersion, or the like to remove bonding material residue. By these processes, the resonant pressure sensor 300 is completed.

In the resonant pressure sensor 300, the projection 320 is disposed on the diaphragm 312, the resonator 311 is disposed in an area apart from the neutral plane 318 which is positioned on a bisector dividing the sensor substrate 310 into two substantially-equal thickness parts, and the projection 320 includes at least a part of the area in which the resonator 311 is disposed. By the constitution, the resonator 311 can be disposed apart from the neutral plane 318 of the diaphragm 312 regardless of wide variety of the thickness of the diaphragm 312. Therefore, the diaphragm 312 can be thinner, and the sensitivity of the resonator 311b can be improved.

In the present embodiment, the sensor substrate 310 includes the supporter 322 disposed at outer circumference of the diaphragm 312, and the under surface of the supporter 322 is bonded to the base substrate 340. By this constitution, the interspace exists between the sensor substrate 310 and the base substrate 340. By the interspace, even if foreign substance mixing occurs, the movement range of the diaphragm 312 is not limited. Also, the interspace filled with fluid works as damper to suppress the resonance of the diaphragm 312 excited by vibration of the resonator 311.

Fourth Embodiment

Figure 34A:
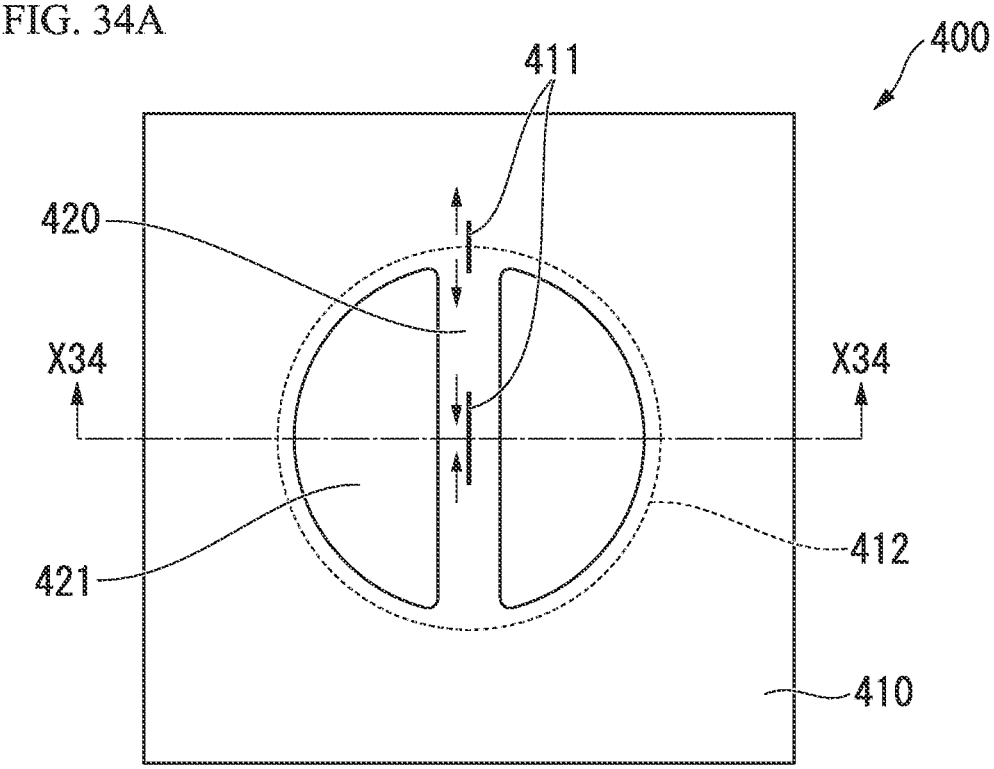
FIG. 34A is a plane view illustrating the resonant pressure sensor of the fourth embodiment.
Figure 34B:
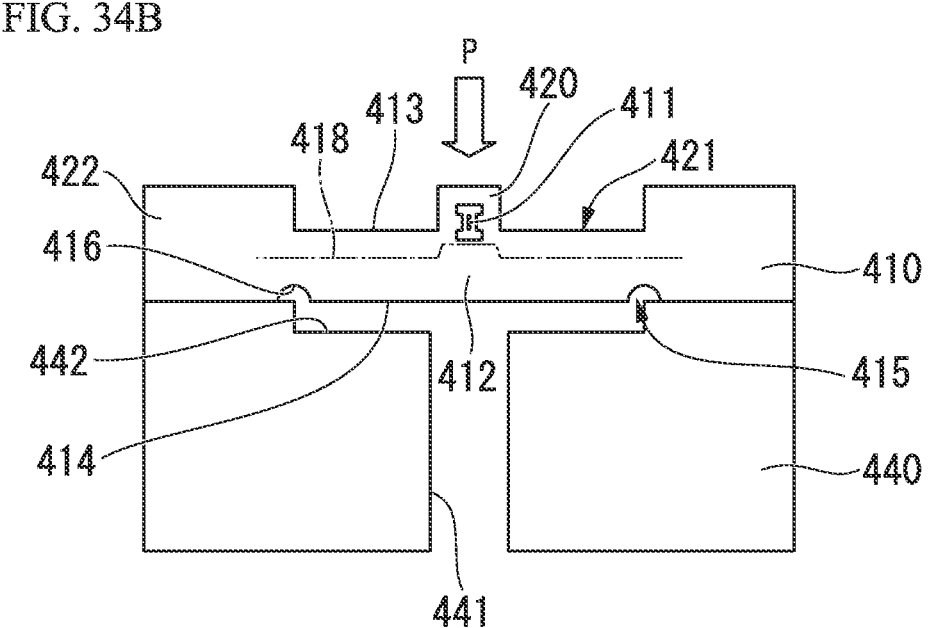
FIG. 34B is a sectional view illustrating the resonant pressure sensor of the fourth embodiment.
Figure 35A:
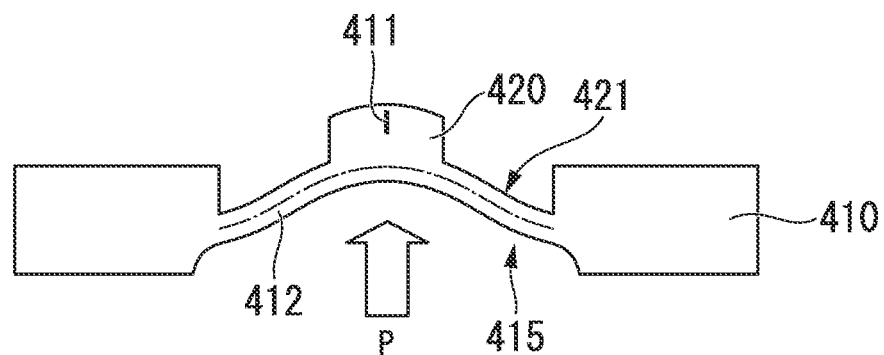
FIGS. 35A, 35B, and 35C are drawings illustrating a relation between the resonator and the neutral plane (intermediate level) of the diaphragm.
Figure 35B:
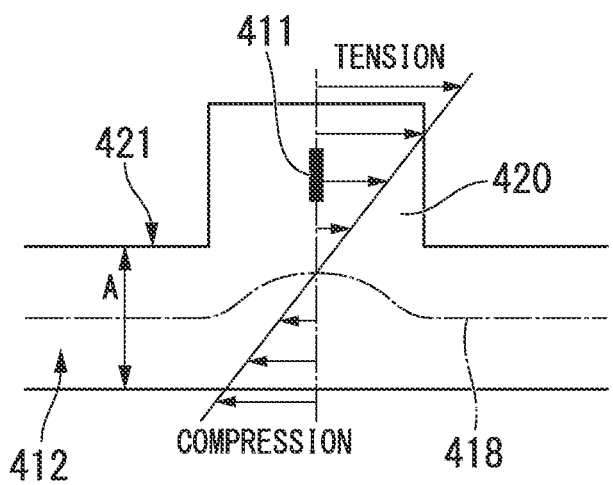
Figure 35C:
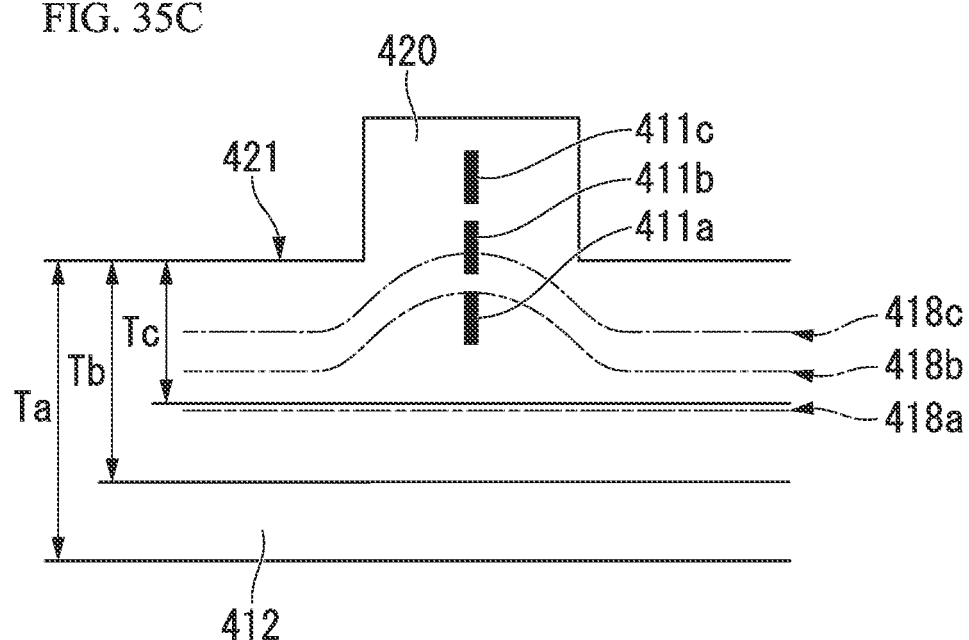
Figure 36:
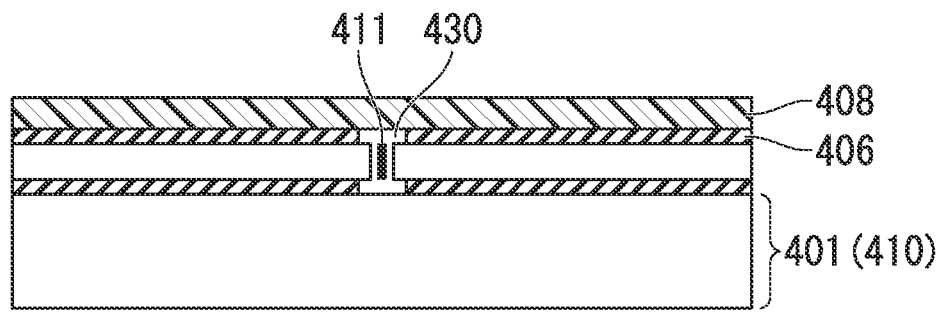
FIG. 36 is a zoomed sectional view around the resonator.

FIG. 34A is a plain view of the resonant pressure sensor 400 in the fourth embodiment. FIG. 34B is a sectional view of the resonant pressure sensor 400 on the line X34-X34 in the fourth embodiment. FIGS. 35A, 35B, 35C and 36 are zoomed sectional views of a main part of the resonant pressure sensor 400. FIGS. 35A, 35B, and 35C illustrate a relation with a resonator and a neutral plane of a diaphragm. FIG. 36 illustrates the resonator. The resonant pressure sensor 400 of the present embodiment includes a sensor substrate 410. Also, the resonant pressure sensor 400 of the present embodiment includes at least one resonator 411 disposed in a sensor substrate 410. The sensor substrate 410 includes a diaphragm 412. The at least one resonator 411 is included in at least one projection 420.

In FIG. 34A and FIG. 34B, the sensor substrate 410 is made of silicon (Si). The resonator 411 is disposed in the sensor substrate 410 at a first surface (upper surface) 413 of the sensor substrate 410. The second surface (under surface) 414 is ground and polished to reduce the thickness of the sensor substrate 410 to the predetermined thickness of the diaphragm 412, and a depression 415 is formed on a second surface (under surface) 414 of the sensor substrate 410.

In the resonant pressure sensor 400 of the present embodiment, the sensor substrate 410 includes a supporter 422. An under surface of the supporter 422 is bonded to the base substrate 440. For example, the base substrate 440 is made of silicon, glass, or ceramic.

The pressure-hole 441 is formed in the base substrate 440 by alkali etching and so on. The pressure-hole 441 allows externally applied pressure to be propagated to the diaphragm 412. A shape of the pressure-hole 441 is not limited. The resonator 411 is disposed on the upper surface 413 of the diaphragm 412.

Thickness of the diaphragm 412 is determined by subtracting an etching amount of a depression 421 on the upper surface 413 of the sensor substrate 410 from a thickness of the sensor substrate 410. Therefore, the thickness of the diaphragm 412 is tuned by grinding and polishing to be predetermined thickness. Because the grinding and polishing amount of each wafer can be fine-tuned, the thickness of each wafer can be controlled precisely by the several micrometers.

The sensor substrate 410 and the base substrate 440 are made of silicon. Between the sensor substrate 410 and the base substrate 440, there is no material such as a silicon dioxide layer, or other material. Therefore, breaking strength of an interface between the sensor substrate 410 and the base substrate 440 can be substantially same with breaking strength of silicon material. Also, temperature characteristics of the resonant pressure sensor 400 can be improved.

The depression 415 of the base substrate 440 is to become an interspace after bonding. The interspace is formed by plasma etching, wet etching, or the like. Because there is no need to etch the interspace deeply with alkali solution (such as KOH, TMAH, and so on), the interspace of which width is from submicrometer to several tens of micrometers can be formed accurately and easily. For the reason, the interspace can be designed flexibly with consideration for foreign substance mixing. Also, the resonant pressure sensor 400 can be designed flexibly with consideration for movement range of the diaphragm 412.

Size of the diaphragm 412 is determined according to the size of the depression 415 of the base substrate 440. For example, the shape of the diaphragm 412 is quadrangular, circular, polygonal, or the like. Because the depression 415 of the base substrate 440 is a narrow interspace of which depth is from submicrometer to several tens of micrometers, different from forming the diaphragm 412 by etching deeply with alkali solution (such as KOH, TMAH, and so on), the shapes of mask-patterns are unlimited by crystal orientation of etching.

Therefore, the shape is unlimited by a crystal orientation of the diaphragm 412, and the shape is designed flexibly. Also, as stress concentration can be suppressed by a ring-shaped roundness 416, pressure strength of the resonant pressure sensor 400 can be improved.

The resonator 411 is disposed on a side of the first surface (upper surface) 413 of the diaphragm 412. Specifically, as shown in FIGS. 34A, 34B, 35A, 35B, and 35C, in the resonant pressure sensor 400 of the present embodiment, the diaphragm 412 includes a projection 420 disposed on the upper surface 413. The resonator 411 is included in the projection 420, and the resonator 411 is disposed apart from the neutral plane 418 of the sensor substrate 410. The neutral plane 418 is an intermediate level positioned on a bisector dividing the sensor substrate 410 into two substantially-equal thickness parts. The term of "substantially" as used herein means a reasonable amount of deviation of the modified term such that the end result is not significantly changed. For example, the term can be construed as including a deviation of at least ±5 percent of the modified term if this deviation would not negate the meaning of the word it modifies. For example, a distance between the top of the projection 420 and the neutral plane 418 may be longer by 5 percent. Also, the projection 420 includes at least a part of the area in which the resonator 411 is disposed.

As shown in FIG. 35A, the projection 420 is disposed on the upper surface 413 of the diaphragm 412. In other words, the projection 420 is disposed on an opposite side of the second surface (under surface) 414 of the diaphragm 412. The depression 415 is disposed on the under surface 414. When applying pressure P to the diaphragm 412 upward, diaphragm 412 becomes convex upward. In FIG. 35A, the depression 421 is disposed around the projection 420. The neutral plane 418, which is positioned on a bisector dividing the sensor substrate 410 into two substantially-equal thickness parts, is shown with an alternate long and short dash line. Although the pressure P is applied to the diaphragm 412 upward, the pressure P may be applied to the diaphragm 412 downward.

FIG. 35B is a drawing illustrating a relation between the neutral plane of the diaphragm 412 and inner stress. Also, FIG. 35B is a magnified view around the projection 420 shown in FIG. 35A. In FIG. 35B, the neutral plane 418, which is positioned on a bisector dividing the sensor substrate 410 into two substantially-equal thickness parts, is shown with an alternate long and short dash line.

When applying the pressure P to the diaphragm 412 upward, tensile stress is applied to a side of the upper surface 413 of the diaphragm 412. The side of the upper surface 413 is a part of the diaphragm 412 above the neutral plane 418 (boundary plane of which bending stress is 0). On the other hand, compression stress is applied to a side of the under surface 414 of the diaphragm 412. The side of the under surface 414 is a part of the diaphragm 412 under the neutral plane 418.

In a case where the resonator 411 is disposed in the diaphragm 412 at the side of the upper surface 413, the resonator 411 detects the tensile stress. To the contrary, in a case where the resonator 411 is disposed in the diaphragm 412 at the side of the under surface 414, the resonator 411 detects the compression stress.

Although the resonant pressure sensor 400 can be applicable to the former constitution and the latter constitution, the former constitution (the resonator 411 is disposed in the diaphragm 412 at the side of the upper surface 413) is described mainly below.

As shown in FIG. 35B, in the resonant pressure sensor 400 of the present embodiment, at an area where the projection 420 does not exist, the neutral plane 418 is positioned at a depth of one-half of thickness A of the diaphragm 412. On the other hand, at an area where the projection 420 exists, the neutral plane 418 curves upward to the projection 420. As is the case with a conventional diaphragm, the tensile stress is applied to a part of the diaphragm 412 above the neutral plane, and the compression stress is applied to a part of the diaphragm 412 under the neutral plane. However, in the present embodiment, even if the neutral plane 418 curves upward to the projection 420, the resonator 411 can be disposed at a position apart from the neutral plane 418.

FIG. 35C is a drawing illustrating a relation between the neutral plane 418 of the diaphragm 412 and the resonator 411. Ta, Tb, and Tc (Ta>Tb>Tc) indicate thicknesses of the diaphragm 412. The neutral planes 418a, 418b, and 418c correspond to the thicknesses Ta, Tb, and Tc respectively.

As shown in FIG. 35C, if the diaphragm 412 is thick enough (Ta corresponds to the thickness of the conventional diaphragm), the resonator 411a can be disposed apart from the neutral plane 418 without forming the projection 420. To the contrary, if the diaphragm 412 is thin (Tb), sensitivity of the resonator 411a is reduced because the resonator 411a is disposed on the neutral plane 418b.

In the present embodiment, the projection 420 is disposed on the diaphragm 412, the resonator 411b is disposed apart from the neutral plane 418b, and the projection 420 includes at least a part of the resonator 411b. Therefore, it is possible that the resonator 411b is disposed apart from the neutral plane 418b. By the constitution, the diaphragm 412 can be thinner, and the sensitivity of the resonator 411b can be improved. In a case of the thickness Tb, a size (height) of the projection 420 is determined so that the projection 420 includes at least a part of the resonator 411b.

However, if the diaphragm 412 is thinner (Tc), it is difficult that the resonator 411b is disposed apart from the neutral plane 418c. In this case, the resonator 411c is disposed apart from the neutral plane 418c, and the projection 420 encloses the resonator 411c entirely. By the constitution, the resonator 411c can be disposed apart from the neutral plane 418c and disposed in the projection 420. As the result, the diaphragm 412 can be thinner, and the sensitivity of the resonator 411b can be more improved. In a case of the thickness Tc, a size (height) of the projection 420 is determined so that the projection 420 encloses the resonator 411c entirely.

As shown in FIGS. 34A and 34B, in the resonant pressure sensor 400, different thickness areas (the projection 420 and the depression 421) are formed in the diaphragm 412 of the sensor substrate 410. At least a part of the resonator 411 or entire resonator 411 is included in a thick-part (the projection 420) of the diaphragm 412. Two resonators 411 are disposed in the projection 420 of the diaphragm 412 in line alignment. Wirings (not shown in FIG. 34A) are disposed in a same layer with the resonators 411. A number of the resonators 411 is not limited to two.

FIG. 36 is a magnified view around the resonator 411 of the resonant pressure sensor 400 shown in FIG. 34B. As shown in FIG. 36, the resonator 411 is disposed in a vacuum chamber 430. Tensile stress is applied to the resonator 411.

As shown in FIG. 35B, the resonator 411 is disposed in the projection 420 of the diaphragm 412 so that the resonator 411 can be disposed apart from the neutral plane 418 of the diaphragm 412 regardless of the thickness of the diaphragm 412. When designing the diaphragm 412 to improve the sensitivity of the resonator 411, there is no need to consider reduction of the sensitivity caused by the neutral plane 418 of the diaphragm 412. Therefore, the diaphragm 412 can be designed with two parameters which are the thickness of the diaphragm 412 and the diameter of the diaphragm 412. As described above, the sensitivity of the resonator 411 can be improved by making the diaphragm 412 thinner, and the resonant pressure sensor 400 can detect micro-pressure.

Also, the constitution of the present embodiment can (1) improve the pressure capacity of the diaphragm 412, and (2) make chip size smaller. These are problems caused by making the diaphragm 412 thinner.

Figure 37:
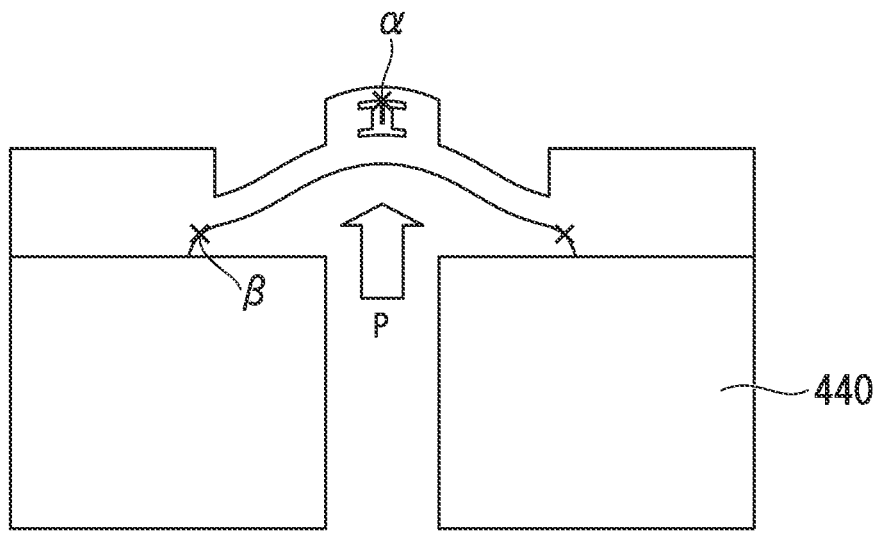
FIG. 37 is a drawing illustrating stress concentration to the diaphragm.

With respect to (1) improve the pressure capacity of the diaphragm 412, if the diaphragm 412 is made thinner, as shown in FIG. 37, stress concentrates on a part α of a shell and corners β of the diaphragm 412. Breaking of the diaphragm 412 is to begin from the positions α and β. To prevent the problem, the shell is made thicker, or curvatures are made on the corners β of the diaphragm 412. By the constitution, the stress concentration applied to the diaphragm 412 can be suppressed, and the pressure capacity of the diaphragm 412 can be increased. In the constitution shown in FIGS. 35A, 35B, and 35C, even if the shell is made thicker, a distance between the resonator 411 and the neutral plane 418 of the diaphragm 412 does not change. Therefore, reduction of the sensitivity of the resonator 411 can be suppressed.

With respect to (2) make chip size smaller, in general, as the diaphragm 412 is formed by etching deeply with alkali solution, vertical shape cannot be formed, but sloping shape is formed. For the reason, the size of the diaphragm 412 is different from its opening. Specifically, if the diaphragm 412 is thinner, the chip size is larger. However, as with the present embodiment, if the diaphragm 412 is formed by grinding, polishing, and etching, the size of the diaphragm 412 is not different from its opening. Therefore, the chip size can be smaller.

As described above, by the constitution of the present embodiment, the diaphragm 412 can be formed stably and reproducibly to be thin, small, high accuracy, and high pressure capacity. Therefore, the present embodiment has a cost advantage.

FIGS. 38A, 38B, 39A, 39B, 40A, 40B, 41A, and 41B are drawings illustrating other embodiments of the shapes of the projection 420 and the depression 421. FIGS. 38A, 39A, 40A, and 41A are plain views of the resonant pressure sensor 400. FIGS. 38B, 39B, 40B, and 41B are sectional views of the resonant pressure sensor 400. The shapes of the projection 420 and the depression 421 are not limited to the shapes shown in FIG. 34. For example, the shapes may be implemented with the shapes shown in FIGS. 38A, 38B, 39A, 39B, 40A, 40B, 41A, and 41B.

Figure 38A:
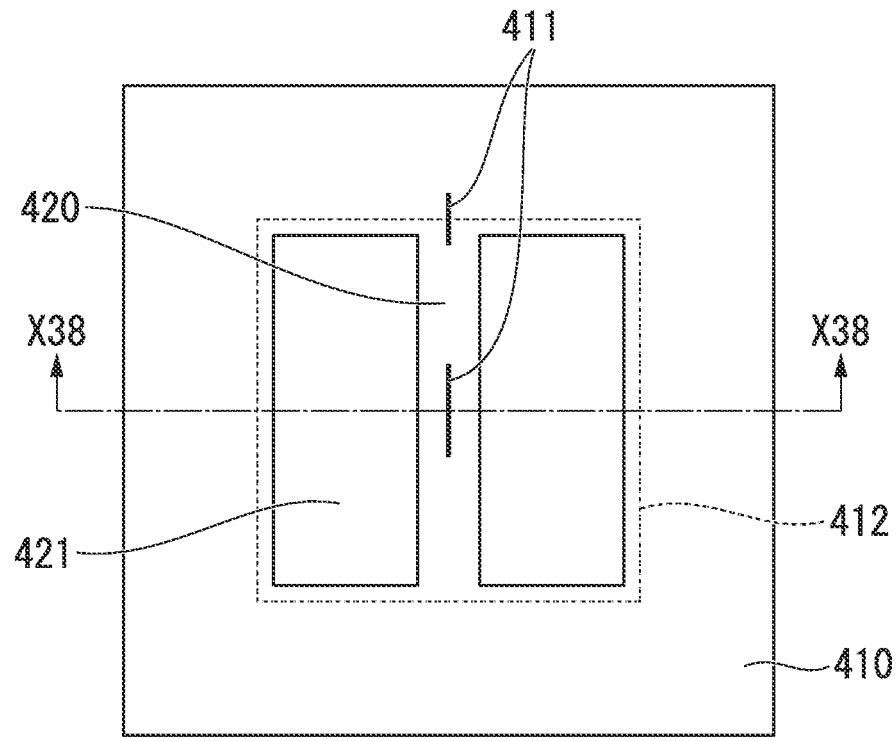
FIGS. 38A and 38B are drawings illustrating other example of shapes of the projection and the depression.
Figure 38B:
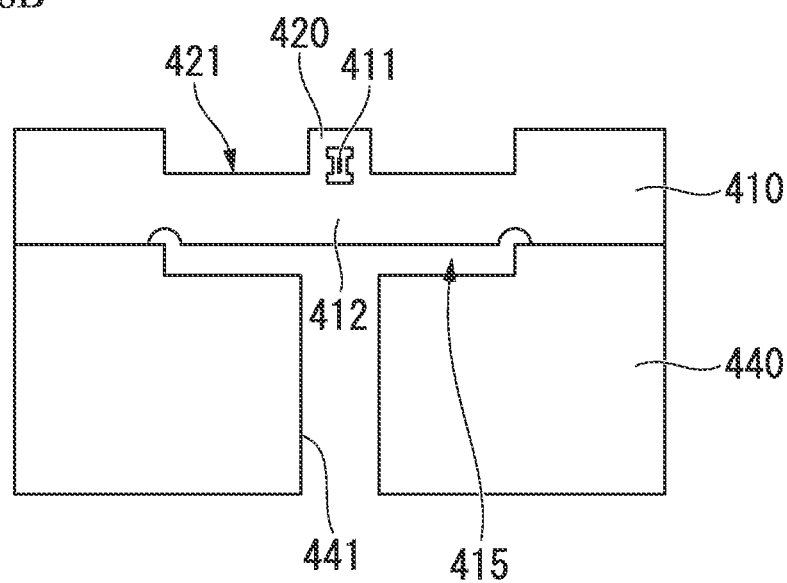

FIG. 38A is a plain view of the resonant pressure sensor 400. FIG. 38B is a sectional view on the line X38-X38 in FIG. 38A. In FIG. 38A and FIG. 38B, the depression 421 is quadrangular, and the thick-part (the projection 420) of the diaphragm 412 is I-line-shaped. Also, the depression 421 is disposed at both sides of the projection 420. The projection 420 includes the resonator 411 disposed in a center of the diaphragm 412 and the resonator 411 disposed in an outer circumference of the diaphragm 412.

Figure 39A:
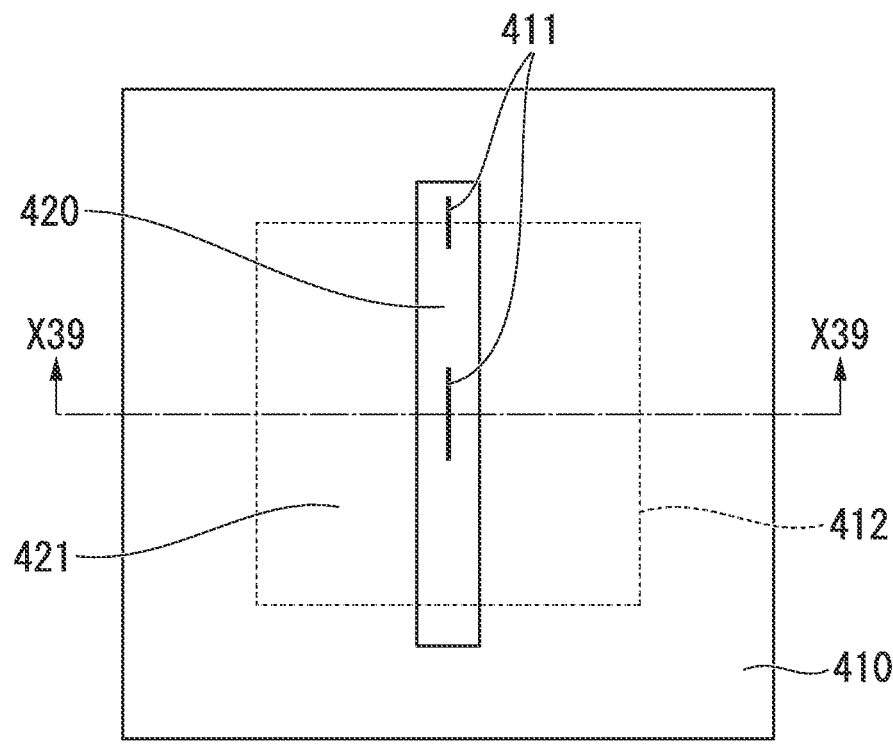
FIGS. 39A and 39B are drawings illustrating other example of shapes of the projection and the depression.
Figure 39B:
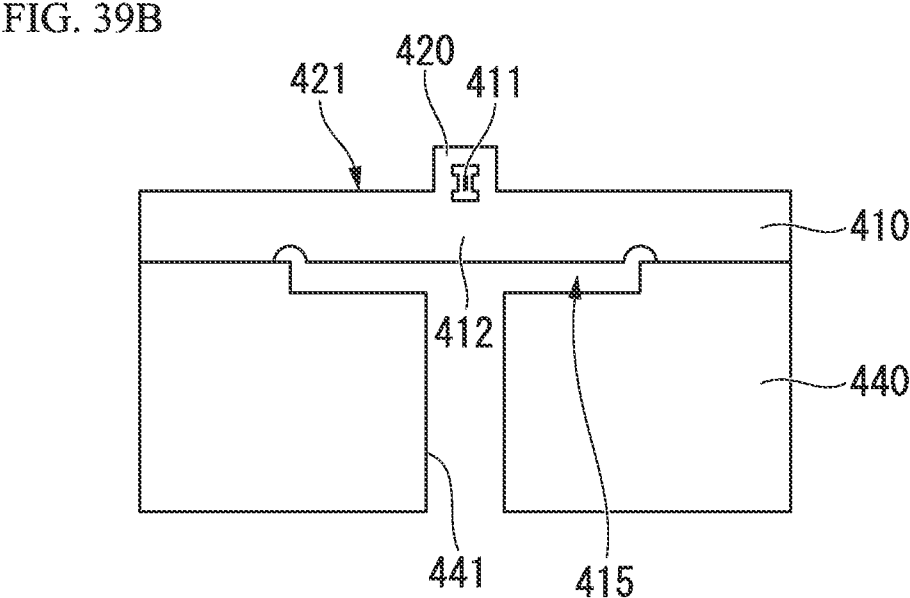

FIG. 39A is a plain view of the resonant pressure sensor 400. FIG. 39B is a sectional view on the line X39-X39 in FIG. 39A. In FIG. 39A and FIG. 39B, only the I-line-shaped thick-part (the projection 420) is disposed on the upper surface of the sensor substrate 410. The other constitutions are same with FIG. 38A and FIG. 38B. The I-line-shaped projection 420 includes the resonator 411 disposed in a center of the diaphragm 412 and the resonator 411 disposed in an outer circumference of the diaphragm 412.

Figure 40A:
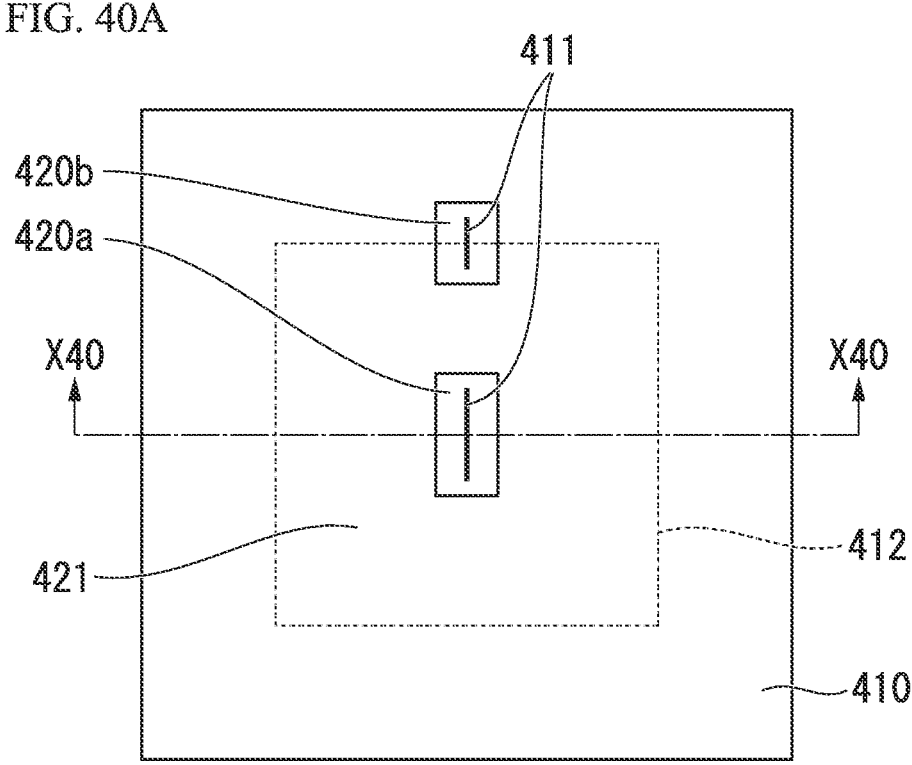
FIGS. 40A and 40B are drawings illustrating other example of shapes of the projection and the depression.
Figure 40B:
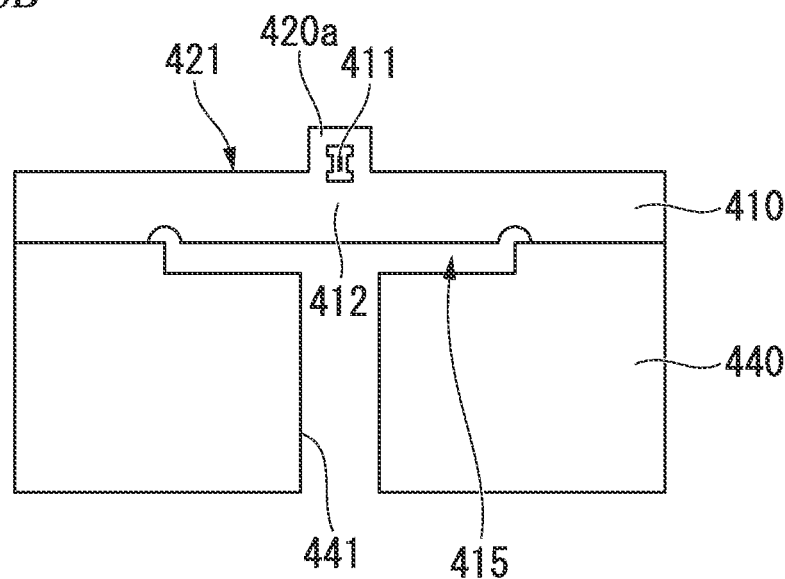

FIG. 40A is a plain view of the resonant pressure sensor 400. FIG. 40B is a sectional view on the line X40-X40 in FIG. 40A. In FIG. 40A and FIG. 40B, the I-line-shaped thick-part (the projection 420) is divided into two parts 420*a* (first projection) and 420*b* (second projection). The two parts 420*a* and 420*b* are separated each other and disposed on the upper surface of the sensor substrate 410. The other constitutions are same with FIG. 39A and FIG. 39B. The part 420*a* includes the resonator 411 disposed in a center of the diaphragm 412. The part 420*b* includes the resonator 411 disposed in an outer circumference of the diaphragm 412. In FIG. 40A and FIG. 40B, the projection 420 is locally-shaped to include only areas where the resonators 411 are disposed.

In the examples shown in FIGS. 38A, 38B, 39A, 39B, 40A, and 40B, the shape of the diaphragm 412 is quadrangular, but the shape is not limited thereto. For example, the shape of the diaphragm 412 may be circular as shown in FIG. 34.

Figure 41A:
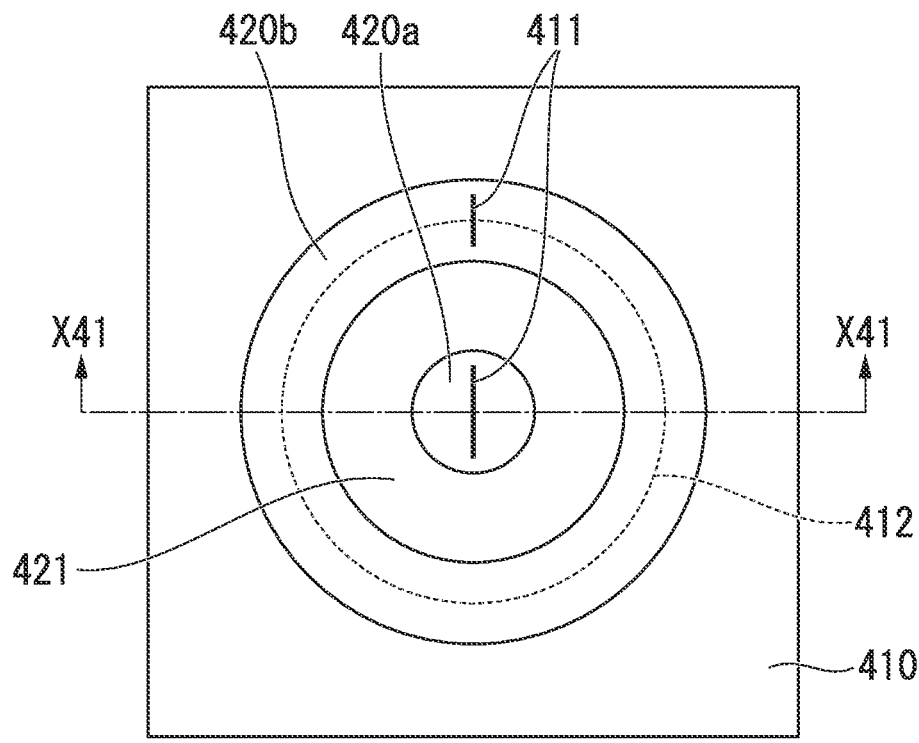
FIGS. 41A and 41B are drawings illustrating other example of shapes of the projection and the depression.
Figure 41B:
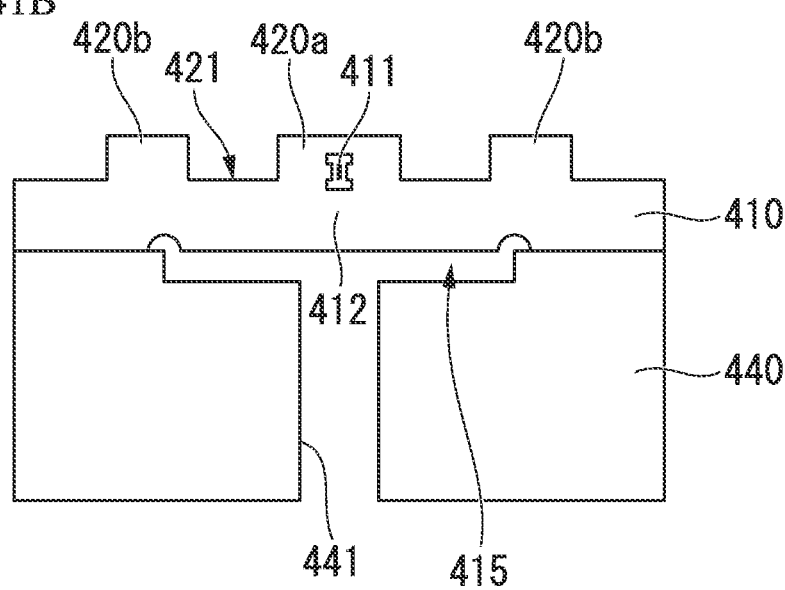

FIG. 41A is a plain view of the resonant pressure sensor 400. FIG. 41B is a sectional view on the line X41-X41 in FIG. 41A. In FIG. 41A and FIG. 41B, the projection 420 is divided into two parts 420*a* (first projection) and 420*b* (second projection). The parts 420*a* and 420*b* are concentric with each other. The part 420*a* includes the resonator 411 disposed in a center of the diaphragm 412. The part 420*b* includes the resonator 411 disposed in an outer circumference of the diaphragm 412. By the constitution shown in FIG. 41A and FIG. 41B, stress distribution can be uniformed in the circular diaphragm 412. The shape of the two parts 420*a* and 420*b* are concentric circles, but the shape is not limited thereto. For example, the shape of the two parts 420*a* and 420*b* may be quadrangular or polygonal.

Figure 42A:
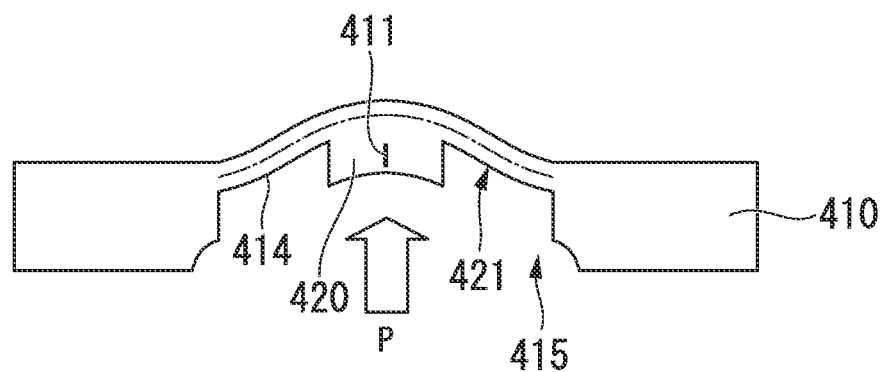
FIGS. 42A and 42B are a drawing illustrating other example of disposition of the projection.
Figure 42B:
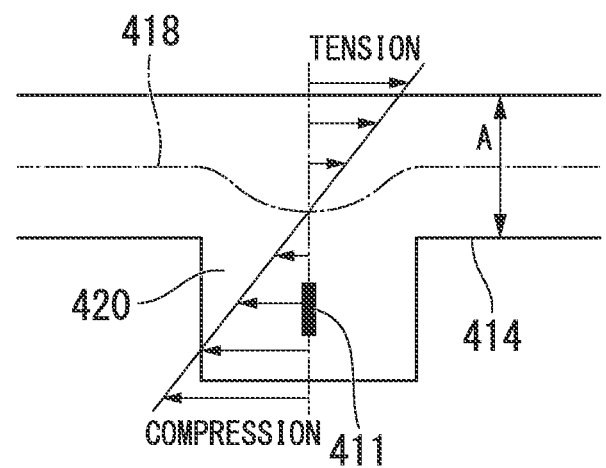

In the embodiment described above, the projection 420 is disposed on the upper surface 413 of the sensor substrate 410. The upper surface 413 is a surface which becomes convex upward when applying the pressure P to the diaphragm 412 upward. In other words, the projection 420 is disposed on an opposite side of the depression 415. But, the position of the projection 420 is not limited thereto. For example, as shown in FIG. 42A and FIG. 42B, the projection 420 may be disposed on the under surface 414 of the sensor substrate 410. The under surface 414 is a surface which becomes concave when applying the pressure P to the diaphragm 412 upward. In other words, the projection 420 may be disposed on a same side of the depression 415.

FIGS. 43A, 43B, 43C, 43D, 43E, 43F, and 43G are drawings for describing a manufacturing method of the resonant pressure sensor 400. The manufacturing method of the resonant pressure sensor 400 includes a process of forming the resonator 411 and a process of forming the projection 420 on the first surface (upper surface) 413 of the sensor substrate 410, so that the projection 420 includes at least a part of the resonator 411.

Figure 43A:
FIGS. 43A, 43B, 43C, 43D, 43E, 43F, 43G, and 43H are drawings illustrating an example of manufacturing process of the resonant pressure sensor.
Figure 43B:

FIG. 43A is a drawing for describing a process of manufacturing the resonant pressure sensor 400. First, as shown in FIG. 43A, a silicon substrate 401 to become the sensor substrate 410 is prepared. Next, as shown in FIG. 43B, the resonator 411 is formed in the sensor substrate 410 at a side of the upper surface 413. At this time, the resonator 411 is formed so that the projection 420 formed in a post-process includes at least a part of the resonator 411.

For example, manufacturing processes of the resonator 411 are described in Japanese Examined Patent Application Publication No. 7-104217 and Japanese Unexamined Patent Application Publication No. 2013-246083. If the deformation of the diaphragm 412 can be measured, the shape of the resonator 411 is not limited thereto.

Figure 43C:
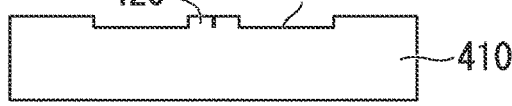

FIG. 43C is a drawing for describing a process of forming the projection 420 of the sensor substrate 410. The depression 421 is formed by etching process on the first surface (upper surface) of the sensor substrate 410 including the diaphragm 412. By this process, the projection 420 is formed on the first surface (upper surface) of the sensor substrate 410. An aperture is formed on a sensor surface by photolithography with resist material. The aperture is etched by a method such as dry etching. After etching, the resist material is removed, and the depression 421 is formed on the sensor substrate 410. By the process, the projection 420 is formed in an area which is not etched.

Figure 43D:
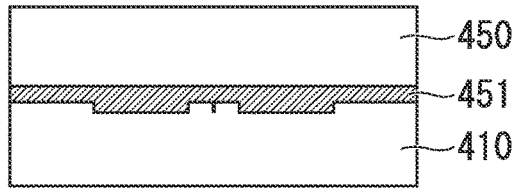

FIG. 43D is a drawing for describing a bonding process of the sensor substrate 410. The first surface (upper surface) of the sensor substrate 410 is bonded to a support substrate 450 with a bonding material 451. For example, the bonding material 451 is thermoplastic adhesive, dissolved-solution type adhesive, UV adhesive, a double-faced tape, WAX, and so on.

Because the thickness variation in bonding process affects accuracy of following grinding and polishing processes, there is a need to control TTV (Total Thickness Variation; difference between a minimum thickness of the wafer and a maximum thickness of the wafer) and warpage. As the support substrate 450, sapphire, glass, silicon, or the like are used. The shape of the support substrate 450 is not limited thereto.

Figure 43E:
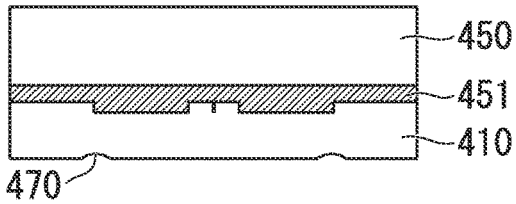

FIG. 43E is a drawing for describing a grinding and polishing process on the under surface 414 of the sensor substrate 410. The sensor substrate 410 bonded to the support substrate 450 is grinded and polished on the second surface (under surface) 414 to achieve a predetermined thickness. At this time, there is a need to polish the under surface 414 until crushed layers and grinding marks are deleted.

The convex patterns on the first surface are transferred as the concavo-convex patterns on a second surface (under surface) of the thin sensor substrate 410. By the concavo-convex patterns on the polished surface, gaps are formed on a bonding surface, and bonding-deformation is generated. For the reason, the sensor surface of the sensor substrate 410 should be flat.

When grinding and polishing the sensor substrate 410 to less than 200 micrometers thick, the wafer is broken easily. However, in the case that the sensor substrate 410 is bonded to the support substrate 450, the sensor substrate 410 can be ground to less than several tens of micrometers thick without being broken.

Figure 44A:
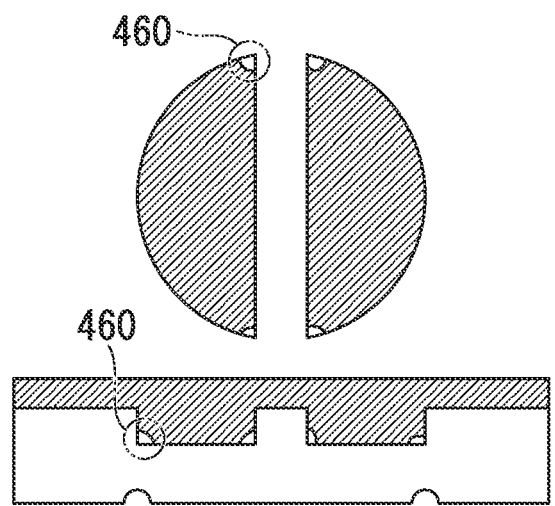
FIG. 44A is a drawing illustrating voids formed in the depression.
Figure 44B:
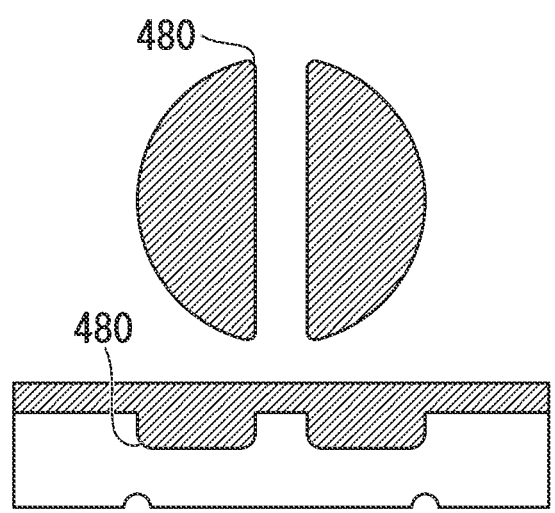
FIG. 44B is a drawing illustrating the diaphragm has rounded corners.

As shown in FIG. 44A, there is the possibility that voids 460 are formed in the high step structure. Also, as shown in FIG. 43E, there is the possibility that surface saggings 470 are formed on the under surface 414 of the sensor substrate 410. For the reason, as shown in FIG. 44B, it is important that the diaphragm 412 has rounded corners. For example, curvatures 480 are formed on the pattern of the depression 421 and the corner and the edge of the bottom surface of the depression 421, and the depression 415 is formed to be larger than the depression 421.

After grinding and polishing, a washing process (not shown in the figures) should be performed to clean the polished surface. The washing process is such as physical washing ($CO_2$ washing, or twin-fluid washing) or acid-alkaline washing. There is a need that the washing process is performed at temperatures less than heatproof temperature of the bonding material. Also, there is a need that the bonding material is tolerant of the solution which used in the manufacturing process.

Figure 43F:
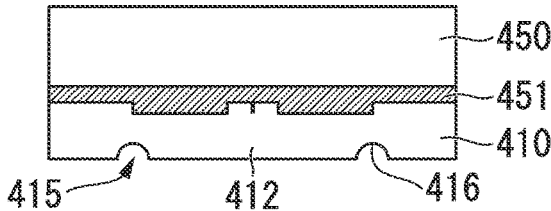

FIG. 43F is a drawing for describing a process of forming patterns on the under surface 414 of the sensor substrate 410. An aperture is formed on a sensor surface by photolithography with resist material. The aperture is etched by a method such as dry etching. After etching, the resist material is removed, and the roundness 416 is formed on the under surface 414 of the sensor substrate 410.

Figure 43G:
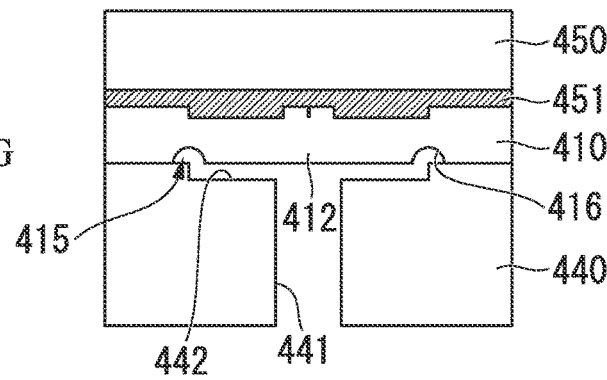

FIG. 43G is a drawing for describing a process of forming the base substrate 440. The pressure-hole 441 and a depression 442 are formed in the base substrate 440 by plasma etching, wet etching, or the like. The forming method of the pressure-hole 441 is not limited thereto. Also, the shape of the pressure-hole 441 is not limited thereto. Same with the pressure-hole 441, the depression 442 is formed by plasma etching, wet etching, or the like.

In FIG. 43G; the base substrate 440 where the pressure-hole 441 and the depression 442 are formed is bonded to the sensor substrate 410 where the roundness 416 is formed. At the time, there is a need that the base substrate 440 is bonded to the sensor substrate 410 at temperatures less than heat-proof temperature of bonding material. Specifically, temperature of an upper limit of bonding material is from 100 to 200 degrees Celsius. Also, temperature of an upper limit of double-faced tape is about 150 degrees Celsius.

To simplify the processes, it is desirable that the bonding process is performed without forming a film on the polished surface and reforming the polished surface. For example, the bonding meeting the requirements includes room-temperature direct bonding, metallic diffusion bonding, and so on.

In the room-temperature direct bonding, after a bonding surface of a substrate is etched by an ion gun or a FAB (fast atomic beam) gun and activated higher, the bonding process is performed in high vacuum. This technology is characterized in that the bonding process can be performed at room-temperature, and the bonding process is suitable for bonding silicon surfaces. Gas generated from the bonding material adheres to the bonding surface of the substrate and the gas causes a reduction of bonding force, so that there is a need to choose the bonding material which does not generate gas. The metallic diffusion bonding is performed with metal atomic layer added on a substrate at an atomic layer level instead of activating bonding surface by etching in the room-temperature direct bonding. The bonding process is performed in high vacuum same with the room-temperature direct bonding. In the metallic diffusion bonding, the substrates can be bonded without worsening characteristics of the resonant pressure sensor 400, as other material (metal) atomic layer is very thin.

The bonding technology at low temperature includes, other than the technology described above, a plasma activating bonding. In the plasma activating bonding, hydroxyl groups are formed on the substrate surface by plasma with gas such as Ar, $N_2$, $O_2$, or the like, bonding surfaces are bonded, and annealing at 400 degrees Celsius to make bonding strength higher. In the plasma activating bonding, water can be generated due to the hydroxyl groups, and voids can be generated due to the water. However, in the case of small area bonding, such as diaphragm structure, the water goes away from the bonding area, and the bonding process is performed without any voids.

Figure 43H:
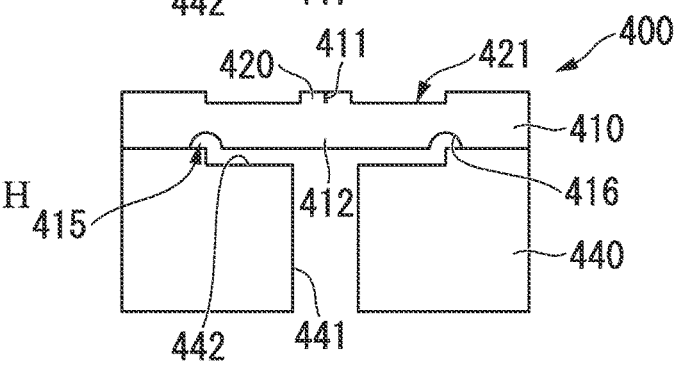

FIG. 43H is a drawing for describing a process of removing the support substrate 450. After the sensor substrate 410 is ground and polished to be thin, the support substrate 450 is removed from the sensor substrate 410. The process of removing the support substrate 450 is different according to types of the bonding material. For example, in a case of thermoplastic adhesive, the support substrate 450 is removed by raising the temperature of the adhesive and sliding the support substrate 450.

In a case of a thermal-ablation-type double-faced tape, the support substrate 450 is easily removed only by raising the temperature. After removing, the sensor surface should be washed by spin washing, solution immersion, or the like to remove bonding material residue. By these processes, the resonant pressure sensor 400 is completed.

In the resonant pressure sensor 400, the projection 420 is disposed on the diaphragm 412, the resonator 411 is disposed in an area apart from the neutral plane 418 which is positioned on a bisector dividing the sensor substrate 410 into two substantially-equal thickness parts, and the projection 420 includes at least a part of the area in which the resonator 411 is disposed. By the constitution, the resonator 411 can be disposed apart from the neutral plane 418 of the diaphragm 412 regardless of wide variety of the thickness of the diaphragm 412. Therefore, the diaphragm 412 can be thinner, and the sensitivity of the resonator 411b can be improved.

Specifically, by the present embodiment, stress concentration to the diaphragm 412 can be suppressed. Also, internal deformation between different materials, which is generated according to temperature and history of pressure, can be suppressed. Therefore, the resonant pressure sensor 400 which has little hysteresis can be implemented. Because the interspace can be determined in accordance with the depth of the depression 442 of the base substrate 440, the interspace of which width is from submicrometer to several tens of micrometers can be formed. Also, because amount of the etching is small, the etching can be controlled with high accuracy in submicrometer.

As the result, the resonance of the diaphragm 412 can be suppressed, and the movement range of the diaphragm 412 is not limited regardless of foreign substance mixing. Therefore, various characteristics of the resonant pressure sensor 400 such as input-output characteristics can be improved. Also, the manufacturing processes can be simplified by isotropic etching with plasma, and the pressure capacity of the diaphragm 412 can be increased by the roundness 416 formed on stress-concentrated area of the diaphragm 412. Therefore, the resonant pressure sensor 400 can be formed at low cost, and the sensitivity of the resonant pressure sensor 400 can be improved.

Fifth Embodiment

Figure 50A:
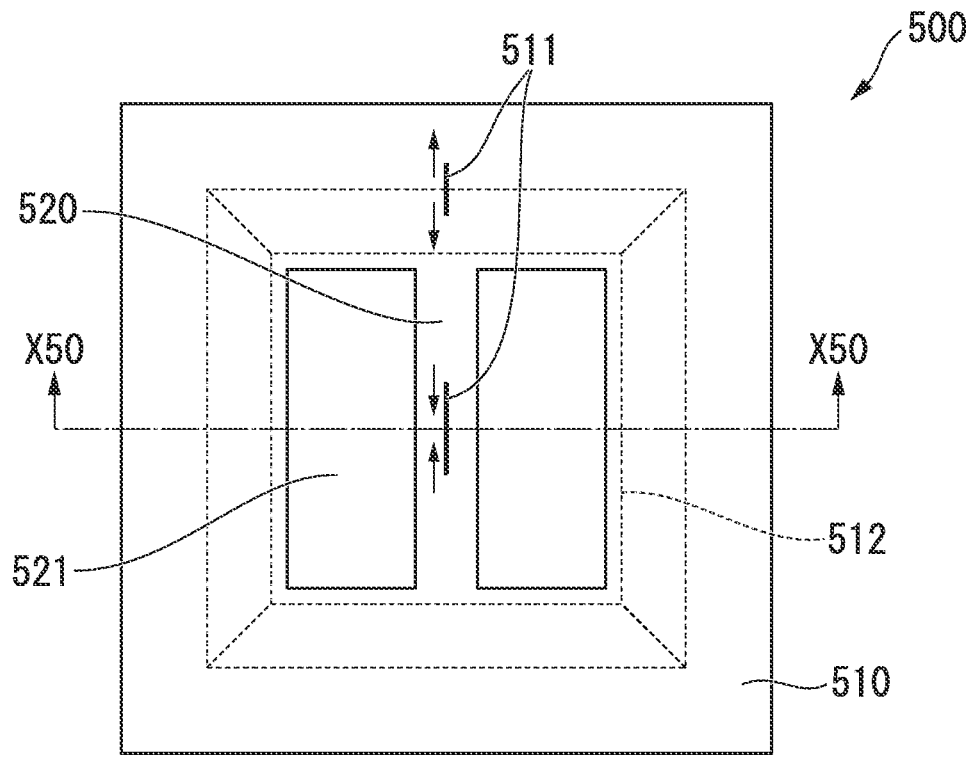
FIG. 50A is a plane view illustrating the resonant pressure sensor of the fifth embodiment.
Figure 50B:
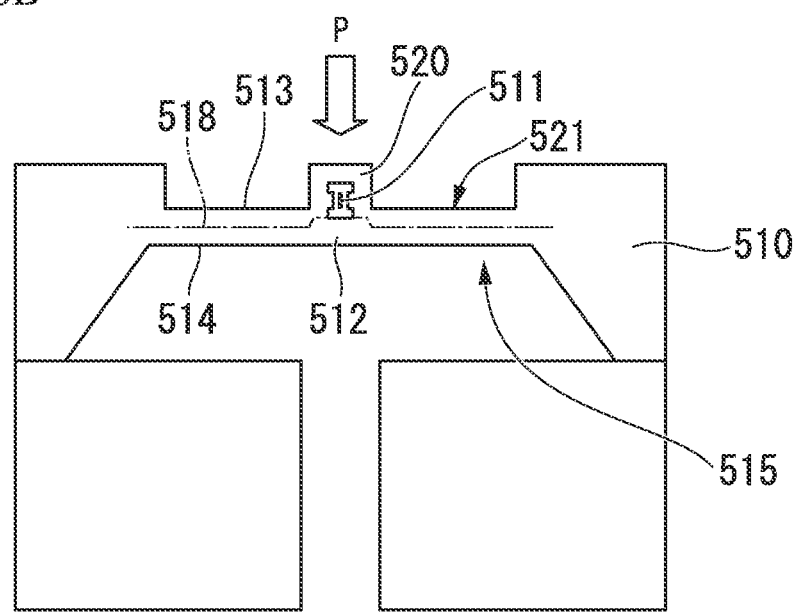
FIG. 50B is a sectional view illustrating the resonant pressure sensor of the fifth embodiment.

FIG. 50A is a plain view of the resonant pressure sensor 500 in the fifth embodiment. FIG. 50B is a sectional view of the resonant pressure sensor 500 on the line X50-X50 in the fifth embodiment. The resonant pressure sensor 500 of the present embodiment includes a sensor substrate 510. Also, the resonant pressure sensor 500 of the present embodiment includes a resonator 511 disposed in a sensor substrate 510. The sensor substrate 510 includes a diaphragm 512.

In FIG. 50A and FIG. 50B, the sensor substrate 510 is made of silicon (Si). The resonator 511 is disposed in the sensor substrate 510 at a first surface (upper surface) 513 of the sensor substrate 510. A depression 515 is formed on a second surface (under surface) 514 of the sensor substrate 510. The depression 515 may be formed by using alkali solution (such as KOH, TMAH, and so on).

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A resonant pressure sensor comprising:
a first substrate comprising a diaphragm and at least one projection disposed on the diaphragm; and
at least one resonator disposed in the first substrate, at least a part of the resonator being included in the projection, and the resonator being disposed between a top of the projection and an intermediate level of the first substrate,
wherein the first substrate is an SOI substrate in which a silicon dioxide layer is inserted between a silicon substrate and a superficial silicon layer,
wherein the intermediate level of the first substrate is disposed in the silicon substrate,
wherein the resonator is disposed in the projection included in the superficial silicon layer,
wherein the at least one resonator is disposed in a vacuum chamber, and
wherein the whole of the vacuum chamber is disposed between the top of the projection and the intermediate level of the first substrate.

2. The resonant pressure sensor according to claim 1, wherein
the projection encloses the resonator entirely.

3. The resonant pressure sensor according to claim 1, wherein
the first substrate further comprises a supporter disposed at an outer circumference of the diaphragm, and
a second surface of the supporter opposite to a first surface is bonded to a second substrate.

4. The resonant pressure sensor according to claim 1, wherein
the first substrate has:
a first depression around the projection on a first surface; and
a second depression on a second surface.

5. The resonant pressure sensor according to claim 4, wherein
the second depression is larger than the first depression.

6. The resonant pressure sensor according to claim 3, wherein
the second substrate has a pressure-hole which is configured to allow externally applied pressure to be propagated to the diaphragm.

7. The resonant pressure sensor according to claim 1, wherein
the projection includes a first resonator and a second resonator, and
the first resonator and the second resonator are disposed in the projection in alignment with each other.

8. The resonant pressure sensor according to claim 7, wherein
the projection includes a first projection and a second projection separated from the first projection,
the first projection includes the first resonator, and
the second projection includes the second resonator.

9. The resonant pressure sensor according to claim 8, wherein
the first projection and the second projection are concentric with each other.

10. The resonant pressure sensor according to claim 1, wherein
the projection is disposed on an upper surface of the first substrate.

11. The resonant pressure sensor according to claim 1, wherein
the projection is disposed on an under surface of the first substrate.

12. The resonant pressure sensor according to claim 1, wherein
the intermediate level is positioned on a bisector dividing the first substrate into two equal thickness parts.

13. The resonant pressure sensor according to claim 1, wherein
the diaphragm has rounded corners.

14. The resonant pressure sensor according to claim 1, wherein the resonant transducer is manufactured by a manufacturing method comprising:
(a) forming the resonator in the first substrate including the diaphragm;
(b) forming the projection on a first surface of the first substrate, the projection including the resonator, and the resonator being disposed between the top of the projection and the intermediate level of the first substrate.

15. The resonant pressure sensor according to claim 14, wherein the manufacturing method further comprises:
(c) bonding the first surface of the first substrate to a support substrate.

16. The resonant pressure sensor according to claim 15, wherein the manufacturing method further comprises:
(d) forming a depression on a second surface opposite to the first surface of the first substrate.

17. The resonant pressure sensor according to claim 16, wherein the manufacturing method further comprises:
- (e) forming a pressure-hole in the second substrate; and
- (f) bonding the second surface of the first substrate to a second substrate.

18. The resonant pressure sensor according to claim 15, wherein the manufacturing method further comprises:
- (g) removing the support substrate from the first substrate.

* * * * *